(12) United States Patent
Hassan et al.

(10) Patent No.: US 12,527,563 B2
(45) Date of Patent: Jan. 20, 2026

(54) SURGICAL SYSTEMS FOR INDEPENDENTLY INSUFFLATING TWO SEPARATE ANATOMIC SPACES

(71) Applicant: Cilag GmbH International, Zug (CH)

(72) Inventors: Alexander Tarek Hassan, Ann Arbor, MI (US); Travis Michael Schuh, Los Altos, CA (US); Charles J. Scheib, Loveland, OH (US); Frederick E. Shelton, IV, Hillsboro, OH (US)

(73) Assignee: Cilag GmbH International, Zug (CH)

( * ) Notice: Subject to any disclaimer, the term of this patent is extended or adjusted under 35 U.S.C. 154(b) by 752 days.

(21) Appl. No.: 17/493,545

(22) Filed: Oct. 4, 2021

(65) Prior Publication Data

US 2023/0101376 A1    Mar. 30, 2023

Related U.S. Application Data

(60) Provisional application No. 63/249,980, filed on Sep. 29, 2021.

(51) Int. Cl.
*A61B 17/02* (2006.01)
*A61B 1/00* (2006.01)
(Continued)

(52) U.S. Cl.
CPC ...... *A61B 17/0218* (2013.01); *A61B 1/00004* (2013.01); *A61B 1/00006* (2013.01);
(Continued)

(58) Field of Classification Search
CPC ..... A61B 17/0218; A61B 34/20; A61B 34/30; A61B 90/06; A61B 90/361; A61B 90/37;
(Continued)

(56) References Cited

U.S. PATENT DOCUMENTS

| | | | |
|---|---|---|---|
| 4,445,892 | A | 5/1984 | Hussein et al. |
| 4,470,407 | A | 9/1984 | Hussein |

(Continued)

FOREIGN PATENT DOCUMENTS

| | | |
|---|---|---|
| CA | 2978771 A1 | 10/2016 |
| EP | 2226026 A1 | 9/2010 |

(Continued)

OTHER PUBLICATIONS

U.S. Appl. No. 17/449,765, filed Oct. 1, 2021, Cooperative Access Hybrid Procedures.
(Continued)

*Primary Examiner* — Tan-Uyen T Ho
*Assistant Examiner* — Cherie M Poland
(74) *Attorney, Agent, or Firm* — Condo Roccia Koptiw LLP

(57) ABSTRACT

Surgical systems are provided. In one exemplary embodiment, a surgical system includes a first scope device, a first instrument, a second scope device, and a second instrument. The first scope device has a first portion configured to be inserted into an extraluminal anatomical space and a second portion configured to be positioned within an intraluminal anatomical space. The first scope device includes a first insufflation port configured to insufflate the intraluminal anatomical space. The first instrument is configured to be inserted through the extraluminal anatomical space and into the intraluminal anatomical space such that the first instrument is present in both the extraluminal and intraluminal anatomical spaces. The second scope device is configured to be inserted into the extraluminal anatomical space. The second scope device has a second insufflation port configured to insufflate the extraluminal anatomical space. The second instrument is configured to be inserted into the extraluminal anatomical space. Methods are also provided.

19 Claims, 22 Drawing Sheets

(51) Int. Cl.
  *A61B 1/313* (2006.01)
  *A61B 17/00* (2006.01)
  *A61B 17/12* (2006.01)
  *A61B 17/34* (2006.01)
  *A61B 34/20* (2016.01)
  *A61B 34/30* (2016.01)
  *A61B 90/00* (2016.01)
  *A61B 90/50* (2016.01)
  *G06T 7/73* (2017.01)
  *H04N 13/111* (2018.01)
  *H04N 13/156* (2018.01)
  *A61B 5/00* (2006.01)

(52) U.S. Cl.
  CPC .... *A61B 1/00009* (2013.01); *A61B 1/000095* (2022.02); *A61B 1/00045* (2013.01); *A61B 1/00048* (2013.01); *A61B 1/0005* (2013.01); *A61B 1/3132* (2013.01); *A61B 17/00234* (2013.01); *A61B 17/12099* (2013.01); *A61B 17/12104* (2013.01); *A61B 17/12136* (2013.01); *A61B 17/3421* (2013.01); *A61B 17/3474* (2013.01); *A61B 34/20* (2016.02); *A61B 34/30* (2016.02); *A61B 90/06* (2016.02); *A61B 90/361* (2016.02); *A61B 90/37* (2016.02); *A61B 90/39* (2016.02); *A61B 90/50* (2016.02); *G06T 7/74* (2017.01); *H04N 13/111* (2018.05); *H04N 13/156* (2018.05); *A61B 5/0075* (2013.01); *A61B 2017/00022* (2013.01); *A61B 2017/00057* (2013.01); *A61B 2017/00061* (2013.01); *A61B 2017/00075* (2013.01); *A61B 2017/00199* (2013.01); *A61B 2017/00292* (2013.01); *A61B 2017/00809* (2013.01); *A61B 2017/00818* (2013.01); *A61B 2017/3419* (2013.01); *A61B 2017/3484* (2013.01); *A61B 2034/2055* (2016.02); *A61B 2034/2057* (2016.02); *A61B 2034/301* (2016.02); *A61B 2090/064* (2016.02); *A61B 2090/3937* (2016.02); *A61B 2090/3945* (2016.02); *G06T 2207/10068* (2013.01)

(58) Field of Classification Search
  CPC ... A61B 90/39; A61B 90/50; A61B 17/00234; A61B 17/12099; A61B 17/12104; A61B 17/12136; A61B 17/3421; A61B 17/3474; A61B 2034/2055; A61B 2034/2057; A61B 2034/301; A61B 2090/064; A61B 2090/3937; A61B 2090/3945; A61B 5/0075; A61B 2017/00022; A61B 2017/00057; A61B 2017/00061; A61B 2017/00075; A61B 2017/00199; A61B 2017/00292; A61B 2017/00809; A61B 2017/00818; A61B 2017/3419; A61B 2017/3484; G06T 7/74; G06T 2207/10068; H04N 13/156; H04N 13/111
  See application file for complete search history.

(56) References Cited

U.S. PATENT DOCUMENTS

| | | | |
|---|---|---|---|
| 4,735,603 A | 4/1988 | Goodson et al. |
| 5,398,670 A | 3/1995 | Ortiz et al. |
| 5,505,700 A | 4/1996 | Leone et al. |
| 5,876,367 A | 3/1999 | Kaganov et al. |
| 6,004,271 A | 12/1999 | Moore |
| 6,478,028 B1 | 11/2002 | Paolitto et al. |
| 6,503,195 B1 | 1/2003 | Keller et al. |
| 6,530,913 B1 | 3/2003 | Giba et al. |
| 6,544,230 B1 | 4/2003 | Flaherty et al. |
| 6,610,007 B2 | 8/2003 | Belson et al. |
| 6,669,709 B1 | 12/2003 | Cohn et al. |
| 6,905,460 B2 | 6/2005 | Wang et al. |
| 7,371,210 B2 | 5/2008 | Brock et al. |
| 8,052,636 B2 | 11/2011 | Moll et al. |
| 8,068,649 B2 | 11/2011 | Green |
| 8,257,303 B2 | 9/2012 | Moll et al. |
| 8,289,381 B2 | 10/2012 | Bayer et al. |
| 8,517,933 B2 | 8/2013 | Mohr |
| 8,545,515 B2 | 10/2013 | Prisco et al. |
| 8,551,115 B2 | 10/2013 | Steger et al. |
| 8,623,028 B2 | 1/2014 | Rogers et al. |
| 8,771,180 B2 | 7/2014 | Mohr |
| 8,831,782 B2 | 9/2014 | Itkowitz |
| 8,888,789 B2 | 11/2014 | Prisco et al. |
| 8,979,884 B2 | 3/2015 | Milsom et al. |
| 9,254,178 B2 | 2/2016 | Prisco et al. |
| 9,269,682 B2 | 2/2016 | Yu et al. |
| 9,274,047 B2 | 3/2016 | Velten et al. |
| 9,283,050 B2 | 3/2016 | Prisco et al. |
| 9,320,416 B2 | 4/2016 | Cooper et al. |
| 9,339,341 B2 | 5/2016 | Cooper |
| 9,358,074 B2 | 6/2016 | Schena et al. |
| 9,572,481 B2 | 2/2017 | Duindam et al. |
| 9,636,186 B2 | 5/2017 | Kumar et al. |
| 9,861,271 B2 | 1/2018 | Liu et al. |
| 10,245,069 B2 | 4/2019 | Rogers et al. |
| 10,368,838 B2 | 8/2019 | Williams et al. |
| 10,456,202 B2 | 10/2019 | Sholev et al. |
| 10,492,665 B2 | 12/2019 | Dejima |
| 10,792,034 B2 | 10/2020 | Scheib et al. |
| 10,856,928 B2 | 12/2020 | Shelton, IV et al. |
| 10,925,598 B2 | 2/2021 | Scheib et al. |
| 11,051,876 B2 | 7/2021 | Shelton, IV et al. |
| 11,723,642 B2 | 8/2023 | Shelton, IV et al. |
| 11,759,283 B2 | 9/2023 | Shelton, IV et al. |
| 11,937,798 B2 * | 3/2024 | Shelton, IV ...... A61B 1/000094 |
| 11,937,799 B2 | 3/2024 | Shelton, IV |
| 2001/0009976 A1 | 7/2001 | Panescu et al. |
| 2001/0029366 A1 | 10/2001 | Swanson et al. |
| 2002/0087169 A1 | 7/2002 | Brock et al. |
| 2002/0143237 A1 | 10/2002 | Oneda et al. |
| 2002/0177789 A1 | 11/2002 | Ferry et al. |
| 2003/0074011 A1 | 4/2003 | Gilboa et al. |
| 2003/0083547 A1 | 5/2003 | Hamilton et al. |
| 2003/0135204 A1 | 7/2003 | Lee et al. |
| 2004/0176751 A1 | 9/2004 | Weitzner et al. |
| 2004/0193146 A1 | 9/2004 | Lee et al. |
| 2005/0182295 A1 | 8/2005 | Soper et al. |
| 2005/0288550 A1 | 12/2005 | Mathis |
| 2006/0058617 A1 | 3/2006 | Sano et al. |
| 2006/0129087 A1 * | 6/2006 | Uesugi ............... A61M 13/003 604/118 |
| 2006/0258938 A1 | 11/2006 | Hoffman et al. |
| 2007/0060879 A1 | 3/2007 | Weitzner et al. |
| 2007/0088275 A1 | 4/2007 | Stearns et al. |
| 2007/0162106 A1 | 7/2007 | Evans et al. |
| 2008/0045803 A1 | 2/2008 | Williams et al. |
| 2008/0051655 A1 | 2/2008 | Sato et al. |
| 2008/0172073 A1 | 7/2008 | Boyden et al. |
| 2008/0243142 A1 | 10/2008 | Gildenberg |
| 2008/0294008 A1 | 11/2008 | Toyama |
| 2008/0300592 A1 | 12/2008 | Weitzner et al. |
| 2009/0012618 A1 | 1/2009 | Ahrens et al. |
| 2009/0048612 A1 | 2/2009 | Farritor et al. |
| 2009/0054884 A1 | 2/2009 | Farley et al. |
| 2009/0171196 A1 | 7/2009 | Hauck et al. |
| 2009/0326518 A1 | 12/2009 | Rabin |
| 2010/0081864 A1 | 4/2010 | Hess et al. |
| 2010/0081881 A1 | 4/2010 | Murray et al. |
| 2010/0137751 A1 | 6/2010 | Tadami |
| 2010/0228096 A1 | 9/2010 | Weisenburgh, II et al. |
| 2010/0240960 A1 | 9/2010 | Richard |
| 2010/0298646 A1 | 11/2010 | Necio et al. |
| 2010/0312063 A1 | 12/2010 | Hess et al. |
| 2010/0312065 A1 | 12/2010 | Shelton, IV et al. |
| 2011/0071543 A1 | 3/2011 | Prisco et al. |
| 2011/0152788 A1 | 6/2011 | Hotter |

(56) References Cited

U.S. PATENT DOCUMENTS

| | | |
|---|---|---|
| 2011/0245858 A1 | 10/2011 | Milsom et al. |
| 2011/0295074 A1 | 12/2011 | Stefanchik et al. |
| 2012/0029339 A1 | 2/2012 | Cohen et al. |
| 2012/0130188 A1 | 5/2012 | Okoniewski |
| 2012/0245423 A1 | 9/2012 | Rodrigues |
| 2013/0245381 A1 | 9/2013 | Dang et al. |
| 2013/0266029 A1 | 10/2013 | Yi et al. |
| 2014/0066717 A1 | 3/2014 | Rogers et al. |
| 2014/0194732 A1 | 7/2014 | Nakaguchi |
| 2014/0303491 A1 | 10/2014 | Shekhar et al. |
| 2014/0358070 A1 | 12/2014 | Stearns et al. |
| 2015/0080933 A1 | 3/2015 | Igov |
| 2015/0094577 A1 | 4/2015 | Saadat |
| 2015/0145953 A1 | 5/2015 | Fujie et al. |
| 2016/0007979 A1 | 1/2016 | Bhagat et al. |
| 2016/0015469 A1 | 1/2016 | Goshayesh et al. |
| 2016/0066917 A1 | 3/2016 | Burleigh et al. |
| 2016/0089181 A1 | 3/2016 | Johnson |
| 2016/0331473 A1 | 11/2016 | Yamamura |
| 2016/0338686 A1 | 11/2016 | Kleyman |
| 2017/0024903 A1 | 1/2017 | Razzaque |
| 2017/0049473 A1 | 2/2017 | Amson et al. |
| 2017/0055819 A1 | 3/2017 | Hansen et al. |
| 2017/0086653 A1 | 3/2017 | Yeung et al. |
| 2017/0086658 A1 | 3/2017 | Yeung et al. |
| 2017/0119418 A1 | 5/2017 | Yoshimura |
| 2017/0128041 A1 | 5/2017 | Hasser et al. |
| 2017/0128144 A1 | 5/2017 | Hasser et al. |
| 2017/0128145 A1 | 5/2017 | Hasser et al. |
| 2017/0172662 A1 | 6/2017 | Panescu et al. |
| 2017/0181808 A1 | 6/2017 | Panescu et al. |
| 2017/0251900 A1 | 9/2017 | Hansen et al. |
| 2017/0265866 A1 | 9/2017 | Ryou et al. |
| 2018/0008251 A1 | 1/2018 | Giles |
| 2018/0042643 A1 | 2/2018 | Norton et al. |
| 2018/0042680 A1 | 2/2018 | Dimaio et al. |
| 2018/0049821 A1 | 2/2018 | Shelton, IV et al. |
| 2018/0070800 A1 | 3/2018 | Yeung et al. |
| 2018/0177556 A1 | 6/2018 | Noonan |
| 2018/0256008 A1 | 9/2018 | Nishizawa |
| 2018/0276877 A1 | 9/2018 | Mountney et al. |
| 2018/0296280 A1 | 10/2018 | Kurihara et al. |
| 2018/0325604 A1 | 11/2018 | Atarot et al. |
| 2018/0368921 A1 | 12/2018 | Jeszenszky et al. |
| 2019/0117209 A1 | 4/2019 | Augelli et al. |
| 2019/0125457 A1* | 5/2019 | Parihar .............. A61B 17/0206 |
| 2019/0200844 A1 | 7/2019 | Shelton, IV et al. |
| 2019/0200981 A1 | 7/2019 | Harris et al. |
| 2019/0201046 A1 | 7/2019 | Shelton, IV et al. |
| 2019/0201088 A1 | 7/2019 | Shelton, IV et al. |
| 2019/0201114 A1 | 7/2019 | Shelton, IV et al. |
| 2019/0201136 A1 | 7/2019 | Shelton, IV et al. |
| 2019/0201140 A1 | 7/2019 | Yates et al. |
| 2019/0204201 A1 | 7/2019 | Shelton, IV et al. |
| 2019/0206004 A1 | 7/2019 | Shelton, IV et al. |
| 2019/0206555 A1 | 7/2019 | Morgan et al. |
| 2019/0207857 A1 | 7/2019 | Shelton, IV et al. |
| 2019/0290247 A1 | 9/2019 | Popovic et al. |
| 2020/0000530 A1 | 1/2020 | Defonzo et al. |
| 2020/0015668 A1 | 1/2020 | Scheib |
| 2020/0015897 A1 | 1/2020 | Scheib et al. |
| 2020/0015898 A1 | 1/2020 | Scheib et al. |
| 2020/0015899 A1 | 1/2020 | Scheib et al. |
| 2020/0015900 A1 | 1/2020 | Scheib et al. |
| 2020/0015901 A1 | 1/2020 | Scheib et al. |
| 2020/0015902 A1 | 1/2020 | Scheib et al. |
| 2020/0015903 A1 | 1/2020 | Scheib et al. |
| 2020/0015906 A1 | 1/2020 | Scheib et al. |
| 2020/0015907 A1 | 1/2020 | Scheib |
| 2020/0015914 A1 | 1/2020 | Scheib et al. |
| 2020/0015923 A1 | 1/2020 | Scheib et al. |
| 2020/0015924 A1 | 1/2020 | Scheib et al. |
| 2020/0015925 A1 | 1/2020 | Scheib |
| 2020/0037863 A1 | 2/2020 | Harris et al. |
| 2020/0060524 A1 | 2/2020 | Weitzner |
| 2020/0085516 A1 | 3/2020 | Defonzo et al. |
| 2020/0121162 A1 | 4/2020 | Koch et al. |
| 2020/0170720 A1 | 6/2020 | Ummalaneni |
| 2020/0178948 A1 | 6/2020 | Piskun et al. |
| 2020/0184640 A1 | 6/2020 | Mahadik et al. |
| 2020/0188043 A1 | 6/2020 | Yu et al. |
| 2020/0222078 A1 | 7/2020 | Dharan et al. |
| 2020/0306004 A1 | 10/2020 | Batchelor et al. |
| 2020/0315723 A1 | 10/2020 | Hassan et al. |
| 2020/0375448 A1 | 12/2020 | Hartley et al. |
| 2021/0008541 A1 | 1/2021 | Marshall et al. |
| 2021/0085410 A1 | 3/2021 | Hassan |
| 2021/0196108 A1 | 7/2021 | Shelton, IV et al. |
| 2021/0196109 A1 | 7/2021 | Shelton, IV et al. |
| 2021/0196312 A1 | 7/2021 | Plewe et al. |
| 2021/0196381 A1 | 7/2021 | Eckert et al. |
| 2021/0196382 A1 | 7/2021 | Mumaw et al. |
| 2021/0196383 A1 | 7/2021 | Shelton, IV et al. |
| 2021/0196384 A1 | 7/2021 | Shelton, IV et al. |
| 2021/0196385 A1 | 7/2021 | Shelton, IV et al. |
| 2021/0196386 A1 | 7/2021 | Shelton, IV et al. |
| 2021/0196423 A1 | 7/2021 | Shelton, IV et al. |
| 2021/0196424 A1 | 7/2021 | Shelton, IV et al. |
| 2021/0196425 A1 | 7/2021 | Shelton, IV et al. |
| 2021/0199557 A1 | 7/2021 | Shelton, IV et al. |
| 2021/0343088 A1 | 11/2021 | Payyavula et al. |
| 2021/0345952 A1 | 11/2021 | Harris et al. |
| 2021/0345953 A1 | 11/2021 | Shelton, IV et al. |
| 2021/0346015 A1 | 11/2021 | Krulevitch et al. |
| 2021/0350895 A1 | 11/2021 | Bakos et al. |
| 2021/0350896 A1 | 11/2021 | Shelton, IV et al. |
| 2021/0350897 A1 | 11/2021 | Shelton, IV et al. |
| 2021/0393338 A1 | 12/2021 | Graetzel et al. |
| 2022/0079424 A1 | 3/2022 | Street et al. |
| 2022/0095899 A1 | 3/2022 | Reed et al. |
| 2022/0175269 A1 | 6/2022 | Lu et al. |
| 2023/0094881 A1 | 3/2023 | Hassan et al. |
| 2023/0095002 A1 | 3/2023 | Shelton, IV et al. |
| 2023/0095278 A1 | 3/2023 | Shelton, IV et al. |
| 2023/0096268 A1 | 3/2023 | Shelton, IV et al. |
| 2023/0096715 A1 | 3/2023 | Shelton, IV et al. |
| 2023/0096880 A1 | 3/2023 | Shelton, IV et al. |
| 2023/0097151 A1 | 3/2023 | Shelton, IV et al. |
| 2023/0098538 A1 | 3/2023 | Shelton, IV et al. |
| 2023/0100415 A1 | 3/2023 | Shelton, IV |
| 2023/0100698 A1 | 3/2023 | Shelton, IV et al. |
| 2023/0101376 A1 | 3/2023 | Hassan et al. |
| 2023/0101750 A1 | 3/2023 | Shelton, IV et al. |
| 2023/0101757 A1 | 3/2023 | Hassan et al. |
| 2023/0103005 A1 | 3/2023 | Shelton, IV et al. |
| 2023/0105509 A1 | 4/2023 | Shelton et al. |
| 2023/0107005 A1 | 4/2023 | Shelton, IV |
| 2023/0107055 A1 | 4/2023 | Abreu |
| 2023/0107857 A1 | 4/2023 | Shelton, IV |
| 2023/0110791 A1 | 4/2023 | Shelton, IV et al. |
| 2023/0233272 A1 | 7/2023 | Kronman et al. |
| 2023/0404562 A1 | 12/2023 | Shelton, IV et al. |

FOREIGN PATENT DOCUMENTS

| | | |
|---|---|---|
| EP | 2425761 A1 | 3/2012 |
| EP | 2870920 A1 | 5/2015 |
| EP | 3275386 A1 | 1/2018 |
| EP | 3679851 A1 | 7/2020 |
| EP | 3845189 A2 | 7/2021 |
| WO | 2007081800 A2 | 7/2007 |
| WO | 2012033552 A1 | 3/2012 |
| WO | 2014151621 A1 | 9/2014 |
| WO | 2015140367 A1 | 9/2015 |
| WO | 2016168226 A1 | 10/2016 |
| WO | 2020018566 A1 | 1/2020 |
| WO | 2021181502 A1 | 9/2021 |

OTHER PUBLICATIONS

U.S. Appl. No. 17/449,767, filed Oct. 1, 2021, Surgical Anchoring Systems for Endoluminal Access.

(56) References Cited

OTHER PUBLICATIONS

U.S. Appl. No. 17/449,769, filed Oct. 1, 2021, Instrument Control Surgical Imaging Systems.
U.S. Appl. No. 17/449,770, filed Oct. 1, 2021, Instrument Control Imaging Systems for Visualization of Upcoming Surgical Procedure Steps.
U.S. Appl. No. 17/449,771, filed Oct. 1, 2021, Coordinated Instrument Control Systems.
U.S. Appl. No. 17/491,375, filed Sep. 30, 2021, Surgical Sealing Devices for a Natural Body Orifice.
U.S. Appl. No. 17/491,383, filed Sep. 30, 2021, Surgical Systems With Port Devices for Instrument Control.
U.S. Appl. No. 17/491,437, filed Sep. 30, 2021, Surgical Sealing Systems for Instrument Stabilization.
U.S. Appl. No. 17/493,526, filed Oct. 4, 2021, Surgical Systems With Devices for Both Intraluminal and Extraluminal Access.
U.S. Appl. No. 17/493,535, filed Oct. 4, 2021, Surgical Systems With Intraluminal and Extraluminal Cooperative Instruments.
U.S. Appl. No. 17/449,772, filed Oct. 1, 2021, Surgical Systems and Methods for Selectively Pressurizing a Natural Body Lumen.
Kurata et al. (2013) "Time-of-flight Near-infrared Spectroscopy for Nondestructive Measurement of Internal Quality in Grapefruit", Journal of the American Society for Horticultural Science, 138(3):225-228.
Lee et al. (Nov. 11-15, 2007) "Design of a Magnetic Field-Based Multi Degree-of-Freedom Orientation Sensor Using the Distributed-Multiple-Pole Model", IMECE2007-42106-Proceedings of IMECE2007, 2007 ASME International Mechanical Engineering Congress and Exposition, Seattle, Washington, USA, 6 pages.
International Search Report and Written Opinion for International Application No. PCT/IB2022/059103, mailed on Jan. 2, 2023, 16 pages.
Invitation To Pay Additional Fees for International Application No. PCT/IB2022/059079 mailed on Jan. 12, 2023, 12 pages.
Invitation To Pay Additional Fees for International Application No. PCT/IB2022/059080 mailed on Dec. 9, 2022, 16 pages.
International Search Report And Written Opinion For Patent Application No. PCT/IB2022/059079 mailed on Mar. 13, 2023, 17 pages.
International Search Report And Written Opinion For Patent Application No. PCT/IB2022/059082 mailed on Mar. 14, 2023, 24 pages.
U.S. Appl. No. 18/337,971, filed Jun. 20, 2023, Cooperative Access Hybrid Procedures.
Fu, Zuoming et al., "The Future of Endoscopic Navigation: A Review of Advanced Endoscopic Vision Technology", IEEE Access; vol. 9, Mar. 2021, 24 pages.
International Search Report and Written Opinion, received for PCT Application No. PCT/IB2022/059106, mailed on Dec. 15, 2022, 18 pages.
International Search Report and Written Opinion, received for PCT Application No. PCT/IB2022/059080, mailed on Feb. 24, 2023 24 pages.
International Search Report and Written Opinion, received for PCT Application No. PCT/IB2022/059101, mailed on Dec. 16, 2022, 20 pages.
International Search Report and Written Opinion, received for PCT Application No. PCT/IB2022/059109, mailed on Mar. 15, 2023, 20 pages.
International Search Report and Written Opinion, received for PCT Application No. PCT/IB2022/059112, mailed on Dec. 14, 2022, 16 pages.
International Search Report and Written Opinion, received for PCT Application No. PCT/IB2022/059102, mailed on Dec. 22, 2022, 15 pages.
Invitation to Pay Additional Fees received, for PCT Application No. PCT/IB2022/059109, mailed on Jan. 3, 2023, 10 pages.
Invitation to Pay Additional Fees, received for PCT Application No. PCT/IB2022/059082, mailed on Dec. 9, 2022, 16 pages.

* cited by examiner

SURGICAL SYSTEMS FOR INDEPENDENTLY INSUFFLATING TWO SEPARATE ANATOMIC SPACES

CROSS-REFERENCE TO RELATED APPLICATIONS

This application claims priority to U.S. Provisional Patent Application No. 63/249,980 filed on Sep. 29, 2021, and entitled "Cooperative Access," the disclosure of which is incorporated herein by reference in its entirety.

FIELD

The present invention relates generally to surgical systems and methods of using the same for anchoring, cooperative endoscopic and laparoscopic access and tissue manipulation, etc.

BACKGROUND

Surgical systems often incorporate an imaging system, which can allow medical practitioners to view a surgical site and/or one or more portions thereof on one or more displays, (e.g., a monitor, a computer tablet screen, etc.). The display(s) can be local and/or remote to a surgical theater. The imaging system can include a scope with a camera that views the surgical site and transmits the view to the one or more displays viewable by medical practitioner(s).

Imaging systems can be limited by the information that they are able to recognize and/or convey to the medical practitioner(s). For example, certain concealed structures, physical contours, and/or dimensions within a three-dimensional space may be unrecognizable intraoperatively by certain imaging systems. For another example, certain imaging systems may be incapable of communicating and/or conveying certain information to the medical practitioner(s) intraoperatively.

Accordingly, there remains a need for improved surgical imaging.

SUMMARY

Surgical systems are provided. In one exemplary embodiment, a surgical system includes a first scope device, a first instrument, a second scope device, and a second instrument. The first scope device has a first portion configured to be inserted into and positioned within an extraluminal anatomical space and a second portion distal to the first portion and configured to be positioned within an intraluminal anatomical space. The first scope device includes a first insufflation port operatively coupled to the second portion of the first scope device and configured to insufflate the intraluminal anatomical space into a first insufflated space. The first instrument is configured to be inserted into and through the extraluminal anatomical space and into the intraluminal anatomical space such that the first instrument is present in both the extraluminal and intraluminal anatomical spaces. The second scope device is configured to be inserted into the extraluminal anatomical space. The second scope device has a second insufflation port operatively coupled to the second scope device and configured to insufflate the extraluminal anatomical space into a second insufflated space. The second instrument is configured to be inserted into the extraluminal anatomical space.

In some embodiments, a sealing port can be arranged in a tissue wall separating the extraluminal anatomical space from the intraluminal anatomical space. The sealing port can be configured to allow the second portion of the first scope to pass into the intraluminal anatomical space.

The first and second instruments can have a variety of configurations. In some embodiments, the first scope device can be configured to create a seal in the intraluminal anatomical space. In certain embodiments, the second instrument can be configured to create a seal in the intraluminal anatomical space while within the extraluminal anatomical space.

In some embodiments, an imaging system can be arranged on the second portion of the first scope device and can be configured to transmit image data of a scene within a field of view of the first scope device. In certain embodiments, an imaging system can be arranged on the second scope device and can be configured to transmit image data of a scene within a field of view of the second scope device.

In some embodiments, the first insufflated space can be pressurized to a first pressure and the second insufflated space can be pressurized to a second pressure, in which the first pressure is different than the second pressure.

The first scope device can have a variety of configurations. In some embodiments, the first scope device can include a flexible body with a working channel extending therethrough and can be configured to allow a distal end of the first instrument to be inserted into and through the extraluminal anatomical space and into the anatomical intraluminal space such that the first instrument is present in both the extraluminal and intraluminal anatomical spaces.

Methods are also provided. In one exemplary embodiment, a method includes inserting a first portion of a first scope device into an extraluminal anatomical space, inserting a second portion of the first scope device, distal to the first portion, into an intraluminal anatomical space, the first scope device having a first insufflation port, inserting a first instrument through the extraluminal anatomical space and into the intraluminal anatomical space such that the first instrument is present in both the extraluminal and intraluminal anatomical spaces, inserting a second scope device into the extraluminal anatomical space, the second scope device having a second insufflation port, inserting a second instrument into the extraluminal anatomical space, insufflating the extraluminal anatomical space to a first pressure through the second insufflation port of the second scope device, and insufflating the intraluminal space to a second pressure through the first insufflation port of the first scope device.

In some embodiments, the method includes passing the second portion of the first scope device to into the intraluminal anatomical space through a sealing port placed within a tissue wall separating the extraluminal anatomical space from the intraluminal space. In such embodiments, the method can include inserting the second portion of the first scope device through the sealing port and into the intraluminal anatomical space.

In some embodiments, the first pressure amount can be different than the second pressure amount.

In some embodiments, the method can include transmitting image data of a scene within a field of view of the first scope device via an imaging system arranged on the second portion of the first scope device. In certain embodiments, the method can include transmitting image data of a scene within a field of view of the second scope device via an imaging system arranged on the second scope device.

In some embodiments, the method can include inserting a distal end of the first instrument into and through a working channel of a flexible body of the first scope device such that the first instrument is present in both the extraluminal and intraluminal anatomical spaces. In such embodiments, the method can include removing the first instrument from the working channel while the second portion of the first scope device is positioned within the intraluminal anatomical space. In such embodiments, the method can include arranging a third instrument within the working channel while the second portion of the first scope device is positioned within the intraluminal anatomical space.

In some embodiments, the method can include manipulating a tissue wall at least partially defining the intraluminal anatomical space via the second instrument.

In some embodiments, the method can include enlarging a working volume within the extraluminal anatomical space by depressurizing the intraluminal anatomical space through the second insufflation port.

BRIEF DESCRIPTION OF DRAWINGS

The present invention is described by way of reference to the accompanying figures which are as follows.

DETAILED DESCRIPTION

Figure 1:
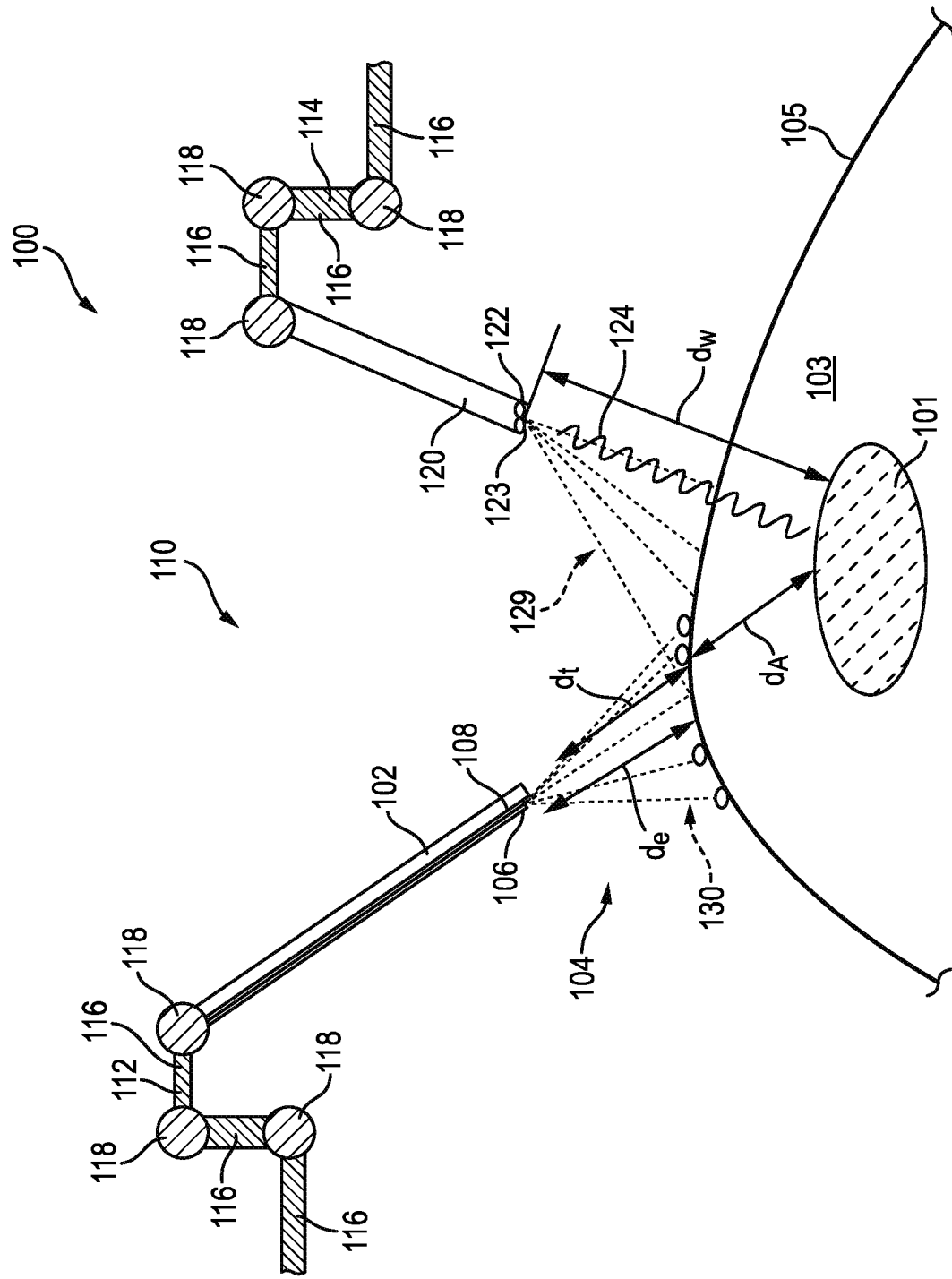
FIG. 1 is a schematic view of one embodiment of a surgical visualization system.

Certain exemplary embodiments will now be described to provide an overall understanding of the principles of the structure, function, manufacture, and use of the devices, systems, and methods disclosed herein. One or more examples of these embodiments are illustrated in the accompanying drawings. A person skilled in the art will understand that the devices, systems, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. A person skilled in the art will appreciate that a dimension may not be a precise value but nevertheless be considered to be at about that value due to any number of factors such as manufacturing tolerances and sensitivity of measurement equipment. Sizes and shapes of the systems and devices, and the components thereof, can depend at least on the size and shape of components with which the systems and devices will be used.

Surgical Visualization

In general, a surgical visualization system is configured to leverage "digital surgery" to obtain additional information about a patient's anatomy and/or a surgical procedure. The surgical visualization system is further configured to convey data to one or more medical practitioners in a helpful manner. Various aspects of the present disclosure provide improved visualization of the patient's anatomy and/or the surgical procedure, and/or use visualization to provide improved control of a surgical tool (also referred to herein as a "surgical device" or a "surgical instrument").

"Digital surgery" can embrace robotic systems, advanced imaging, advanced instrumentation, artificial intelligence, machine learning, data analytics for performance tracking and benchmarking, connectivity both inside and outside of the operating room (OR), and more. Although various surgical visualization systems described herein can be used in combination with a robotic surgical system, surgical visualization systems are not limited to use with a robotic surgical system. In certain instances, surgical visualization using a surgical visualization system can occur without robotics and/or with limited and/or optional robotic assistance. Similarly, digital surgery can occur without robotics and/or with limited and/or optional robotic assistance.

In certain instances, a surgical system that incorporates a surgical visualization system may enable smart dissection in order to identify and avoid critical structures. Critical structures include anatomical structures such as a ureter, an artery such as a superior mesenteric artery, a vein such as a portal vein, a nerve such as a phrenic nerve, and/or a tumor, among other anatomical structures. In other instances, a critical structure can be a foreign structure in the anatomical field, such as a surgical device, a surgical fastener, a clip, a tack, a bougie, a band, a plate, and other foreign structures. Critical structures can be determined on a patient-by-patient and/or a procedure-by-procedure basis. Smart dissection technology may provide, for example, improved intraoperative guidance for dissection and/or may enable smarter decisions with critical anatomy detection and avoidance technology.

A surgical system incorporating a surgical visualization system may enable smart anastomosis technologies that provide more consistent anastomoses at optimal location(s) with improved workflow. Cancer localization technologies may be improved with a surgical visualization platform. For example, cancer localization technologies can identify and track a cancer location, orientation, and its margins. In certain instances, the cancer localization technologies may compensate for movement of a surgical instrument, a patient, and/or the patient's anatomy during a surgical procedure in order to provide guidance back to the point of interest for medical practitioner(s).

A surgical visualization system may provide improved tissue characterization and/or lymph node diagnostics and mapping. For example, tissue characterization technologies may characterize tissue type and health without the need for physical haptics, especially when dissecting and/or placing stapling devices within the tissue. Certain tissue characterization technologies may be utilized without ionizing radiation and/or contrast agents. With respect to lymph node diagnostics and mapping, a surgical visualization platform may, for example, preoperatively locate, map, and ideally diagnose the lymph system and/or lymph nodes involved in cancerous diagnosis and staging.

During a surgical procedure, information available to a medical practitioner via the "naked eye" and/or an imaging system may provide an incomplete view of the surgical site. For example, certain structures, such as structures embedded or buried within an organ, can be at least partially concealed or hidden from view. Additionally, certain dimensions and/or relative distances can be difficult to ascertain with existing sensor systems and/or difficult for the "naked eye" to perceive. Moreover, certain structures can move pre-operatively (e.g., before a surgical procedure but after a preoperative scan) and/or intraoperatively. In such instances, the medical practitioner can be unable to accurately determine the location of a critical structure intraoperatively.

When the position of a critical structure is uncertain and/or when the proximity between the critical structure and a surgical tool is unknown, a medical practitioner's decision-making process can be inhibited. For example, a medical practitioner may avoid certain areas in order to avoid inadvertent dissection of a critical structure; however, the avoided area may be unnecessarily large and/or at least partially misplaced. Due to uncertainty and/or overly/excessive exercises in caution, the medical practitioner may not access certain desired regions. For example, excess caution may cause a medical practitioner to leave a portion of a tumor and/or other undesirable tissue in an effort to avoid a critical structure even if the critical structure is not in the particular area and/or would not be negatively impacted by the medical practitioner working in that particular area. In certain instances, surgical results can be improved with increased knowledge and/or certainty, which can allow a surgeon to be more accurate and, in certain instances, less conservative/more aggressive with respect to particular anatomical areas.

A surgical visualization system can allow for intraoperative identification and avoidance of critical structures. The surgical visualization system may thus enable enhanced intraoperative decision making and improved surgical outcomes. The surgical visualization system can provide advanced visualization capabilities beyond what a medical practitioner sees with the "naked eye" and/or beyond what an imaging system can recognize and/or convey to the medical practitioner. The surgical visualization system can augment and enhance what a medical practitioner is able to know prior to tissue treatment (e.g., dissection, etc.) and, thus, may improve outcomes in various instances. As a result, the medical practitioner can confidently maintain momentum throughout the surgical procedure knowing that the surgical visualization system is tracking a critical structure, which may be approached during dissection, for example. The surgical visualization system can provide an indication to the medical practitioner in sufficient time for the medical practitioner to pause and/or slow down the surgical procedure and evaluate the proximity to the critical structure to prevent inadvertent damage thereto. The surgical visualization system can provide an ideal, optimized, and/or customizable amount of information to the medical practitioner to allow the medical practitioner to move confidently and/or quickly through tissue while avoiding inadvertent damage to healthy tissue and/or critical structure(s) and, thus, to minimize the risk of harm resulting from the surgical procedure.

Surgical visualization systems are described in detail below. In general, a surgical visualization system can include a first light emitter configured to emit a plurality of spectral waves, a second light emitter configured to emit a light pattern, and a receiver, or sensor, configured to detect visible light, molecular responses to the spectral waves (spectral imaging), and/or the light pattern. The surgical visualization system can also include an imaging system and a control circuit in signal communication with the receiver and the imaging system. Based on output from the receiver, the control circuit can determine a geometric surface map, e.g., three-dimensional surface topography, of the visible surfaces at the surgical site and a distance with respect to the surgical site, such as a distance to an at least partially concealed structure. The imaging system can convey the geometric surface map and the distance to a medical practitioner. In such instances, an augmented view of the surgical site provided to the medical practitioner can provide a representation of the concealed structure within the relevant context of the surgical site. For example, the imaging system can virtually augment the concealed structure on the geometric surface map of the concealing and/or obstructing tissue similar to a line drawn on the ground to indicate a utility line below the surface. Additionally or alternatively, the imaging system can convey the proximity of a surgical tool to the visible and obstructing tissue and/or to the at least partially concealed structure and/or a depth of the concealed structure below the visible surface of the obstructing tissue. For example, the visualization system can determine a distance with respect to the augmented line on the surface of the visible tissue and convey the distance to the imaging system.

Throughout the present disclosure, any reference to "light," unless specifically in reference to visible light, can include electromagnetic radiation (EMR) or photons in the visible and/or non-visible portions of the EMR wavelength spectrum. The visible spectrum, sometimes referred to as the optical spectrum or luminous spectrum, is that portion of the electromagnetic spectrum that is visible to (e.g., can be detected by) the human eye and may be referred to as "visible light" or simply "light." A typical human eye will respond to wavelengths in air that are from about 380 nm to about 750 nm. The invisible spectrum (e.g., the non-luminous spectrum) is that portion of the electromagnetic spectrum that lies below and above the visible spectrum. The invisible spectrum is not detectable by the human eye. Wavelengths greater than about 750 nm are longer than the red visible spectrum, and they become invisible infrared (IR), microwave, and radio electromagnetic radiation. Wavelengths less than about 380 nm are shorter than the violet spectrum, and they become invisible ultraviolet, x-ray, and gamma ray electromagnetic radiation.

FIG. 1 illustrates one embodiment of a surgical visualization system 100. The surgical visualization system 100 is configured to create a visual representation of a critical structure 101 within an anatomical field. The critical structure 101 can include a single critical structure or a plurality of critical structures. As discussed herein, the critical structure 101 can be any of a variety of structures, such as an anatomical structure, e.g., a ureter, an artery such as a superior mesenteric artery, a vein such as a portal vein, a nerve such as a phrenic nerve, a vessel, a tumor, or other anatomical structure, or a foreign structure, e.g., a surgical device, a surgical fastener, a surgical clip, a surgical tack, a bougie, a surgical band, a surgical plate, or other foreign structure. As discussed herein, the critical structure 101 can be identified on a patient-by-patient and/or a procedure-by-procedure basis. Embodiments of critical structures and of identifying critical structures using a visualization system are further described in U.S. Pat. No. 10,792,034 entitled "Visualization Of Surgical Devices" issued Oct. 6, 2020, which is hereby incorporated by reference in its entirety.

In some instances, the critical structure 101 can be embedded in tissue 103. The tissue 103 can be any of a variety of tissues, such as fat, connective tissue, adhesions, and/or organs. Stated differently, the critical structure 101 may be positioned below a surface 105 of the tissue 103. In such instances, the tissue 103 conceals the critical structure 101 from the medical practitioner's "naked eye" view. The tissue 103 also obscures the critical structure 101 from the view of an imaging device 120 of the surgical visualization system 100. Instead of being fully obscured, the critical structure 101 can be partially obscured from the view of the medical practitioner and/or the imaging device 120.

The surgical visualization system 100 can be used for clinical analysis and/or medical intervention. In certain instances, the surgical visualization system 100 can be used intraoperatively to provide real-time information to the medical practitioner during a surgical procedure, such as real-time information regarding proximity data, dimensions, and/or distances. A person skilled in the art will appreciate that information may not be precisely real time but nevertheless be considered to be real time for any of a variety of reasons, such as time delay induced by data transmission, time delay induced by data processing, and/or sensitivity of measurement equipment. The surgical visualization system 100 is configured for intraoperative identification of critical structure(s) and/or to facilitate the avoidance of the critical structure(s) 101 by a surgical device. For example, by identifying the critical structure 101, a medical practitioner can avoid maneuvering a surgical device around the critical structure 101 and/or a region in a predefined proximity of the critical structure 101 during a surgical procedure. For another example, by identifying the critical structure 101, a medical practitioner can avoid dissection of and/or near the critical structure 101, thereby helping to prevent damage to the critical structure 101 and/or helping to prevent a surgical device being used by the medical practitioner from being damaged by the critical structure 101.

The surgical visualization system 100 is configured to incorporate tissue identification and geometric surface mapping in combination with the surgical visualization system's distance sensor system 104. In combination, these features of the surgical visualization system 100 can determine a position of a critical structure 101 within the anatomical field and/or the proximity of a surgical device 102 to the surface 105 of visible tissue 103 and/or to the critical structure 101. Moreover, the surgical visualization system 100 includes an imaging system that includes the imaging device 120 configured to provide real-time views of the surgical site. The imaging device 120 can include, for example, a spectral camera (e.g., a hyperspectral camera, multispectral camera, or selective spectral camera), which is configured to detect reflected spectral waveforms and generate a spectral cube of images based on the molecular response to the different wavelengths. Views from the imaging device 120 can be provided in real time to a medical practitioner, such as on a display (e.g., a monitor, a computer tablet screen, etc.). The displayed views can be augmented with additional information based on the tissue identification, landscape mapping, and the distance sensor system 104. In such instances, the surgical visualization system 100 includes a plurality of subsystems—an imaging subsystem, a surface mapping subsystem, a tissue identification subsystem, and/or a distance determining subsystem. These subsystems can cooperate to intra-operatively provide advanced data synthesis and integrated information to the medical practitioner.

The imaging device 120 can be configured to detect visible light, spectral light waves (visible or invisible), and a structured light pattern (visible or invisible). Examples of the imaging device 120 includes scopes, e.g., an endoscope, an arthroscope, an angioscope, a bronchoscope, a choledochoscope, a colonoscope, a cytoscope, a duodenoscope, an enteroscope, an esophagogastro-duodenoscope (gastroscope), a laryngoscope, a nasopharyngo-neproscope, a sigmoidoscope, a thoracoscope, an ureteroscope, or an exoscope. Scopes can be particularly useful in minimally invasive surgical procedures. In open surgery applications, the imaging device 120 may not include a scope.

The tissue identification subsystem can be achieved with a spectral imaging system. The spectral imaging system can rely on imaging such as hyperspectral imaging, multispectral imaging, or selective spectral imaging. Embodiments of hyperspectral imaging of tissue are further described in U.S. Pat. No. 9,274,047 entitled "System And Method For Gross Anatomic Pathology Using Hyperspectral Imaging" issued Mar. 1, 2016, which is hereby incorporated by reference in its entirety.

The surface mapping subsystem can be achieved with a light pattern system. Various surface mapping techniques using a light pattern (or structured light) for surface mapping can be utilized in the surgical visualization systems described herein. Structured light is the process of projecting a known pattern (often a grid or horizontal bars) on to a surface. In certain instances, invisible (or imperceptible) structured light can be utilized, in which the structured light is used without interfering with other computer vision tasks for which the projected pattern may be confusing. For example, infrared light or extremely fast frame rates of visible light that alternate between two exact opposite patterns can be utilized to prevent interference. Embodiments of surface mapping and a surgical system including a light source and a projector for projecting a light pattern are further described in U.S. Pat. Pub. No. 2017/0055819 entitled "Set Comprising A Surgical Instrument" published Mar. 2, 2017, U.S. Pat. Pub. No. 2017/0251900 entitled "Depiction System" published Sep. 7, 2017, and U.S. patent application Ser. No. 16/729,751 entitled "Surgical Systems For Generating Three Dimensional Constructs Of Anatomical Organs And Coupling Identified Anatomical Structures Thereto" filed Dec. 30, 2019, which are hereby incorporated by reference in their entireties.

The distance determining system can be incorporated into the surface mapping system. For example, structured light can be utilized to generate a three-dimensional (3D) virtual model of the visible surface 105 and determine various distances with respect to the visible surface 105. Additionally or alternatively, the distance determining system can rely on time-of-flight measurements to determine one or more distances to the identified tissue (or other structures) at the surgical site.

The surgical visualization system 100 also includes a surgical device 102. The surgical device 102 can be any suitable surgical device. Examples of the surgical device 102 includes a surgical dissector, a surgical stapler, a surgical grasper, a clip applier, a smoke evacuator, a surgical energy device (e.g., mono-polar probes, bi-polar probes, ablation probes, an ultrasound device, an ultrasonic end effector, etc.), etc. In some embodiments, the surgical device 102 includes an end effector having opposing jaws that extend from a distal end of a shaft of the surgical device 102 and that are configured to engage tissue therebetween.

The surgical visualization system 100 can be configured to identify the critical structure 101 and a proximity of the surgical device 102 to the critical structure 101. The imaging device 120 of the surgical visualization system 100 is configured to detect light at various wavelengths, such as visible light, spectral light waves (visible or invisible), and a structured light pattern (visible or invisible). The imaging device 120 can include a plurality of lenses, sensors, and/or receivers for detecting the different signals. For example, the imaging device 120 can be a hyperspectral, multispectral, or selective spectral camera, as described herein. The imaging device 120 can include a waveform sensor 122 (such as a spectral image sensor, detector, and/or three-dimensional camera lens). For example, the imaging device 120 can include a right-side lens and a left-side lens used together to record two two-dimensional images at the same time and, thus, generate a three-dimensional (3D) image of the surgical site, render a three-dimensional image of the surgical site, and/or determine one or more distances at the surgical site. Additionally or alternatively, the imaging device 120 can be configured to receive images indicative of the topography of the visible tissue and the identification and position of hidden critical structures, as further described herein. For example, a field of view of the imaging device 120 can overlap with a pattern of light (structured light) on the surface 105 of the tissue 103, as shown in FIG. 1.

As in this illustrated embodiment, the surgical visualization system 100 can be incorporated into a robotic surgical system 110. The robotic surgical system 110 can have a variety of configurations, as discussed herein. In this illustrated embodiment, the robotic surgical system 110 includes a first robotic arm 112 and a second robotic arm 114. The robotic arms 112, 114 each include rigid structural members 116 and joints 118, which can include servomotor controls. The first robotic arm 112 is configured to maneuver the surgical device 102, and the second robotic arm 114 is configured to maneuver the imaging device 120. A robotic control unit of the robotic surgical system 110 is configured to issue control motions to the first and second robotic arms 112, 114, which can affect the surgical device 102 and the imaging device 120, respectively.

In some embodiments, one or more of the robotic arms 112, 114 can be separate from the main robotic system 110 used in the surgical procedure. For example, at least one of the robotic arms 112, 114 can be positioned and registered to a particular coordinate system without a servomotor control. For example, a closed-loop control system and/or a plurality of sensors for the robotic arms 112, 114 can control and/or register the position of the robotic arm(s) 112, 114 relative to the particular coordinate system. Similarly, the position of the surgical device 102 and the imaging device 120 can be registered relative to a particular coordinate system.

Examples of robotic surgical systems include the Ottava™ robotic-assisted surgery system (Johnson & Johnson of New Brunswick, NJ), da Vinci® surgical systems (Intuitive Surgical, Inc. of Sunnyvale, CA), the Hugo™ robotic-assisted surgery system (Medtronic PLC of Minneapolis, MN), the Versius® surgical robotic system (CMR Surgical Ltd of Cambridge, UK), and the Monarch® platform (Auris Health, Inc. of Redwood City, CA). Embodiments of various robotic surgical systems and using robotic surgical systems are further described in U.S. Pat. Pub. No. 2018/0177556 entitled "Flexible Instrument Insertion Using An Adaptive Force Threshold" filed Dec. 28, 2016, U.S. Pat. Pub. No. 2020/0000530 entitled "Systems And Techniques For Providing Multiple Perspectives During Medical Procedures" filed Apr. 16, 2019, U.S. Pat. Pub. No. 2020/0170720 entitled "Image-Based Branch Detection And Mapping For Navigation" filed Feb. 7, 2020, U.S. Pat. Pub. No. 2020/0188043 entitled "Surgical Robotics System" filed Dec. 9, 2019, U.S. Pat. Pub. No. 2020/0085516 entitled "Systems And Methods For Concomitant Medical Procedures" filed Sep. 3, 2019, U.S. Pat. No. 8,831,782 entitled "Patient-Side Surgeon Interface For A Teleoperated Surgical Instrument" filed Jul. 15, 2013, and Intl. Pat. Pub. No. WO 2014151621 entitled "Hyperdexterous Surgical System" filed Mar. 13, 2014, which are hereby incorporated by reference in their entireties.

The surgical visualization system 100 also includes an emitter 106. The emitter 106 is configured to emit a pattern of light, such as stripes, grid lines, and/or dots, to enable the determination of the topography or landscape of the surface 105. For example, projected light arrays 130 can be used for three-dimensional scanning and registration on the surface 105. The projected light arrays 130 can be emitted from the emitter 106 located on the surgical device 102 and/or one of the robotic arms 112, 114 and/or the imaging device 120. In one aspect, the projected light array 130 is employed by the surgical visualization system 100 to determine the shape defined by the surface 105 of the tissue 103 and/or motion of the surface 105 intraoperatively. The imaging device 120 is configured to detect the projected light arrays 130 reflected from the surface 105 to determine the topography of the surface 105 and various distances with respect to the surface 105.

As in this illustrated embodiment, the imaging device 120 can include an optical waveform emitter 123, such as by being mounted on or otherwise attached on the imaging device 120. The optical waveform emitter 123 is configured to emit electromagnetic radiation 124 (near-infrared (NIR) photons) that can penetrate the surface 105 of the tissue 103 and reach the critical structure 101. The imaging device 120 and the optical waveform emitter 123 can be positionable by the robotic arm 114. The optical waveform emitter 123 is mounted on or otherwise on the imaging device 122 but in other embodiments can be positioned on a separate surgical device from the imaging device 120. A corresponding waveform sensor 122 (e.g., an image sensor, spectrometer, or vibrational sensor) of the imaging device 120 is configured to detect the effect of the electromagnetic radiation received by the waveform sensor 122. The wavelengths of the electromagnetic radiation 124 emitted by the optical waveform emitter 123 are configured to enable the identification of the type of anatomical and/or physical structure, such as the critical structure 101. The identification of the critical structure 101 can be accomplished through spectral analysis, photo-acoustics, and/or ultrasound, for example. In one aspect, the wavelengths of the electromagnetic radiation 124 can be variable. The waveform sensor 122 and optical waveform emitter 123 can be inclusive of a multispectral imaging system and/or a selective spectral imaging system, for example. In other instances, the waveform sensor 122 and optical waveform emitter 123 can be inclusive of a photoacoustic imaging system, for example.

The distance sensor system 104 of the surgical visualization system 100 is configured to determine one or more distances at the surgical site. The distance sensor system 104 can be a time-of-flight distance sensor system that includes an emitter, such as the emitter 106 as in this illustrated embodiment, and that includes a receiver 108. In other instances, the time-of-flight emitter can be separate from the structured light emitter. The emitter 106 can include a very tiny laser source, and the receiver 108 can include a matching sensor. The distance sensor system 104 is configured to detect the "time of flight," or how long the laser light emitted by the emitter 106 has taken to bounce back to the sensor portion of the receiver 108. Use of a very narrow light source in the emitter 106 enables the distance sensor system 104 to determining the distance to the surface 105 of the tissue 103 directly in front of the distance sensor system 104.

The receiver 108 of the distance sensor system 104 is positioned on the surgical device 102 in this illustrated embodiment, but in other embodiments the receiver 108 can be mounted on a separate surgical device instead of the surgical device 102. For example, the receiver 108 can be mounted on a cannula or trocar through which the surgical device 102 extends to reach the surgical site. In still other embodiments, the receiver 108 for the distance sensor system 104 can be mounted on a separate robotically-controlled arm of the robotic system 110 (e.g., on the second robotic arm 114) than the first robotic arm 112 to which the surgical device 102 is coupled, can be mounted on a movable arm that is operated by another robot, or be mounted to an operating room (OR) table or fixture. In some embodiments, the imaging device 120 includes the receiver 108 to allow for determining the distance from the emitter 106 to the surface 105 of the tissue 103 using a line between the emitter 106 on the surgical device 102 and the imaging device 120. For example, the distance $d_e$ can be triangulated based on known positions of the emitter 106 (on the surgical device 102) and the receiver 108 (on the imaging device 120) of the distance sensor system 104. The three-dimensional position of the receiver 108 can be known and/or registered to the robot coordinate plane intraoperatively.

As in this illustrated embodiment, the position of the emitter 106 of the distance sensor system 104 can be controlled by the first robotic arm 112, and the position of the receiver 108 of the distance sensor system 104 can be controlled by the second robotic arm 114. In other embodiments, the surgical visualization system 100 can be utilized apart from a robotic system. In such instances, the distance sensor system 104 can be independent of the robotic system.

In FIG. 1, $d_e$ is emitter-to-tissue distance from the emitter 106 to the surface 105 of the tissue 103, and $d_t$ is device-to-tissue distance from a distal end of the surgical device 102 to the surface 105 of the tissue 103. The distance sensor system 104 is configured to determine the emitter-to-tissue distance $d_e$. The device-to-tissue distance $d_t$ is obtainable from the known position of the emitter 106 on the surgical device 102, e.g., on a shaft thereof proximal to the surgical device's distal end, relative to the distal end of the surgical device 102. In other words, when the distance between the emitter 106 and the distal end of the surgical device 102 is known, the device-to-tissue distance $d_t$ can be determined from the emitter-to-tissue distance $d_e$. In some embodiments, the shaft of the surgical device 102 can include one or more articulation joints and can be articulatable with respect to the emitter 106 and jaws at the distal end of the surgical device 102. The articulation configuration can include a multi-joint vertebrae-like structure, for example. In some embodiments, a three-dimensional camera can be utilized to triangulate one or more distances to the surface 105.

In FIG. 1, $d_w$ is camera-to-critical structure distance from the optical waveform emitter 123 located on the imaging device 120 to the surface of the critical structure 101, and $d_A$ is a depth of the critical structure 101 below the surface 105 of the tissue 103 (e.g., the distance between the portion of the surface 105 closest to the surgical device 102 and the critical structure 101). The time-of-flight of the optical waveforms emitted from the optical waveform emitter 123 located on the imaging device 120 are configured to determine the camera-to-critical structure distance $d_w$.

Figure 2:
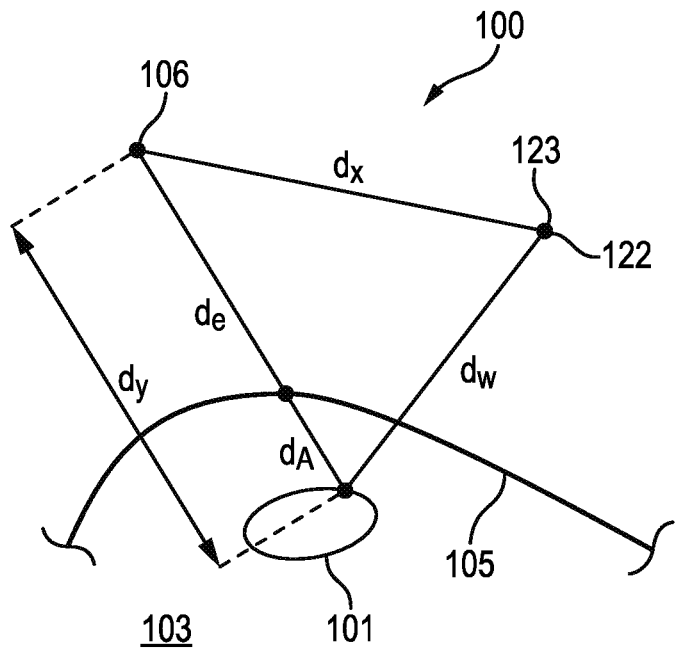
FIG. 2 is a schematic view of triangularization between a surgical device, an imaging device, and a critical structure of FIG. 1.

As shown in FIG. 2, the depth $d_A$ of the critical structure 101 relative to the surface 105 of the tissue 103 can be determined by triangulating from the distance $d_w$ and known positions of the emitter 106 on the surgical device 102 and the optical waveform emitter 123 on the imaging device 120 (and, thus, the known distance $d_x$ therebetween) to determine the distance $d_y$, which is the sum of the distances $d_e$ and $d_A$. Additionally or alternatively, time-of-flight from the optical waveform emitter 123 can be configured to determine the distance from the optical waveform emitter 123 to the surface 105 of the tissue 103. For example, a first waveform (or range of waveforms) can be utilized to determine the camera-to-critical structure distance $d_w$ and a second waveform (or range of waveforms) can be utilized to determine the distance to the surface 105 of the tissue 103. In such instances, the different waveforms can be utilized to determine the depth of the critical structure 101 below the surface 105 of the tissue 103.

Additionally or alternatively, the distance $d_A$ can be determined from an ultrasound, a registered magnetic resonance imaging (MRI), or computerized tomography (CT) scan. In still other instances, the distance $d_A$ can be determined with spectral imaging because the detection signal received by the imaging device 120 can vary based on the type of material, e.g., type of the tissue 103. For example, fat can decrease the detection signal in a first way, or a first amount, and collagen can decrease the detection signal in a different, second way, or a second amount.

Figure 3:
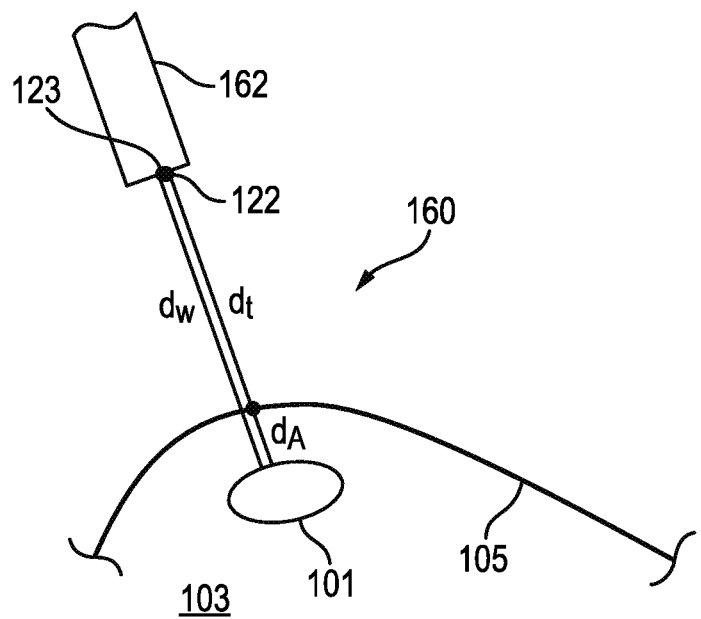
FIG. 3 is a schematic view of another embodiment of a surgical visualization system.

In another embodiment of a surgical visualization system 160 illustrated in FIG. 3, a surgical device 162, and not the imaging device 120, includes the optical waveform emitter 123 and the waveform sensor 122 that is configured to detect the reflected waveforms. The optical waveform emitter 123 is configured to emit waveforms for determining the distances $d_t$ and $d_w$ from a common device, such as the surgical device 162, as described herein. In such instances, the distance $d_A$ from the surface 105 of the tissue 103 to the surface of the critical structure 101 can be determined as follows:

$$d_A = d_w - d_t$$

Figure 4:
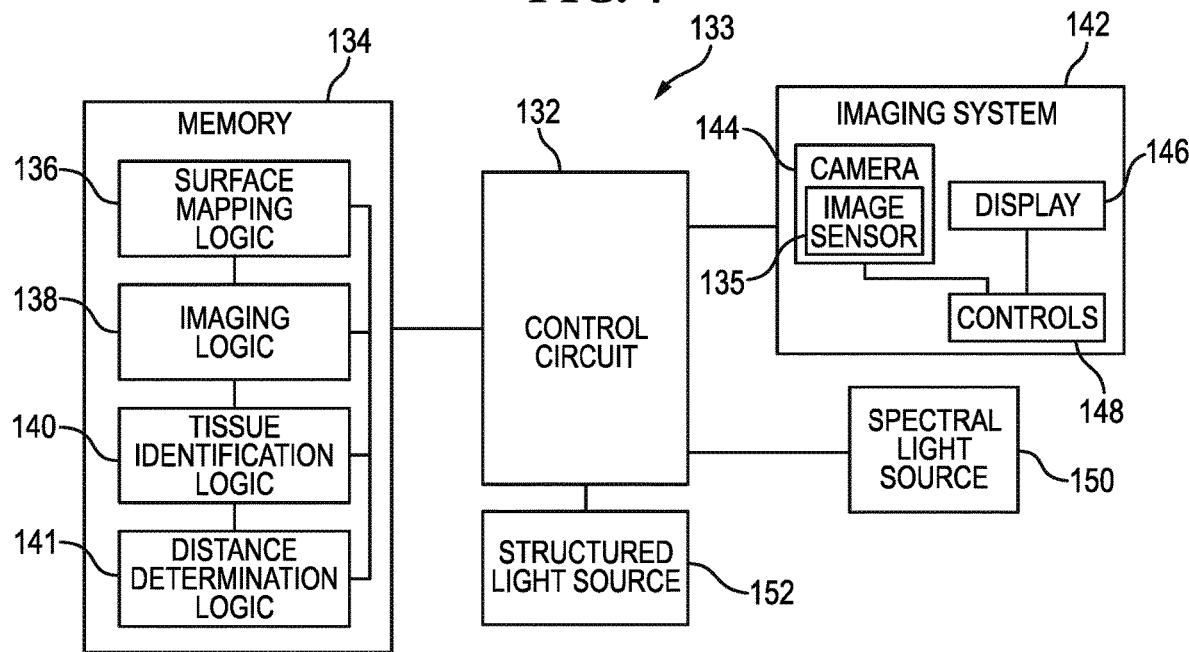
FIG. 4 is a schematic view of one embodiment of a control system for a surgical visualization system.

The surgical visualization system 100 includes a control system configured to control various aspects of the surgical visualization system 100. FIG. 4 illustrates one embodiment of a control system 133 that can be utilized as the control system of the surgical visualization system 100 (or other surgical visualization system described herein). The control system 133 includes a control circuit 132 configured to be in signal communication with a memory 134. The memory 134 is configured to store instructions executable by the control circuit 132, such as instructions to determine and/or recognize critical structures (e.g., the critical structure 101 of FIG. 1), instructions to determine and/or compute one or more distances and/or three-dimensional digital representations, and instructions to communicate information to a medical practitioner. As in this illustrated embodiment, the memory 134 can store surface mapping logic 136, imaging logic 138, tissue identification logic 140, and distance determining logic 141, although the memory 134 can store any combinations of the logics 136, 138, 140, 141 and/or can combine various logics together. The control system 133 also includes an imaging system 142 including a camera 144 (e.g., the imaging system including the imaging device 120 of FIG. 1), a display 146 (e.g., a monitor, a computer tablet screen, etc.), and controls 148 of the camera 144 and the display 146. The camera 144 includes an image sensor 135 (e.g., the waveform sensor 122) configured to receive signals from various light sources emitting light at various visible and invisible spectra (e.g., visible light, spectral imagers, three-dimensional lens, etc.). The display 146 is configured to depict real, virtual, and/or virtually-augmented images and/or information to a medical practitioner.

In an exemplary embodiment, the image sensor 135 is a solid-state electronic device containing up to millions of discrete photodetector sites called pixels. The image sensor 135 technology falls into one of two categories: Charge-Coupled Device (CCD) and Complementary Metal Oxide Semiconductor (CMOS) imagers and more recently, short-wave infrared (SWIR) is an emerging technology in imaging. Another type of the image sensor 135 employs a hybrid CCD/CMOS architecture (sold under the name "sCMOS") and consists of CMOS readout integrated circuits (ROICs) that are bump bonded to a CCD imaging substrate. CCD and CMOS image sensors 135 are sensitive to wavelengths in a range of about 350 nm to about 1050 nm, such as in a range of about 400 nm to about 1000 nm. A person skilled in the art will appreciate that a value may not be precisely at a value but nevertheless considered to be about that value for any of a variety of reasons, such as sensitivity of measurement equipment and manufacturing tolerances. CMOS sensors are, in general, more sensitive to IR wavelengths than CCD sensors. Solid state image sensors 135 are based on the photoelectric effect and, as a result, cannot distinguish between colors. Accordingly, there are two types of color CCD cameras: single chip and three-chip. Single chip color CCD cameras offer a common, low-cost imaging solution and use a mosaic (e.g., Bayer) optical filter to separate incoming light into a series of colors and employ an interpolation algorithm to resolve full color images. Each color is, then, directed to a different set of pixels. Three-chip color CCD cameras provide higher resolution by employing a prism to direct each section of the incident spectrum to a different chip. More accurate color reproduction is possible, as each point in space of the object has separate RGB intensity values, rather than using an algorithm to determine the color. Three-chip cameras offer extremely high resolutions.

The control system 133 also includes an emitter (e.g., the emitter 106) including a spectral light source 150 and a structured light source 152 each operably coupled to the control circuit 133. A single source can be pulsed to emit wavelengths of light in the spectral light source 150 range and wavelengths of light in the structured light source 152 range. Alternatively, a single light source can be pulsed to provide light in the invisible spectrum (e.g., infrared spectral light) and wavelengths of light on the visible spectrum. The spectral light source 150 can be, for example, a hyperspectral light source, a multispectral light source, and/or a selective spectral light source. The tissue identification logic 140 is configured to identify critical structure(s) (e.g., the critical structure 101 of FIG. 1) via data from the spectral light source 150 received by the image sensor 135 of the camera 144. The surface mapping logic 136 is configured to determine the surface contours of the visible tissue (e.g., the tissue 103) based on reflected structured light. With time-of-flight measurements, the distance determining logic 141 is configured to determine one or more distance(s) to the visible tissue and/or the critical structure. Output from each of the surface mapping logic 136, the tissue identification logic 140, and the distance determining logic 141 is configured to be provided to the imaging logic 138, and combined, blended, and/or overlaid by the imaging logic 138 to be conveyed to a medical practitioner via the display 146 of the imaging system 142.

Figure 5:
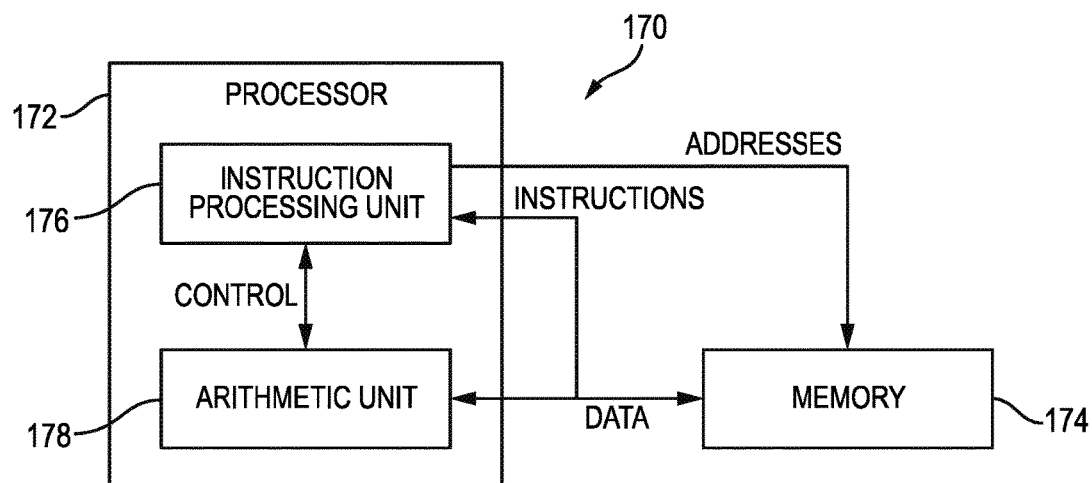
FIG. 5 is a schematic view of one embodiment of a control circuit of a control system for a surgical visualization system.

The control circuit 132 can have a variety of configurations. FIG. 5 illustrates one embodiment of a control circuit 170 that can be used as the control circuit 132 configured to control aspects of the surgical visualization system 100. The control circuit 170 is configured to implement various processes described herein. The control circuit 170 includes a microcontroller that includes a processor 172 (e.g., a microprocessor or microcontroller) operably coupled to a memory 174. The memory 174 is configured to store machine-executable instructions that, when executed by the processor 172, cause the processor 172 to execute machine instructions to implement various processes described herein. The processor 172 can be any one of a number of single-core or multicore processors known in the art. The memory 174 can include volatile and non-volatile storage media. The processor 172 includes an instruction processing unit 176 and an arithmetic unit 178. The instruction processing unit 176 is configured to receive instructions from the memory 174.

Figure 6:
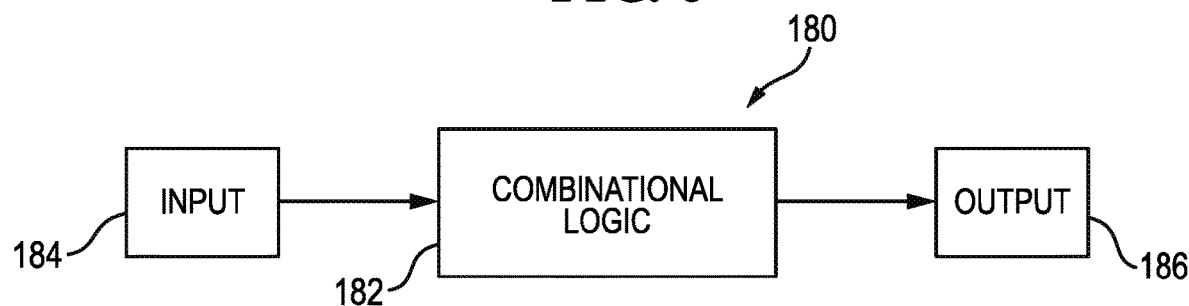
FIG. 6 is a schematic view of one embodiment of a combinational logic circuit of a surgical visualization system.

The surface mapping logic 136, the imaging logic 138, the tissue identification logic 140, and the distance determining logic 141 can have a variety of configurations. FIG. 6 illustrates one embodiment of a combinational logic circuit 180 configured to control aspects of the surgical visualization system 100 using logic such as one or more of the surface mapping logic 136, the imaging logic 138, the tissue identification logic 140, and the distance determining logic 141. The combinational logic circuit 180 includes a finite state machine that includes a combinational logic 182 configured to receive data associated with a surgical device (e.g. the surgical device 102 and/or the imaging device 120) at an input 184, process the data by the combinational logic 182, and provide an output 184 to a control circuit (e.g., the control circuit 132).

Figure 7:
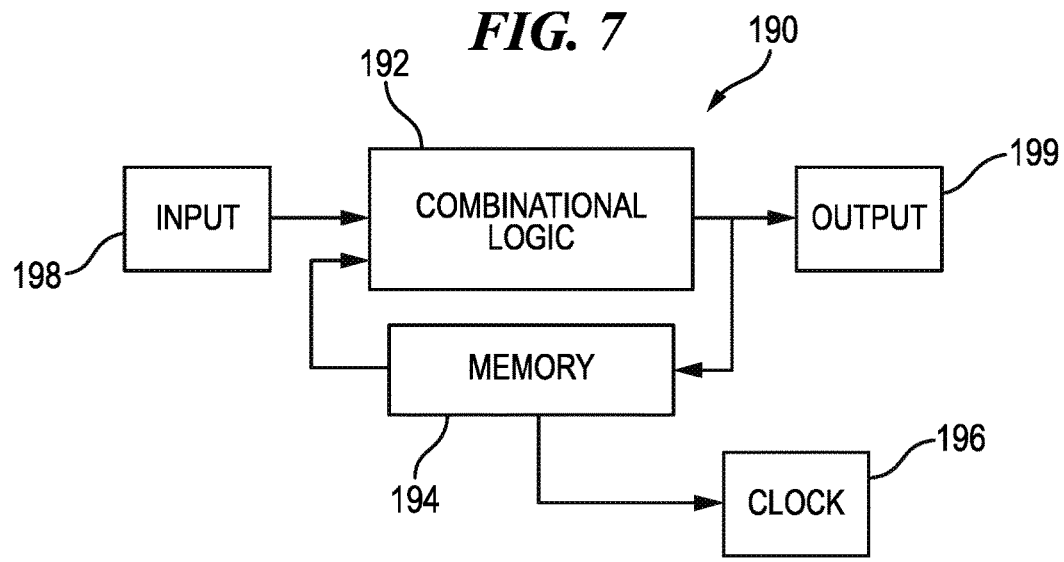
FIG. 7 is a schematic view of one embodiment of a sequential logic circuit of a surgical visualization system.

FIG. 7 illustrates one embodiment of a sequential logic circuit 190 configured to control aspects of the surgical visualization system 100 using logic such as one or more of the surface mapping logic 136, the imaging logic 138, the tissue identification logic 140, and the distance determining logic 141. The sequential logic circuit 190 includes a finite state machine that includes a combinational logic 192, a memory 194, and a clock 196. The memory 194 is configured to store a current state of the finite state machine. The sequential logic circuit 190 can be synchronous or asynchronous. The combinational logic 192 is configured to receive data associated with a surgical device (e.g. the surgical device 102 and/or the imaging device 120) at an input 426, process the data by the combinational logic 192, and provide an output 499 to a control circuit (e.g., the control circuit 132). In some embodiments, the sequential logic circuit 190 can include a combination of a processor (e.g., processor 172 of FIG. 5) and a finite state machine to implement various processes herein. In some embodiments, the finite state machine can include a combination of a combinational logic circuit (e.g., the combinational logic circuit 192 of FIG. 7) and the sequential logic circuit 190.

Figure 8:
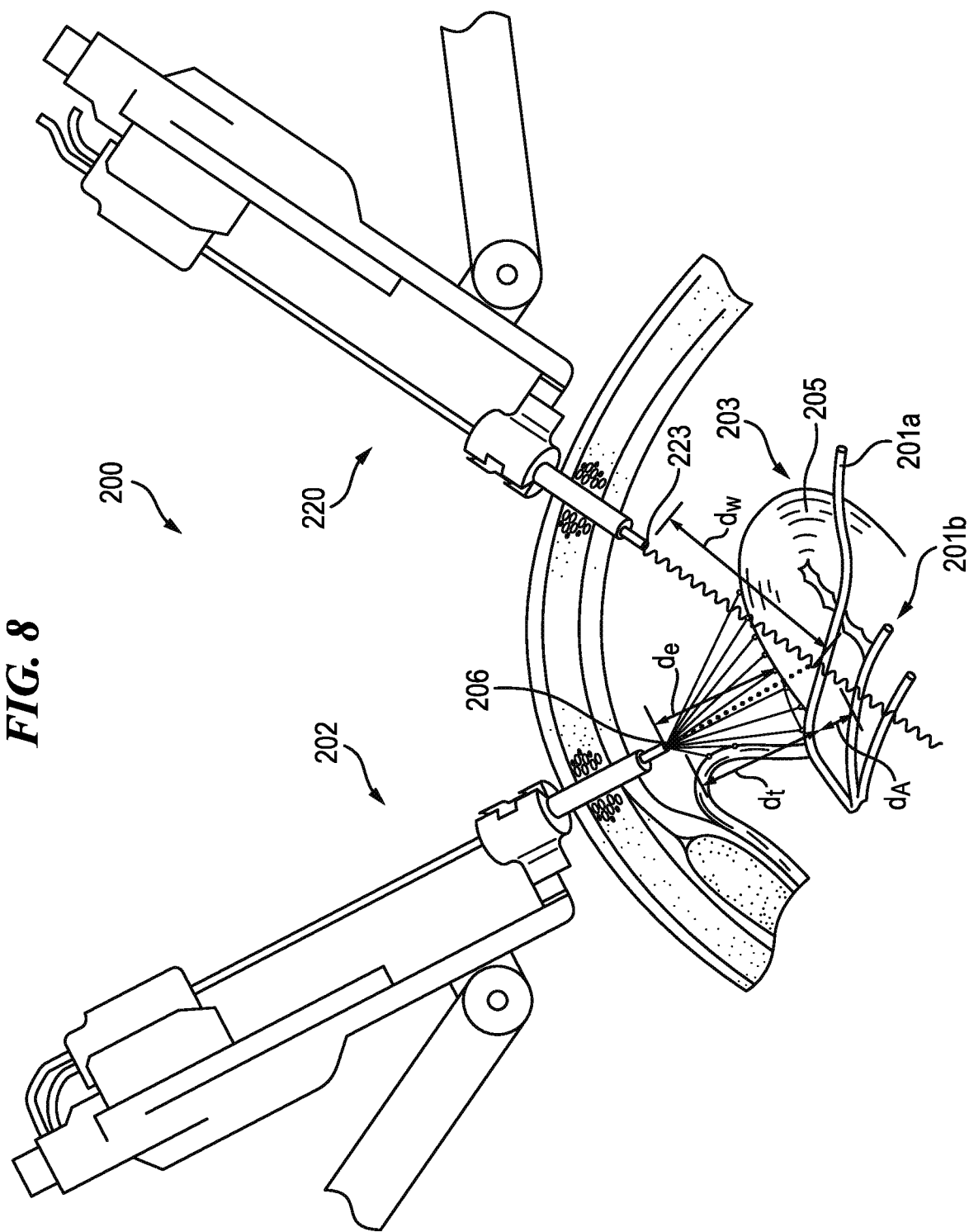
FIG. 8 is a schematic view of yet another embodiment of a surgical visualization system.

FIG. 8 illustrates another embodiment of a surgical visualization system 200. The surgical visualization system 200 is generally configured and used similar to the surgical visualization system 100 of FIG. 1, e.g., includes a surgical device 202 and an imaging device 220. The imaging device 220 includes a spectral light emitter 223 configured to emit spectral light in a plurality of wavelengths to obtain a spectral image of hidden structures, for example. The imaging device 220 can also include a three-dimensional camera and associated electronic processing circuits. The surgical visualization system 200 is shown being utilized intraoperatively to identify and facilitate avoidance of certain critical structures, such as a ureter 201a and vessels 201b, in an organ 203 (a uterus in this embodiment) that are not visible on a surface 205 of the organ 203.

The surgical visualization system 200 is configured to determine an emitter-to-tissue distance $d_e$ from an emitter 206 on the surgical device 202 to the surface 205 of the uterus 203 via structured light. The surgical visualization system 200 is configured to extrapolate a device-to-tissue distance $d_t$ from the surgical device 202 to the surface 205 of the uterus 203 based on the emitter-to-tissue distance $d_e$. The surgical visualization system 200 is also configured to determine a tissue-to-ureter distance $d_A$ from the ureter 201a to the surface 205 and a camera-to ureter distance $d_w$ from the imaging device 220 to the ureter 201a. As described herein, e.g., with respect to the surgical visualization system 100 of FIG. 1, the surgical visualization system 200 is configured to determine the distance $d_w$ with spectral imaging and time-of-flight sensors, for example. In various embodiments, the surgical visualization system 200 can determine (e.g., triangulate) the tissue-to-ureter distance $d_A$ (or depth) based on other distances and/or the surface mapping logic described herein.

Figure 9:
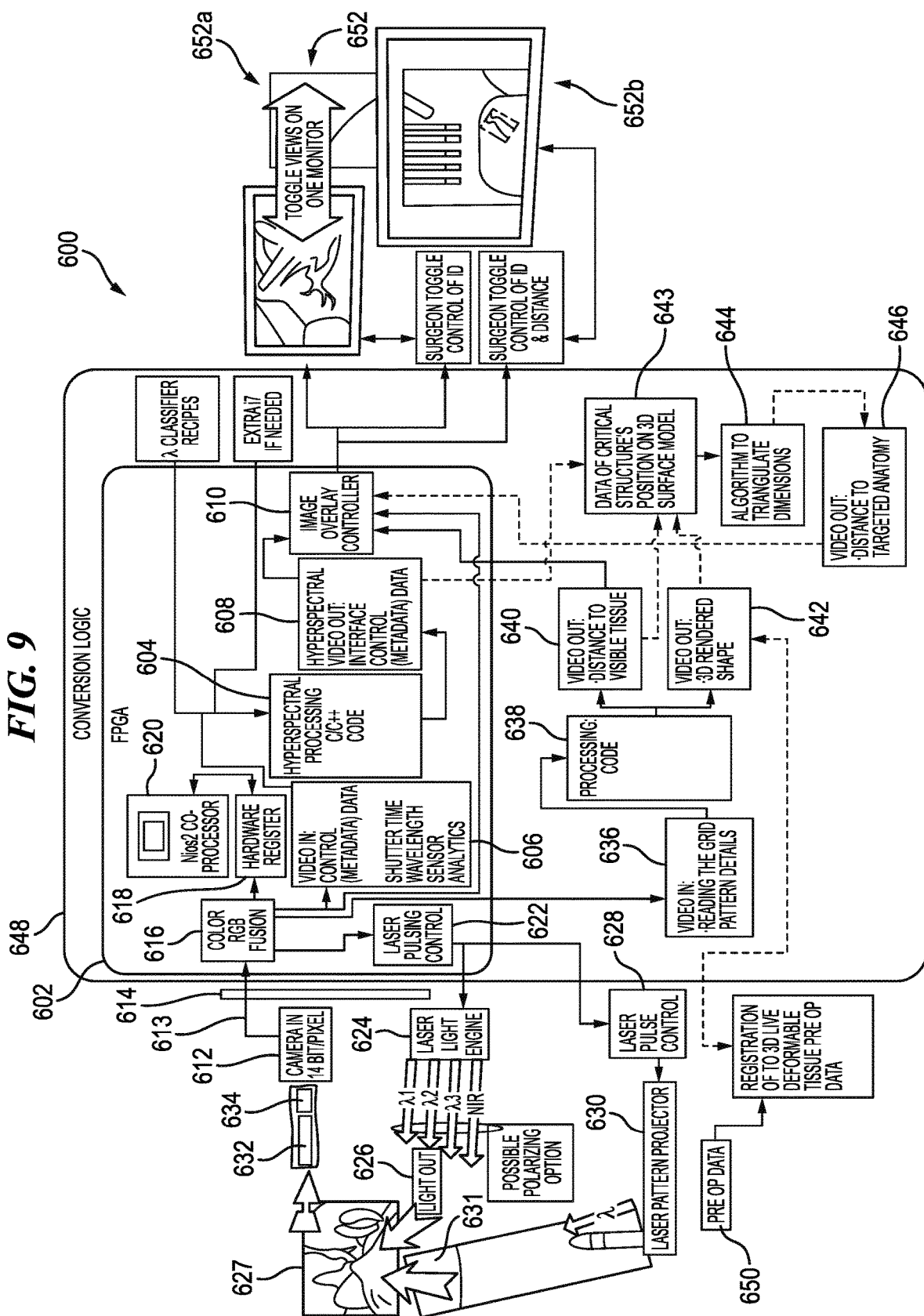
FIG. 9 is a schematic view of another embodiment of a control system for a surgical visualization system.

As mentioned above, a surgical visualization system includes a control system configured to control various aspects of the surgical visualization system. The control system can have a variety of configurations. FIG. 9 illustrates one embodiment of a control system 600 for a surgical visualization system, such as the surgical visualization system 100 of FIG. 1, the surgical visualization system 200 of FIG. 8, or other surgical visualization system described herein. The control system 600 is a conversion system that integrates spectral signature tissue identification and structured light tissue positioning to identify a critical structure, especially when those structure(s) are obscured by tissue, e.g., by fat, connective tissue, blood tissue, and/or organ(s), and/or by blood, and/or to detect tissue variability, such as differentiating tumors and/or non-healthy tissue from healthy tissue within an organ.

The control system 600 is configured for implementing a hyperspectral imaging and visualization system in which a molecular response is utilized to detect and identify anatomy in a surgical field of view. The control system 600 includes a conversion logic circuit 648 configured to convert tissue data to usable information for surgeons and/or other medical practitioners. For example, variable reflectance based on wavelengths with respect to obscuring material can be utilized to identify the critical structure in the anatomy. Moreover, the control system 600 is configured to combine the identified spectral signature and the structural light data in an image. For example, the control system 600 can be employed to create of three-dimensional data set for surgical use in a system with augmentation image overlays. Techniques can be employed both intraoperatively and preoperatively using additional visual information. In various embodiments, the control system 600 is configured to provide warnings to a medical practitioner when in the proximity of one or more critical structures. Various algorithms can be employed to guide robotic automation and semi-automated approaches based on the surgical procedure and proximity to the critical structure(s).

A projected array of lights is employed by the control system 600 to determine tissue shape and motion intraoperatively. Alternatively, flash Lidar may be utilized for surface mapping of the tissue.

The control system 600 is configured to detect the critical structure, which as mentioned above can include one or more critical structures, and provide an image overlay of the critical structure and measure the distance to the surface of the visible tissue and the distance to the embedded/buried critical structure(s). The control system 600 can measure the distance to the surface of the visible tissue or detect the critical structure and provide an image overlay of the critical structure.

The control system 600 includes a spectral control circuit 602. The spectral control circuit 602 can be a field programmable gate array (FPGA) or another suitable circuit configuration, such as the configurations described with respect to FIG. 6, FIG. 7, and FIG. 8. The spectral control circuit 602 includes a processor 604 configured to receive video input signals from a video input processor 606. The processor 604 can be configured for hyperspectral processing and can utilize C/C++ code, for example. The video input processor 606 is configured to receive video-in of control (metadata) data such as shutter time, wave length, and sensor analytics, for example. The processor 604 is configured to process the video input signal from the video input processor 606 and provide a video output signal to a video output processor 608, which includes a hyperspectral video-out of interface control (metadata) data, for example. The video output processor 608 is configured to provides the video output signal to an image overlay controller 610.

The video input processor 606 is operatively coupled to a camera 612 at the patient side via a patient isolation circuit 614. The camera 612 includes a solid state image sensor 634. The patient isolation circuit 614 can include a plurality of transformers so that the patient is isolated from other circuits in the system. The camera 612 is configured to receive intraoperative images through optics 632 and the image sensor 634. The image sensor 634 can include a CMOS image sensor, for example, or can include another image sensor technology, such as those discussed herein in connection with FIG. 4. The camera 612 is configured to output 613 images in 14 bit/pixel signals. A person skilled in the art will appreciate that higher or lower pixel resolutions can be employed. The isolated camera output signal 613 is provided to a color RGB fusion circuit 616, which in this illustrated embodiment employs a hardware register 618 and a Nios2 co-processor 620 configured to process the camera output signal 613. A color RGB fusion output signal is provided to the video input processor 606 and a laser pulsing control circuit 622.

The laser pulsing control circuit 622 is configured to control a laser light engine 624. The laser light engine 624 is configured to output light in a plurality of wavelengths (λ1, λ2, λ3 . . . λn) including near infrared (NIR). The laser light engine 624 can operate in a plurality of modes. For example, the laser light engine 624 can operate in two modes. In a first mode, e.g., a normal operating mode, the laser light engine 624 is configured to output an illuminating signal. In a second mode, e.g., an identification mode, the laser light engine 624 is configured to output RGBG and NIR light. In various embodiments, the laser light engine 624 can operate in a polarizing mode.

Light output 626 from the laser light engine 624 is configured to illuminate targeted anatomy in an intraoperative surgical site 627. The laser pulsing control circuit 622 is also configured to control a laser pulse controller 628 for a laser pattern projector 630 configured to project a laser light pattern 631, such as a grid or pattern of lines and/or dots, at a predetermined wavelength (λ2) on an operative tissue or organ at the surgical site 627. The camera 612 is configured to receive the patterned light as well as the reflected light output through the camera optics 632. The image sensor 634 is configured to convert the received light into a digital signal.

The color RGB fusion circuit 616 is also configured to output signals to the image overlay controller 610 and a video input module 636 for reading the laser light pattern 631 projected onto the targeted anatomy at the surgical site 627 by the laser pattern projector 630. A processing module 638 is configured to process the laser light pattern 631 and output a first video output signal 640 representative of the distance to the visible tissue at the surgical site 627. The data is provided to the image overlay controller 610. The processing module 638 is also configured to output a second video signal 642 representative of a three-dimensional rendered shape of the tissue or organ of the targeted anatomy at the surgical site.

The first and second video output signals 640, 642 include data representative of the position of the critical structure on a three-dimensional surface model, which is provided to an integration module 643. In combination with data from the video out processor 608 of the spectral control circuit 602, the integration module 643 is configured to determine the distance (e.g., distance $d_A$ of FIG. 1) to a buried critical structure (e.g., via triangularization algorithms 644), and the distance to the buried critical structure can be provided to the image overlay controller 610 via a video out processor 646. The foregoing conversion logic can encompass the conversion logic circuit 648 intermediate video monitors 652 and the camera 624/laser pattern projector 630 positioned at the surgical site 627.

Preoperative data 650, such as from a CT or MRI scan, can be employed to register or align certain three-dimensional deformable tissue in various instances. Such preoperative data 650 can be provided to the integration module 643 and ultimately to the image overlay controller 610 so that such information can be overlaid with the views from the camera 612 and provided to the video monitors 652. Embodiments of registration of preoperative data are further described in U.S. Pat. Pub. No. 2020/0015907 entitled "Integration Of Imaging Data" filed Sep. 11, 2018, which is hereby incorporated by reference herein in its entirety.

The video monitors 652 are configured to output the integrated/augmented views from the image overlay controller 610. A medical practitioner can select and/or toggle between different views on one or more displays. On a first display 652a, which is a monitor in this illustrated embodiment, the medical practitioner can toggle between (A) a view in which a three-dimensional rendering of the visible tissue is depicted and (B) an augmented view in which one or more hidden critical structures are depicted over the three-dimensional rendering of the visible tissue. On a second display 652b, which is a monitor in this illustrated embodiment, the medical practitioner can toggle on distance measurements to one or more hidden critical structures and/or the surface of visible tissue, for example.

The various surgical visualization systems described herein can be utilized to visualize various different types of tissues and/or anatomical structures, including tissues and/or anatomical structures that may be obscured from being visualized by EMR in the visible portion of the spectrum. The surgical visualization system can utilize a spectral imaging system, as mentioned above, which can be configured to visualize different types of tissues based upon their varying combinations of constituent materials. In particular, a spectral imaging system can be configured to detect the presence of various constituent materials within a tissue being visualized based on the absorption coefficient of the tissue across various EMR wavelengths. The spectral imaging system can be configured to characterize the tissue type of the tissue being visualized based upon the particular combination of constituent materials.

Figure 10:
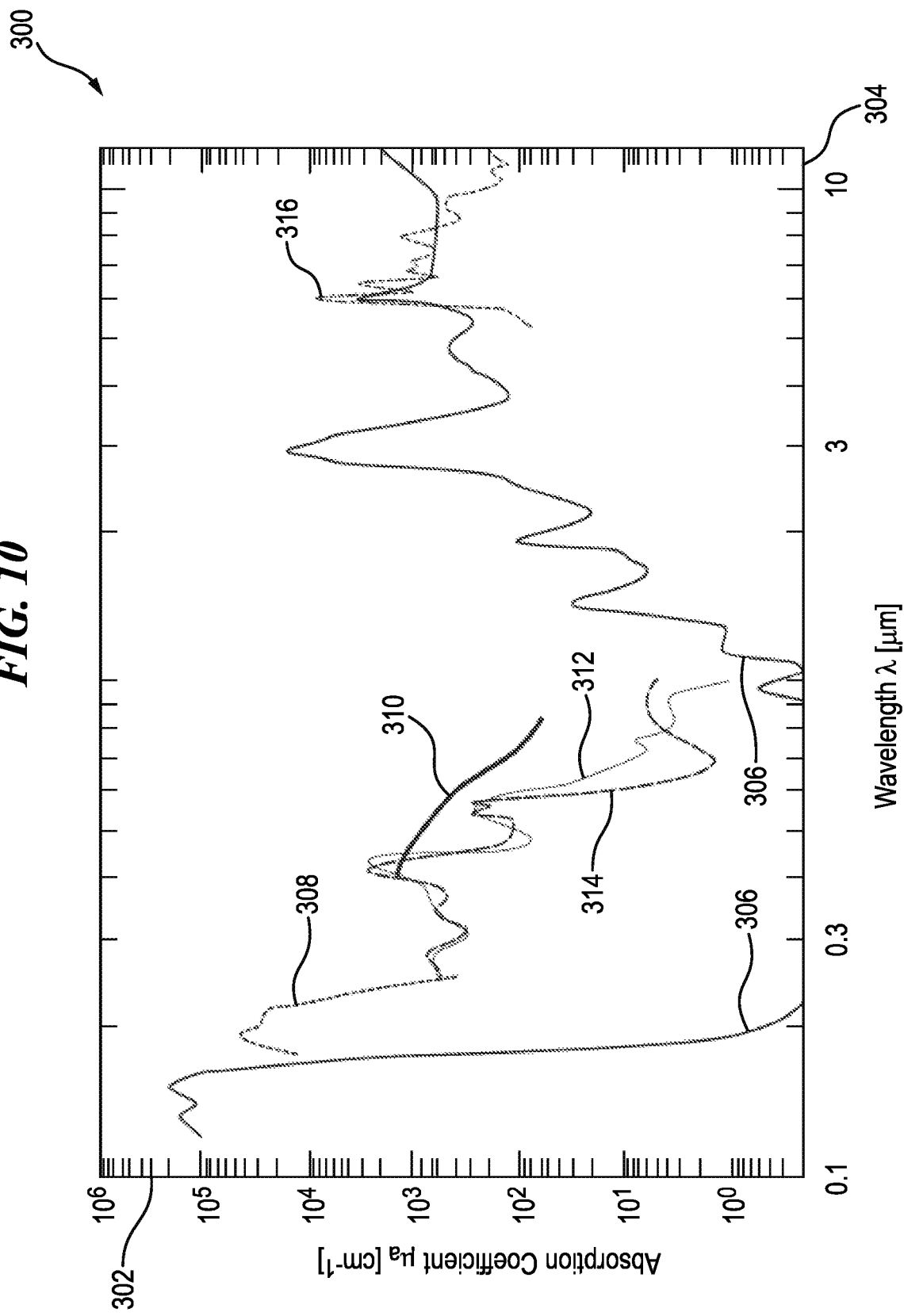
FIG. 10 is a graph showing wavelength versus absorption coefficient for various biological materials.

FIG. 10 shows a graph 300 depicting how the absorption coefficient of various biological materials varies across the EMR wavelength spectrum. In the graph 300, the vertical axis 302 represents absorption coefficient of the biological material in $cm^{-1}$, and the horizontal axis 304 represents EMR wavelength in μm. A first line 306 in the graph 300 represents the absorption coefficient of water at various EMR wavelengths, a second line 308 represents the absorption coefficient of protein at various EMR wavelengths, a third line 310 represents the absorption coefficient of melanin at various EMR wavelengths, a fourth line 312 represents the absorption coefficient of deoxygenated hemoglobin at various EMR wavelengths, a fifth line 314 represents the absorption coefficient of oxygenated hemoglobin at various EMR wavelengths, and a sixth line 316 represents the absorption coefficient of collagen at various EMR wavelengths. Different tissue types have different combinations of constituent materials and, therefore, the tissue type(s) being visualized by a surgical visualization system can be identified and differentiated between according to the particular combination of detected constituent materials. Accordingly, a spectral imaging system of a surgical visualization system can be configured to emit EMR at a number of different wavelengths, determine the constituent materials of the tissue based on the detected absorption EMR absorption response at the different wavelengths, and then characterize the tissue type based on the particular detected combination of constituent materials.

Figure 11:
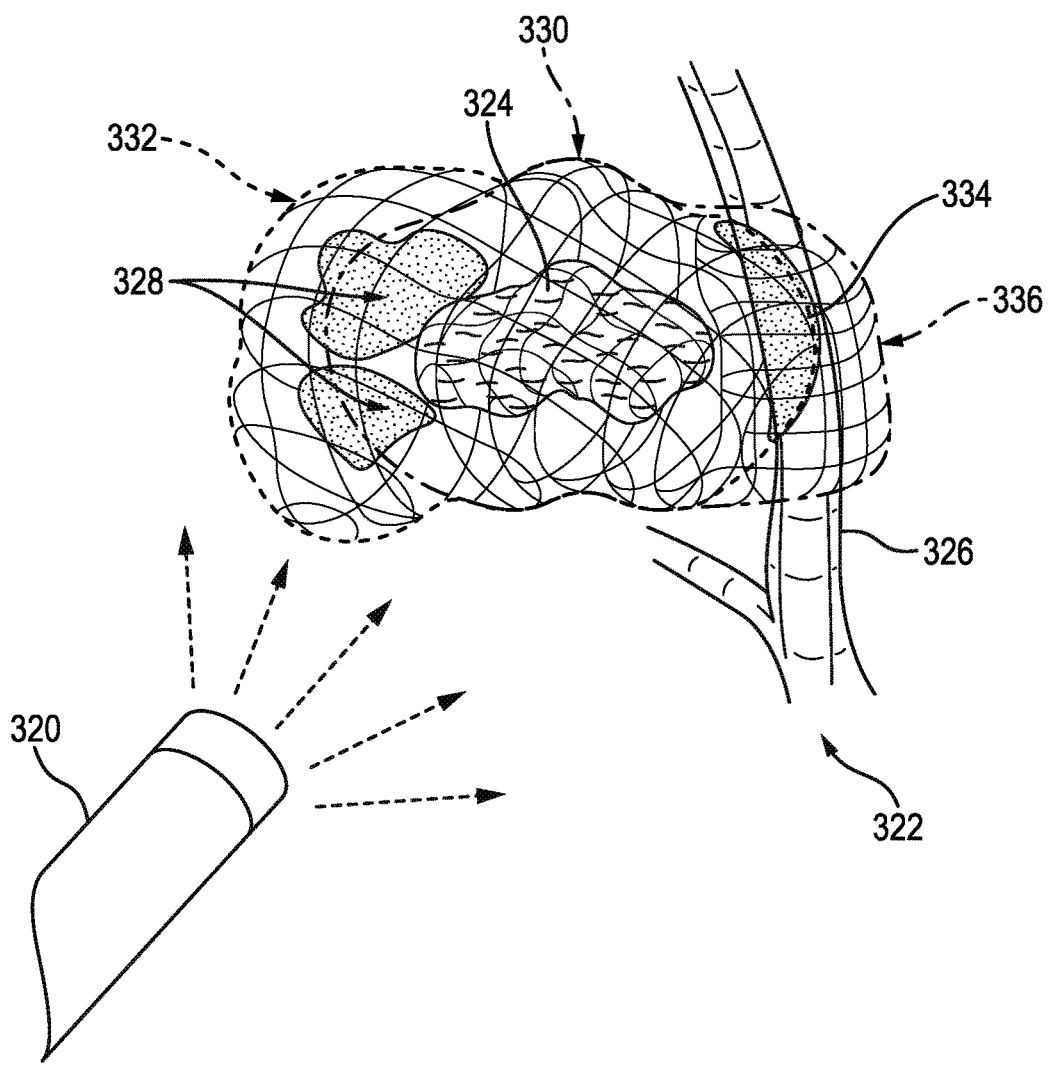
FIG. 11 is a schematic view of one embodiment of a spectral emitter visualizing a surgical site.

FIG. 11 shows an embodiment of the utilization of spectral imaging techniques to visualize different tissue types and/or anatomical structures. In FIG. 11, a spectral emitter 320 (e.g., the spectral light source 150 of FIG. 4) is being utilized by an imaging system to visualize a surgical site 322. The EMR emitted by the spectral emitter 320 and reflected from the tissues and/or structures at the surgical site 322 is received by an image sensor (e.g., the image sensor 135 of FIG. 4) to visualize the tissues and/or structures, which can be either visible (e.g., be located at a surface of the surgical site 322) or obscured (e.g., underlay other tissue and/or structures at the surgical site 322). In this embodiment, an imaging system (e.g., the imaging system 142 of FIG. 4) visualizes a tumor 324, an artery 326, and various abnormalities 328 (e.g., tissues not confirming to known or expected spectral signatures) based upon the spectral signatures characterized by the differing absorptive characteristics (e.g., absorption coefficient) of the constituent materials for each of the different tissue/structure types. The visualized tissues and structures can be displayed on a display screen associated with or coupled to the imaging system (e.g., the display 146 of the imaging system 142 of FIG. 4), on a primary display (e.g., the primary display 819 of FIG. 19), on a non-sterile display (e.g., the non-sterile displays 807, 809 of FIG. 19), on a display of a surgical hub (e.g., the display of the surgical hub 806 of FIG. 19), on a device/instrument display, and/or on another display.

The imaging system can be configured to tailor or update the displayed surgical site visualization according to the identified tissue and/or structure types. For example, as shown in FIG. 11, the imaging system can display a margin 330 associated with the tumor 324 being visualized on a display screen associated with or coupled to the imaging system, on a primary display, on a non-sterile display, on a display of a surgical hub, on a device/instrument display, and/or on another display. The margin 330 can indicate the area or amount of tissue that should be excised to ensure complete removal of the tumor 324. The surgical visualization system's control system (e.g., the control system 133 of FIG. 4) can be configured to control or update the dimensions of the margin 330 based on the tissues and/or structures identified by the imaging system. In this illustrated embodiment, the imaging system has identified multiple abnormalities 328 within the field of view (FOV). Accordingly, the control system can adjust the displayed margin 330 to a first updated margin 332 having sufficient dimensions to encompass the abnormalities 328. Further, the imaging system has also identified the artery 326 partially overlapping with the initially displayed margin 330 (as indicated by a highlighted region 334 of the artery 326). Accordingly, the control system can adjust the displayed margin to a second updated margin 336 having sufficient dimensions to encompass the relevant portion of the artery 326.

Figure 12:
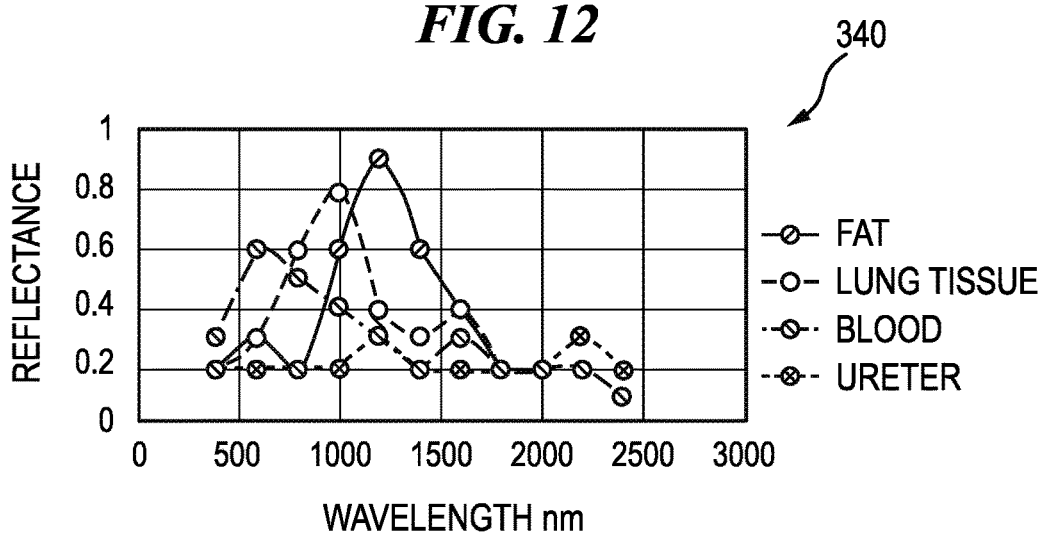
FIG. 12 is a graph depicting illustrative hyperspectral identifying signatures to differentiate a ureter from obscurants.
Figure 13:
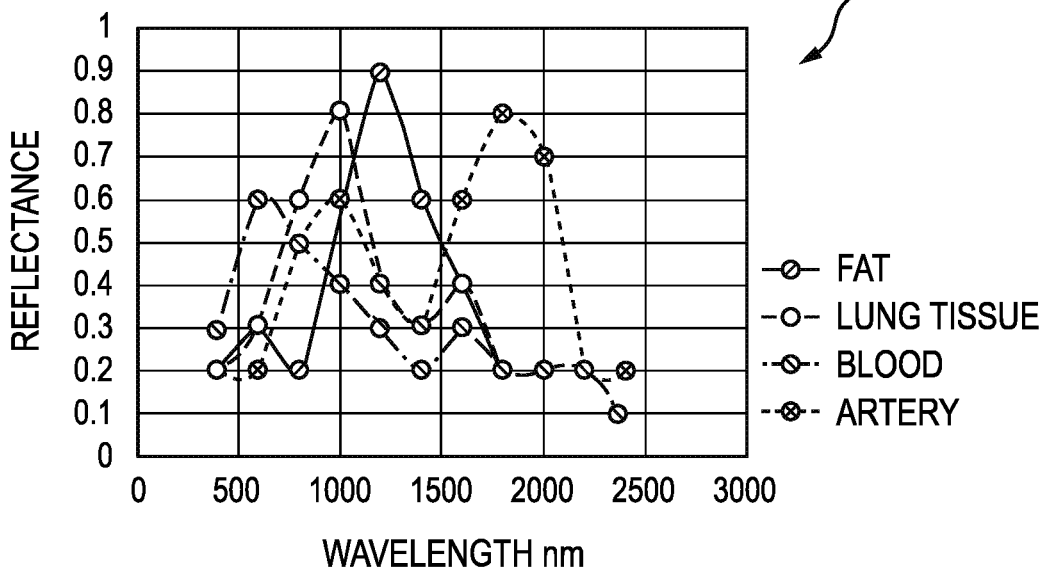
FIG. 13 is a graph depicting illustrative hyperspectral identifying signatures to differentiate an artery from obscurants.
Figure 14:
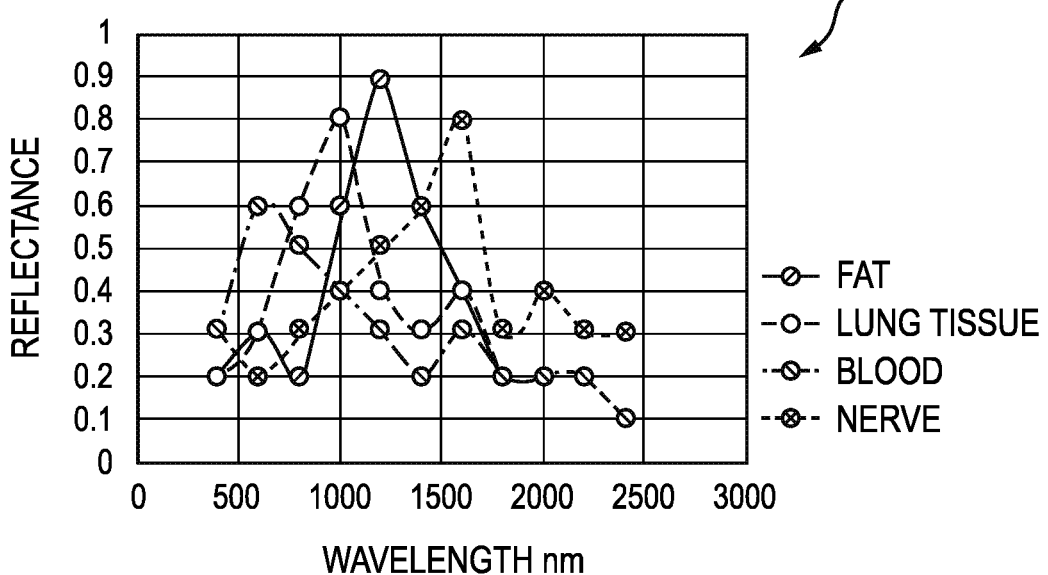
FIG. 14 is a graph depicting illustrative hyperspectral identifying signatures to differentiate a nerve from obscurants.

Tissues and/or structures can also be imaged or characterized according to their reflective characteristics, in addition to or in lieu of their absorptive characteristics described above with respect to FIG. 10 and FIG. 11, across the EMR wavelength spectrum. For example, FIG. 12, FIG. 13, and FIG. 14 illustrate various graphs of reflectance of different types of tissues or structures across different EMR wavelengths. FIG. 12 is a graphical representation 340 of an illustrative ureter signature versus obscurants. FIG. 13 is a graphical representation 342 of an illustrative artery signature versus obscurants. FIG. 14 is a graphical representation 344 of an illustrative nerve signature versus obscurants. The plots in FIG. 12, FIG. 13, and FIG. 14 represent reflectance as a function of wavelength (nm) for the particular structures (ureter, artery, and nerve) relative to the corresponding reflectances of fat, lung tissue, and blood at the corresponding wavelengths. These graphs are simply for illustrative purposes and it should be understood that other tissues and/or structures could have corresponding detectable reflectance signatures that would allow the tissues and/or structures to be identified and visualized.

Select wavelengths for spectral imaging can be identified and utilized based on the anticipated critical structures and/or obscurants at a surgical site (e.g., "selective spectral" imaging). By utilizing selective spectral imaging, the amount of time required to obtain the spectral image can be minimized such that the information can be obtained in real-time and utilized intraoperatively. The wavelengths can be selected by a medical practitioner or by a control circuit based on input by a user, e.g., a medical practitioner. In certain instances, the wavelengths can be selected based on machine learning and/or big data accessible to the control circuit via, e.g., a cloud or surgical hub.

Figure 15:
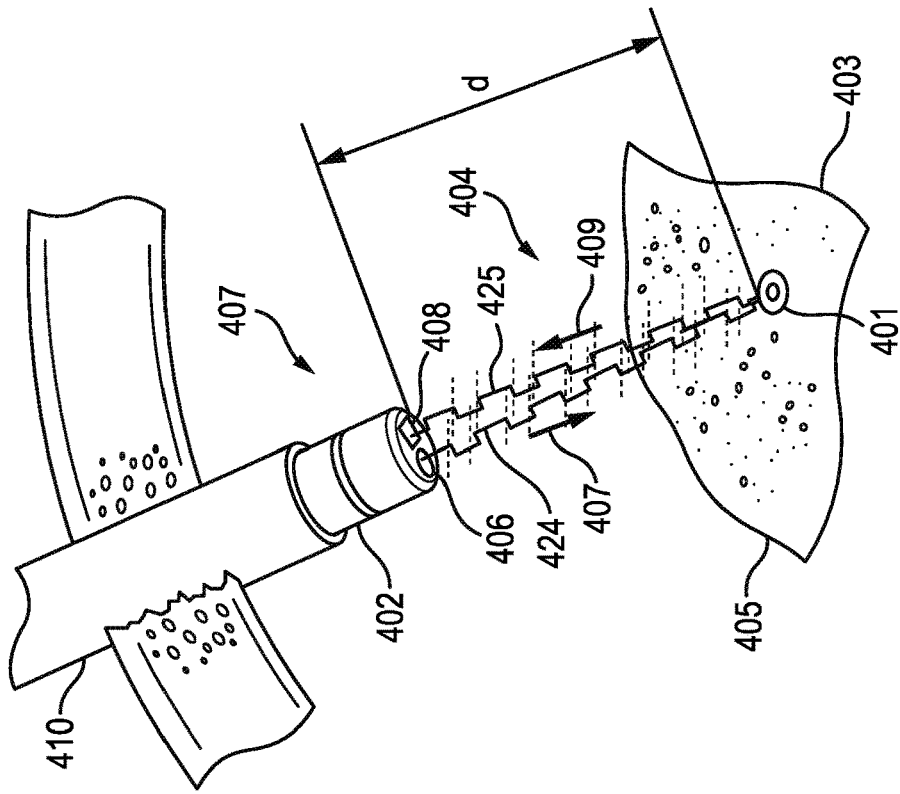
FIG. 15 is a schematic view of one embodiment of a near infrared (NIR) time-of-flight measurement system being utilized intraoperatively.

FIG. 15 illustrates one embodiment of spectral imaging to tissue being utilized intraoperatively to measure a distance between a waveform emitter and a critical structure that is obscured by tissue. FIG. 15 shows an embodiment of a time-of-flight sensor system 404 utilizing waveforms 424, 425. The time-of-flight sensor system 404 can be incorporated into a surgical visualization system, e.g., as the sensor system 104 of the surgical visualization system 100 of FIG. 1. The time-of-flight sensor system 404 includes a waveform emitter 406 and a waveform receiver 408 on the same surgical device 402 (e.g., the emitter 106 and the receiver 108 on the same surgical device 102 of FIG. 1). The emitted wave 400 extends to a critical structure 401 (e.g., the critical structure 101 of FIG. 1) from the emitter 406, and the received wave 425 is reflected back to by the receiver 408 from the critical structure 401. The surgical device 402 in this illustrated embodiment is positioned through a trocar 410 that extends into a cavity 407 in a patient. Although the trocar 410 is used in this in this illustrated embodiment, other trocars or other access devices can be used, or no access device may be used.

Figure 16:
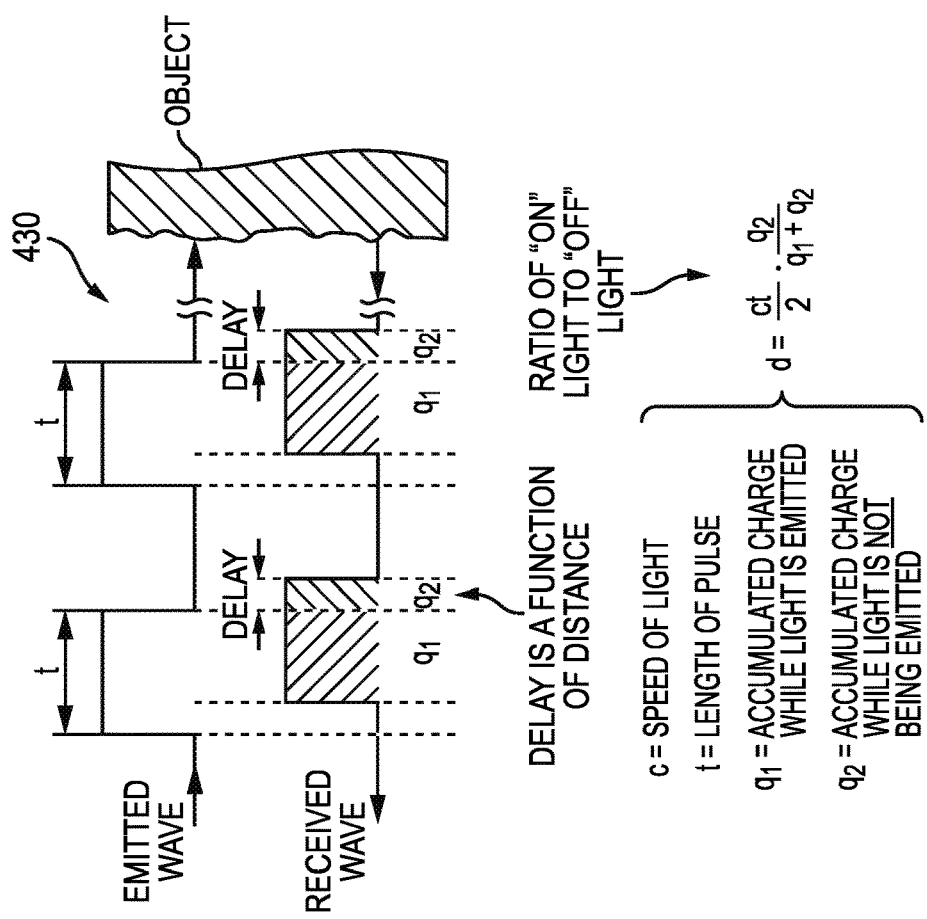
FIG. 16 shows a time-of-flight timing diagram for the system of FIG. 15.

The waveforms 424, 425 are configured to penetrate obscuring tissue 403, such as by having wavelengths in the NIR or SWIR spectrum of wavelengths. A spectral signal (e.g., hyperspectral, multispectral, or selective spectral) or a photoacoustic signal is emitted from the emitter 406, as shown by a first arrow 407 pointing distally, and can penetrate the tissue 403 in which the critical structure 401 is concealed. The emitted waveform 424 is reflected by the critical structure 401, as shown by a second arrow 409 pointing proximally. The received waveform 425 can be delayed due to a distance d between a distal end of the surgical device 402 and the critical structure 401. The waveforms 424, 425 can be selected to target the critical structure 401 within the tissue 403 based on the spectral signature of the critical structure 401, as described herein. The emitter 406 is configured to provide a binary signal on and off, as shown in FIG. 16, for example, which can be measured by the receiver 408.

Based on the delay between the emitted wave 424 and the received wave 425, the time-of-flight sensor system 404 is configured to determine the distance d. A time-of-flight timing diagram 430 for the emitter 406 and the receiver 408 of FIG. 15 is shown in FIG. 16. The delay is a function of the distance d and the distance d is given by:

$$d = \frac{ct}{2} \cdot \frac{q_2}{q_1 + q_2}$$

where c=the speed of light; t=length of pulse; q1=accumulated charge while light is emitted;

and q2=accumulated charge while light is not being emitted.

The time-of-flight of the waveforms 424, 425 corresponds to the distance d in FIG. 15. In various instances, additional emitters/receivers and/or pulsing signals from the emitter 406 can be configured to emit a non-penetrating signal. The non-penetrating signal can be configured to determine the distance from the emitter 406 to the surface 405 of the obscuring tissue 403. In various instances, a depth of the critical structure 401 can be determined by:

$$d_A = d_w - d_t$$

where $d_A$=the depth of the critical structure 401; $d_w$=the distance from the emitter 406 to the critical structure 401 (d in FIG. 15); and $d_t$=the distance from the emitter 406 (on the distal end of the surgical device 402) to the surface 405 of the obscuring tissue 403.

Figure 17:
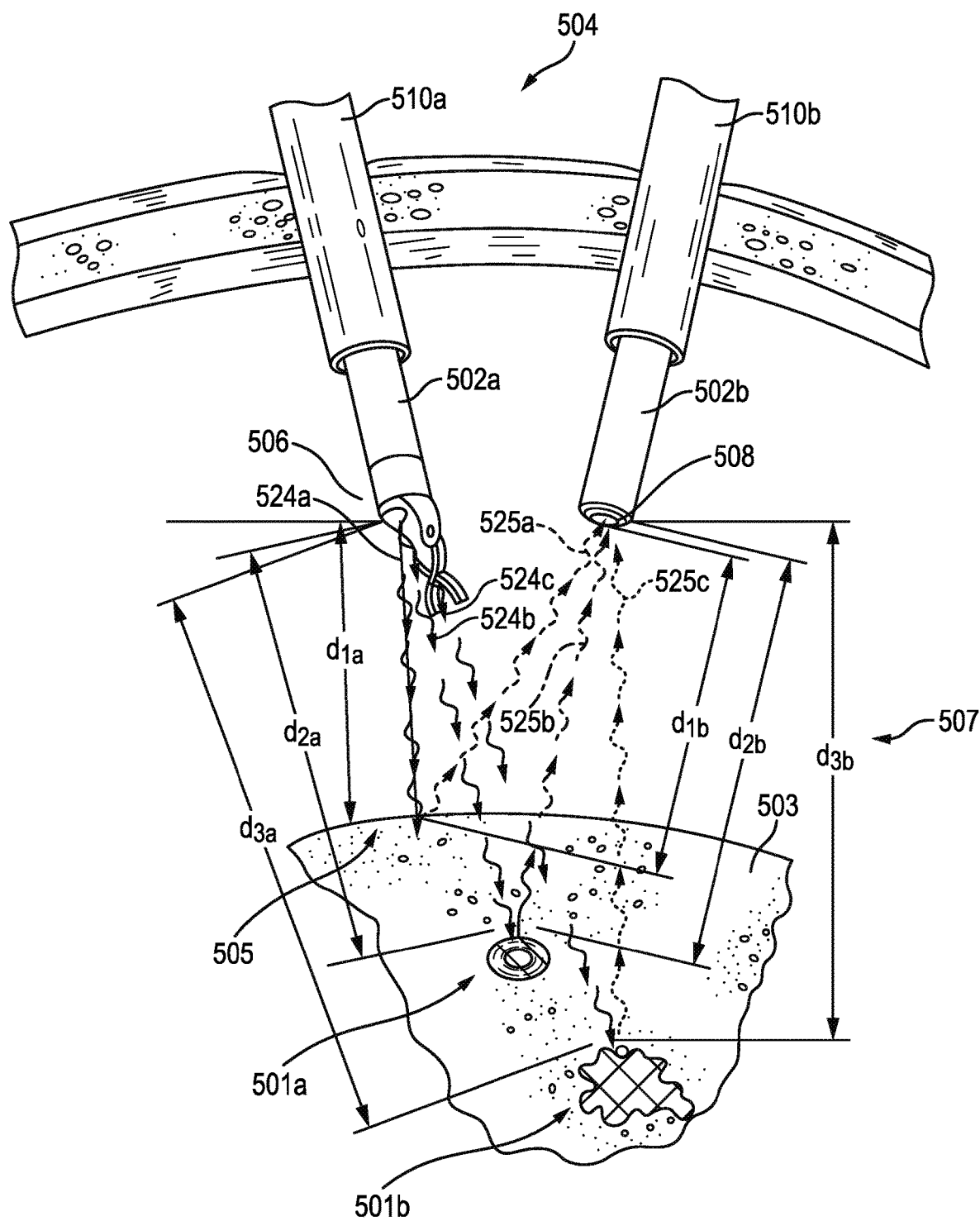
FIG. 17 is a schematic view of another embodiment of a near infrared (NIR) time-of-flight measurement system being utilized intraoperatively.

FIG. 17 illustrates another embodiment of a time-of-flight sensor system 504 utilizing waves 524a, 524b, 524c, 525a, 525b, 525c is shown. The time-of-flight sensor system 504 can be incorporated into a surgical visualization system, e.g., as the sensor system 104 of the surgical visualization system 100 of FIG. 1. The time-of-flight sensor system 504 includes a waveform emitter 506 and a waveform receiver 508 (e.g., the emitter 106 and the receiver 108 of FIG. 1). The waveform emitter 506 is positioned on a first surgical device 502a (e.g., the surgical device 102 of FIG. 1), and the waveform receiver 508 is positioned on a second surgical device 502b. The surgical devices 502a, 502b are positioned through first and second trocars 510a, 510b, respectively, which extend into a cavity 507 in a patient. Although the trocars 510a, 510b are used in this in this illustrated embodiment, other trocars or other access devices can be used, or no access device may be used. The emitted waves 524a, 524b, 524c extend toward a surgical site from the emitter 506, and the received waves 525a, 525b, 525c are reflected back to the receiver 508 from various structures and/or surfaces at the surgical site.

The different emitted waves 524a, 524b, 524c are configured to target different types of material at the surgical site. For example, the wave 524a targets obscuring tissue 503, the wave 524b targets a first critical structure 501a (e.g., the critical structure 101 of FIG. 1), which is a vessel in this illustrated embodiment, and the wave 524c targets a second critical structure 501b (e.g., the critical structure 101 of FIG. 1), which is a cancerous tumor in this illustrated embodiment. The wavelengths of the waves 524a, 524b, 524c can be in the visible light, NIR, or SWIR spectrum of wavelengths. For example, visible light can be reflected off a surface 505 of the tissue 503, and NIR and/or SWIR waveforms can penetrate the surface 505 of the tissue 503. In various aspects, as described herein, a spectral signal (e.g., hyperspectral, multispectral, or selective spectral) or a photoacoustic signal can be emitted from the emitter 506. The waves 524b, 524c can be selected to target the critical structures 501a, 501b within the tissue 503 based on the spectral signature of the critical structure 501a, 501b, as described herein. Photoacoustic imaging is further described in various U.S. patent applications, which are incorporated by reference herein in the present disclosure.

The emitted waves 524a, 524b, 524c are reflected off the targeted material, namely the surface 505, the first critical structure 501a, and the second structure 501b, respectively. The received waveforms 525a, 525b, 525c can be delayed due to distances $d_{1a}$, $d_{2a}$, $d_{3a}$, $d_{1b}$, $d_{2b}$, $d_{2c}$.

In the time-of-flight sensor system 504, in which the emitter 506 and the receiver 508 are independently positionable (e.g., on separate surgical devices 502a, 502b and/or controlled by separate robotic arms), the various distances $d_{1a}$, $d_{2a}$, $d_{3a}$, $d_{1b}$, $d_{2b}$, $d_{2c}$ can be calculated from the known position of the emitter 506 and the receiver 508. For example, the positions can be known when the surgical devices 502a, 502b are robotically-controlled. Knowledge of the positions of the emitter 506 and the receiver 508, as well as the time of the photon stream to target a certain tissue and the information received by the receiver 508 of that particular response can allow a determination of the distances $d_{1a}$, $d_{2a}$, $d_{3a}$, $d_{1b}$, $d_{2b}$, $d_{2c}$. In one aspect, the distance to the obscured critical structures 501a, 501b can be triangulated using penetrating wavelengths. Because the speed of light is constant for any wavelength of visible or invisible light, the time-of-flight sensor system 504 can determine the various distances.

In a view provided to the medical practitioner, such as on a display, the receiver 508 can be rotated such that a center of mass of the target structure in the resulting images remains constant, e.g., in a plane perpendicular to an axis of a select target structure 503, 501a, or 501b. Such an orientation can quickly communicate one or more relevant distances and/or perspectives with respect to the target structure. For example, as shown in FIG. 17, the surgical site is displayed from a viewpoint in which the critical structure 501a is perpendicular to the viewing plane (e.g., the vessel is oriented in/out of the page). Such an orientation can be default setting; however, the view can be rotated or otherwise adjusted by a medical practitioner. In certain instances, the medical practitioner can toggle between different surfaces and/or target structures that define the viewpoint of the surgical site provided by the imaging system.

As in this illustrated embodiment, the receiver 508 can be mounted on the trocar 510b (or other access device) through which the surgical device 502b is positioned. In other embodiments, the receiver 508 can be mounted on a separate robotic arm for which the three-dimensional position is known. In various instances, the receiver 508 can be mounted on a movable arm that is separate from a robotic surgical system that controls the surgical device 502a or can be mounted to an operating room (OR) table or fixture that is intraoperatively registerable to the robot coordinate plane. In such instances, the position of the emitter 506 and the receiver 508 can be registerable to the same coordinate plane such that the distances can be triangulated from outputs from the time-of-flight sensor system 504.

Combining time-of-flight sensor systems and near-infrared spectroscopy (NIRS), termed TOF-NIRS, which is capable of measuring the time-resolved profiles of NIR light with nanosecond resolution can be found in "Time-Of-Flight Near-Infrared Spectroscopy For Nondestructive Measurement Of Internal Quality In Grapefruit," Journal of the American Society for Horticultural Science, May 2013 vol. 138 no. 3 225-228, which is hereby incorporated by reference in its entirety.

Embodiments of visualization systems and aspects and uses thereof are described further in U.S. Pat. Pub. No. 2020/0015923 entitled "Surgical Visualization Platform" filed Sep. 11, 2018, U.S. Pat. Pub. No. 2020/0015900 entitled "Controlling An Emitter Assembly Pulse Sequence" filed Sep. 11, 2018, U.S. Pat. Pub. No. 2020/0015668 entitled "Singular EMR Source Emitter Assembly" filed Sep. 11, 2018, U.S. Pat. Pub. No. 2020/0015925 entitled "Combination Emitter And Camera Assembly" filed Sep. 11, 2018, U.S. Pat. Pub. No. 2020/00015899 entitled "Surgical Visualization With Proximity Tracking Features" filed Sep. 11, 2018, U.S. Pat. Pub. No. 2020/00015903 entitled "Surgical Visualization Of Multiple Targets" filed Sep. 11, 2018, U.S. Pat. No. 10,792,034 entitled "Visualization Of Surgical Devices" filed Sep. 11, 2018, U.S. Pat. Pub. No. 2020/0015897 entitled "Operative Communication Of Light" filed Sep. 11, 2018, U.S. Pat. Pub. No. 2020/0015924 entitled "Robotic Light Projection Tools" filed Sep. 11, 2018, U.S. Pat. Pub. No. 2020/0015898 entitled "Surgical Visualization Feedback System" filed Sep. 11, 2018, U.S. Pat. Pub. No. 2020/0015906 entitled "Surgical Visualization And Monitoring" filed Sep. 11, 2018, U.S. Pat. Pub. No. 2020/0015907 entitled "Integration Of Imaging Data" filed Sep. 11, 2018, U.S. Pat. No. 10,925,598 entitled "Robotically-Assisted Surgical Suturing Systems" filed Sep. 11, 2018, U.S. Pat. Pub. No. 2020/0015901 entitled "Safety Logic For Surgical Suturing Systems" filed Sep. 11, 2018, U.S. Pat. Pub. No. 2020/0015914 entitled "Robotic Systems With Separate Photoacoustic Receivers" filed Sep. 11, 2018, U.S. Pat. Pub. No. 2020/0015902 entitled "Force Sensor Through Structured Light Deflection" filed Sep. 11, 2018, U.S. Pat. Pub. No. 2019/0201136 entitled "Method Of Hub Communication" filed Dec. 4, 2018, U.S. patent application Ser. No. 16/729,772 entitled "Analyzing Surgical Trends By A Surgical System" filed Dec. 30, 2019, U.S. patent application Ser. No. 16/729,747 entitled "Dynamic Surgical Visualization Systems" filed Dec. 30, 2019, U.S. patent application Ser. No. 16/729,744 entitled "Visualization Systems Using Structured Light" filed Dec. 30, 2019, U.S. patent application Ser. No. 16/729,778 entitled "System And Method For Determining, Adjusting, And Managing Resection Margin About A Subject Tissue" filed Dec. 30, 2019, U.S. patent application Ser. No. 16/729,729 entitled "Surgical Systems For Proposing And Corroborating Organ Portion Removals" filed Dec. 30, 2019, U.S. patent application Ser. No. 16/729,778 entitled "Surgical System For Overlaying Surgical Instrument Data Onto A Virtual Three Dimensional Construct Of An Organ" filed Dec. 30, 2019, U.S. patent application Ser. No. 16/729,751 entitled "Surgical Systems For Generating Three Dimensional Constructs Of Anatomical Organs And Coupling Identified Anatomical Structures Thereto" filed Dec. 30, 2019, U.S. patent application Ser. No. 16/729,740 entitled "Surgical Systems Correlating Visualization Data And Powered Surgical Instrument Data" filed Dec. 30, 2019, U.S. patent application Ser. No. 16/729,737 entitled "Adaptive Surgical System Control According To Surgical Smoke Cloud Characteristics" filed Dec. 30, 2019, U.S. patent application Ser. No. 16/729,796 entitled "Adaptive Surgical System Control According To Surgical Smoke Particulate Characteristics" filed Dec. 30, 2019, U.S. patent application Ser. No. 16/729,803 entitled "Adaptive Visualization By A Surgical System" filed Dec. 30, 2019, U.S. patent application Ser. No. 16/729,807 entitled "Method Of Using Imaging Devices In Surgery" filed Dec. 30, 2019, U.S. Prov. Pat. App. No. 63/249,652 entitled "Surgical Devices, Systems, and Methods Using Fiducial Identification and Tracking" filed on Sep. 29, 2021, U.S. Prov. Pat. App. No. 63/249,658 entitled "Surgical Devices, Systems, and Methods for Control of One Visualization with Another" filed on Sep. 29, 2021, U.S. Prov. Pat. App. No. 63/249,870 entitled "Methods and Systems for Controlling Cooperative Surgical Instruments" filed on Sep. 29, 2021, U.S. Prov. Pat. App. No. 63/249,881 entitled "Methods and Systems for Controlling Cooperative Surgical Instruments with Variable Surgical Site Access Trajectories" filed on Sep. 29, 2021, U.S. Prov. Pat. App. No. 63/249,877 entitled "Methods and Systems for Controlling Cooperative Surgical Instruments" filed on Sep. 29, 2021, and U.S. Prov. Pat. App. No. 63/249,980 entitled "Cooperative Access" filed on Sep. 29, 2021, which are hereby incorporated by reference in their entireties.

Surgical Hubs

The various visualization or imaging systems described herein can be incorporated into a system that includes a surgical hub. In general, a surgical hub can be a component of a comprehensive digital medical system capable of spanning multiple medical facilities and configured to provide integrated and comprehensive improved medical care to a vast number of patients. The comprehensive digital medical system includes a cloud-based medical analytics system that is configured to interconnect to multiple surgical hubs located across many different medical facilities. The surgical hubs are configured to interconnect with one or more elements, such as one or more surgical instruments that are used to conduct medical procedures on patients and/or one or more visualization systems that are used during performance of medical procedures. The surgical hubs provide a wide array of functionality to improve the outcomes of medical procedures. The data generated by the various surgical devices, visualization systems, and surgical hubs about the patient and the medical procedure may be transmitted to the cloud-based medical analytics system. This data may then be aggregated with similar data gathered from many other surgical hubs, visualization systems, and surgical instruments located at other medical facilities. Various patterns and correlations may be found through the cloud-based analytics system analyzing the collected data. Improvements in the techniques used to generate the data may be generated as a result, and these improvements may then be disseminated to the various surgical hubs, visualization systems, and surgical instruments. Due to the interconnectedness of all of the aforementioned components, improvements in medical procedures and practices may be found that otherwise may not be found if the many components were not so interconnected.

Examples of surgical hubs configured to receive, analyze, and output data, and methods of using such surgical hubs, are further described in U.S. Pat. Pub. No. 2019/0200844 entitled "Method Of Hub Communication, Processing, Storage And Display" filed Dec. 4, 2018, U.S. Pat. Pub. No. 2019/0200981 entitled "Method Of Compressing Tissue Within A Stapling Device And Simultaneously Displaying The Location Of The Tissue Within The Jaws" filed Dec. 4, 2018, U.S. Pat. Pub. No. 2019/0201046 entitled "Method For Controlling Smart Energy Devices" filed Dec. 4, 2018, U.S. Pat. Pub. No. 2019/0201114 entitled "Adaptive Control Program Updates For Surgical Hubs" filed Mar. 29, 2018, U.S. Pat. Pub. No. 2019/0201140 entitled "Surgical Hub Situational Awareness" filed Mar. 29, 2018, U.S. Pat. Pub. No. 2019/0206004 entitled "Interactive Surgical Systems With Condition Handling Of Devices And Data Capabilities" filed Mar. 29, 2018, U.S. Pat. Pub. No. 2019/0206555 entitled "Cloud-based Medical Analytics For Customization And Recommendations To A User" filed Mar. 29, 2018, and U.S. Pat. Pub. No. 2019/0207857 entitled "Surgical Network Determination Of Prioritization Of Communication, Interaction, Or Processing Based On System Or Device Needs" filed Nov. 6, 2018, which are hereby incorporated by reference in their entireties.

Figure 18:
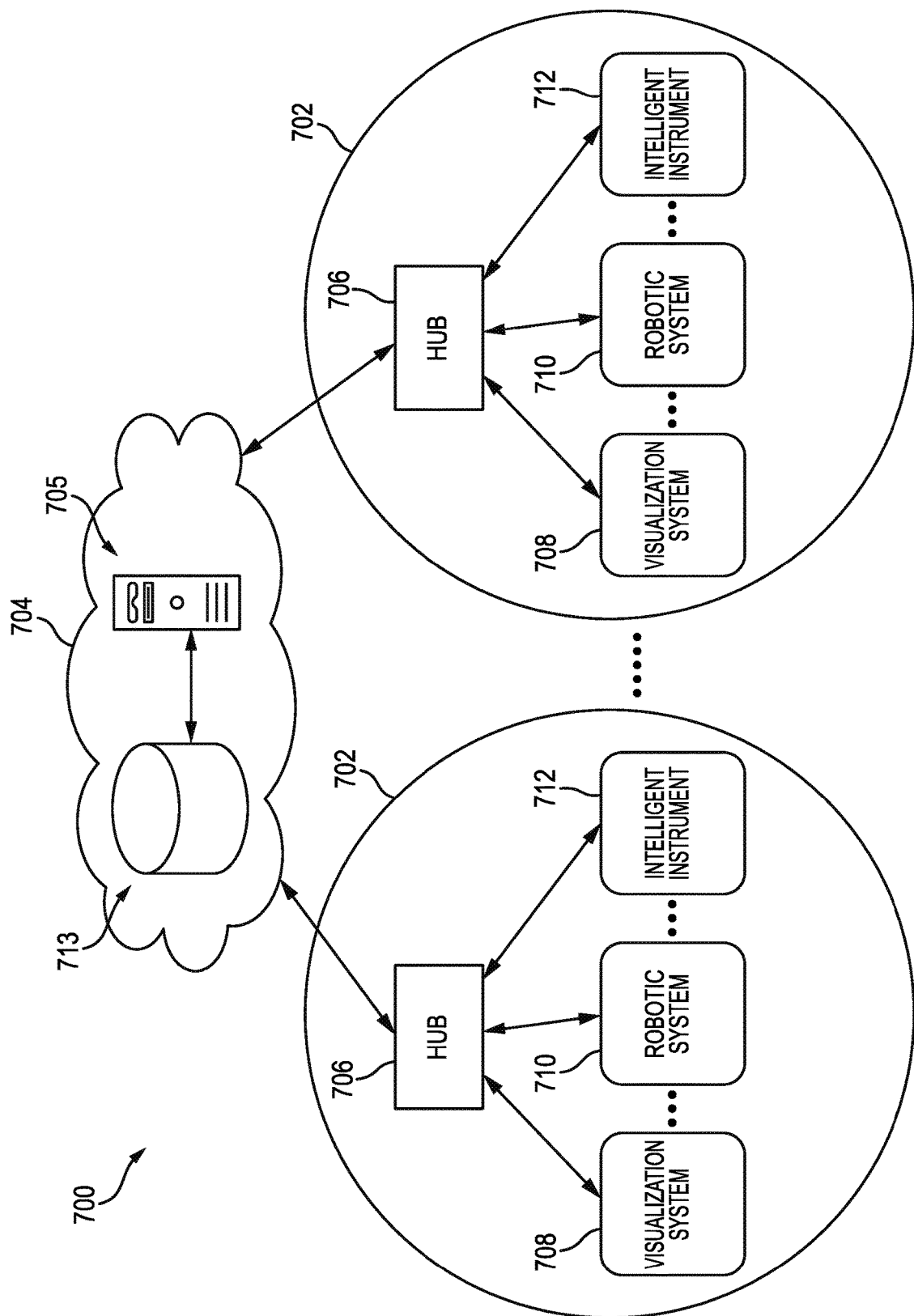
FIG. 18 is a schematic view of one embodiment of a computer-implemented interactive surgical system.

FIG. 18 illustrates one embodiment of a computer-implemented interactive surgical system 700 that includes one or more surgical systems 702 and a cloud-based system (e.g., a cloud 704 that can include a remote server 713 coupled to a storage device 705). Each surgical system 702 includes at least one surgical hub 706 in communication with the cloud 704. In one example, as illustrated in FIG. 18, the surgical system 702 includes a visualization system 708, a robotic system 710, and an intelligent (or "smart") surgical instrument 712, which are configured to communicate with one another and/or the hub 706. The intelligent surgical instrument 712 can include imaging device(s). The surgical system 702 can include an M number of hubs 706, an N number of visualization systems 708, an O number of robotic systems 710, and a P number of intelligent surgical instruments 712, where M, N, O, and P are integers greater than or equal to one that may or may not be equal to any one or more of each other. Various exemplary intelligent surgical instruments and robotic systems are described herein.

Data received by a surgical hub from a surgical visualization system can be used in any of a variety of ways. In an exemplary embodiment, the surgical hub can receive data from a surgical visualization system in use with a patient in a surgical setting, e.g., in use in an operating room during performance of a surgical procedure. The surgical hub can use the received data in any of one or more ways, as discussed herein.

The surgical hub can be configured to analyze received data in real time with use of the surgical visualization system and adjust control one or more of the surgical visualization system and/or one or more intelligent surgical instruments in use with the patient based on the analysis of the received data. Such adjustment can include, for example, adjusting one or operational control parameters of intelligent surgical instrument(s), causing one or more sensors of one or more intelligent surgical instruments to take a measurement to help gain an understanding of the patient's current physiological condition, and/or current operational status of an intelligent surgical instrument, and other adjustments. Controlling and adjusting operation of intelligent surgical instruments is discussed further below. Examples of operational control parameters of an intelligent surgical instrument include motor speed, cutting element speed, time, duration, level of energy application, and light emission. Examples of surgical hubs and of controlling and adjusting intelligent surgical instrument operation are described further in previously mentioned U.S. patent application Ser. No. 16/729,772 entitled "Analyzing Surgical Trends By A Surgical System" filed Dec. 30, 2019, U.S. patent application Ser. No. 16/729,747 entitled "Dynamic Surgical Visualization Systems" filed Dec. 30, 2019, U.S. patent application Ser. No. 16/729,744 entitled "Visualization Systems Using Structured Light" filed Dec. 30, 2019, U.S. patent application Ser. No. 16/729,778 entitled "System And Method For Determining, Adjusting, And Managing Resection Margin About A Subject Tissue" filed Dec. 30, 2019, U.S. patent application Ser. No. 16/729,729 entitled "Surgical Systems For Proposing And Corroborating Organ Portion Removals" filed Dec. 30, 2019, U.S. patent application Ser. No. 16/729,778 entitled "Surgical System For Overlaying Surgical Instrument Data Onto A Virtual Three Dimensional Construct Of An Organ" filed Dec. 30, 2019, U.S. patent application Ser. No. 16/729,751 entitled "Surgical Systems For Generating Three Dimensional Constructs Of Anatomical Organs And Coupling Identified Anatomical Structures Thereto" filed Dec. 30, 2019, U.S. patent application Ser. No. 16/729,740 entitled "Surgical Systems Correlating Visualization Data And Powered Surgical Instrument Data" filed Dec. 30, 2019, U.S. patent application Ser. No. 16/729,737 entitled "Adaptive Surgical System Control According To Surgical Smoke Cloud Characteristics" filed Dec. 30, 2019, U.S. patent application Ser. No. 16/729,796 entitled "Adaptive Surgical System Control According To Surgical Smoke Particulate Characteristics" filed Dec. 30, 2019, U.S. patent application Ser. No. 16/729,803 entitled "Adaptive Visualization By A Surgical System" filed Dec. 30, 2019, and U.S. patent application Ser. No. 16/729,807 entitled "Method Of Using Imaging Devices In Surgery" filed Dec. 30, 2019, and in U.S. patent application Ser. No. 17/068,857 entitled "Adaptive Responses From Smart Packaging Of Drug Delivery Absorbable Adjuncts" filed Oct. 13, 2020, U.S. patent application Ser. No. 17/068,858 entitled "Drug Administration Devices That Communicate With Surgical Hubs" filed Oct. 13, 2020, U.S. patent application Ser. No. 17/068,859 entitled "Controlling Operation Of Drug Administration Devices Using Surgical Hubs" filed Oct. 13, 2020, U.S. patent application Ser. No. 17/068,863 entitled "Patient Monitoring Using Drug Administration Devices" filed Oct.

13, 2020, U.S. patent application Ser. No. 17/068,865 entitled "Monitoring And Communicating Information Using Drug Administration Devices" filed Oct. 13, 2020, and U.S. patent application Ser. No. 17/068,867 entitled "Aggregating And Analyzing Drug Administration Data" filed Oct. 13, 2020, which are hereby incorporated by reference in their entireties.

The surgical hub can be configured to cause visualization of the received data to be provided in the surgical setting on a display so that a medical practitioner in the surgical setting can view the data and thereby receive an understanding of the operation of the imaging device(s) in use in the surgical setting. Such information provided via visualization can include text and/or images.

Figure 19:
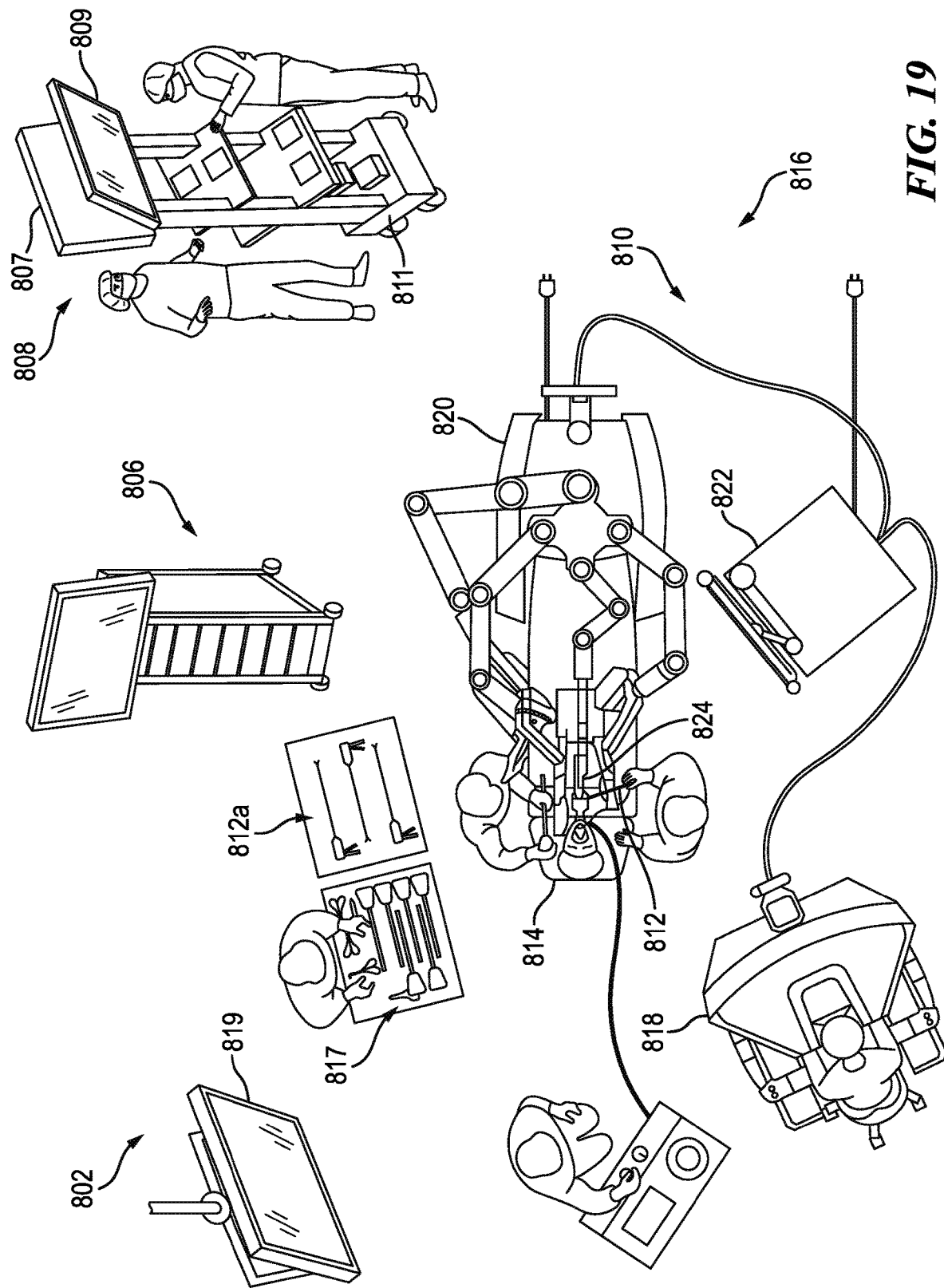
FIG. 19 is a schematic view of one embodiment a surgical system being used to perform a surgical procedure in an operating room.

FIG. 19 illustrates one embodiment of a surgical system 802 including a surgical hub 806 (e.g., the surgical hub 706 of FIG. 18 or other surgical hub described herein), a robotic surgical system 810 (e.g., the robotic surgical system 110 of FIG. 1 or other robotic surgical system herein), and a visualization system 808 (e.g., the visualization system 100 of FIG. 1 or other visualization system described herein). The surgical hub 806 can be in communication with a cloud, as discussed herein. FIG. 19 shows the surgical system 802 being used to perform a surgical procedure on a patient who is lying down on an operating table 814 in a surgical operating room 816. The robotic system 810 includes a surgeon's console 818, a patient side cart 820 (surgical robot), and a robotic system surgical hub 822. The robotic system surgical hub 822 is generally configured similar to the surgical hub 822 and can be in communication with a cloud. In some embodiments, the robotic system surgical hub 822 and the surgical hub 806 can be combined. The patient side cart 820 can manipulate an intelligent surgical tool 812 through a minimally invasive incision in the body of the patient while a medical practitioner, e.g., a surgeon, nurse, and/or other medical practitioner, views the surgical site through the surgeon's console 818. An image of the surgical site can be obtained by an imaging device 824 (e.g., the imaging device 120 of FIG. 1 or other imaging device described herein), which can be manipulated by the patient side cart 820 to orient the imaging device 824. The robotic system surgical hub 822 can be used to process the images of the surgical site for subsequent display to the surgeon through the surgeon's console 818.

A primary display 819 is positioned in the sterile field of the operating room 816 and is configured to be visible to an operator at the operating table 814. In addition, as in this illustrated embodiment, a visualization tower 818 can positioned outside the sterile field. The visualization tower 818 includes a first non-sterile display 807 and a second non-sterile display 809, which face away from each other. The visualization system 808, guided by the surgical hub 806, is configured to utilize the displays 807, 809, 819 to coordinate information flow to medical practitioners inside and outside the sterile field. For example, the surgical hub 806 can cause the visualization system 808 to display a snapshot and/or a video of a surgical site, as obtained by the imaging device 824, on one or both of the non-sterile displays 807, 809, while maintaining a live feed of the surgical site on the primary display 819. The snapshot and/or video on the non-sterile display 807 and/or 809 can permit a non-sterile medical practitioner to perform a diagnostic step relevant to the surgical procedure, for example.

The surgical hub 806 is configured to route a diagnostic input or feedback entered by a non-sterile medical practitioner at the visualization tower 818 to the primary display 819 within the sterile field, where it can be viewed by a sterile medical practitioner at the operating table 814. For example, the input can be in the form of a modification to the snapshot and/or video displayed on the non-sterile display 807 and/or 809, which can be routed to the primary display 819 by the surgical hub 806.

The surgical hub 806 is configured to coordinate information flow to a display of the intelligent surgical instrument 812, as is described in various U.S. patent applications that are incorporated by reference herein in the present disclosure. A diagnostic input or feedback entered by a non-sterile operator at the visualization tower 818 can be routed by the surgical hub 806 to the display 819 within the sterile field, where it can be viewed by the operator of the surgical instrument 812 and/or by other medical practitioner(s) in the sterile field.

The intelligent surgical instrument 812 and the imaging device 824, which is also an intelligent surgical tool, is being used with the patient in the surgical procedure as part of the surgical system 802. Other intelligent surgical instruments 812a that can be used in the surgical procedure, e.g., that can be removably coupled to the patient side cart 820 and be in communication with the robotic surgical system 810 and the surgical hub 806, are also shown in FIG. 19 as being available. Non-intelligent (or "dumb") surgical instruments 817, e.g., scissors, trocars, cannulas, scalpels, etc., that cannot be in communication with the robotic surgical system 810 and the surgical hub 806 are also shown in FIG. 19 as being available for use.

Operating Intelligent Surgical Instruments

An intelligent surgical device can have an algorithm stored thereon, e.g., in a memory thereof, configured to be executable on board the intelligent surgical device, e.g., by a processor thereof, to control operation of the intelligent surgical device. In some embodiments, instead of or in addition to being stored on the intelligent surgical device, the algorithm can be stored on a surgical hub, e.g., in a memory thereof, that is configured to communicate with the intelligent surgical device.

The algorithm is stored in the form of one or more sets of pluralities of data points defining and/or representing instructions, notifications, signals, etc. to control functions of the intelligent surgical device. In some embodiments, data gathered by the intelligent surgical device can be used by the intelligent surgical device, e.g., by a processor of the intelligent surgical device, to change at least one variable parameter of the algorithm. As discussed above, a surgical hub can be in communication with an intelligent surgical device, so data gathered by the intelligent surgical device can be communicated to the surgical hub and/or data gathered by another device in communication with the surgical hub can be communicated to the surgical hub, and data can be communicated from the surgical hub to the intelligent surgical device. Thus, instead of or in addition to the intelligent surgical device being configured to change a stored variable parameter, the surgical hub can be configured to communicate the changed at least one variable, alone or as part of the algorithm, to the intelligent surgical device and/or the surgical hub can communicate an instruction to the intelligent surgical device to change the at least one variable as determined by the surgical hub.

The at least one variable parameter is among the algorithm's data points, e.g., are included in instructions for operating the intelligent surgical device, and are thus each able to be changed by changing one or more of the stored pluralities of data points of the algorithm. After the at least one variable parameter has been changed, subsequent execution of the algorithm is according to the changed algorithm. As such, operation of the intelligent surgical device over time can be managed for a patient to increase the beneficial results use of the intelligent surgical device by taking into consideration actual situations of the patient and actual conditions and/or results of the surgical procedure in which the intelligent surgical device is being used. Changing the at least one variable parameter is automated to improve patient outcomes. Thus, the intelligent surgical device can be configured to provide personalized medicine based on the patient and the patient's surrounding conditions to provide a smart system. In a surgical setting in which the intelligent surgical device is being used during performance of a surgical procedure, automated changing of the at least one variable parameter may allow for the intelligent surgical device to be controlled based on data gathered during the performance of the surgical procedure, which may help ensure that the intelligent surgical device is used efficiently and correctly and/or may help reduce chances of patient harm by harming a critical anatomical structure.

The at least one variable parameter can be any of a variety of different operational parameters. Examples of variable parameters include motor speed, motor torque, energy level, energy application duration, tissue compression rate, jaw closure rate, cutting element speed, load threshold, etc.

Figure 20:
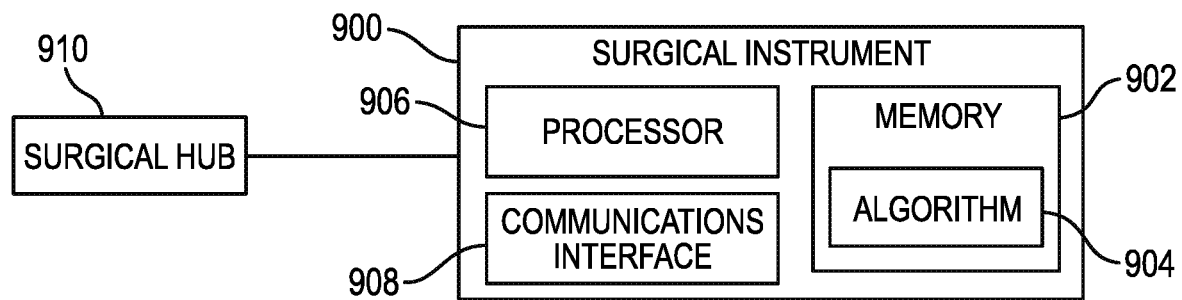
FIG. 20 is a schematic view of one embodiment of a surgical system including a smart surgical instrument and a surgical hub.

FIG. 20 illustrates one embodiment of an intelligent surgical instrument 900 including a memory 902 having an algorithm 904 stored therein that includes at least one variable parameter. The algorithm 904 can be a single algorithm or can include a plurality of algorithms, e.g., separate algorithms for different aspects of the surgical instrument's operation, where each algorithm includes at least one variable parameter. The intelligent surgical instrument 900 can be the surgical device 102 of FIG. 1, the imaging device 120 of FIG. 1, the surgical device 202 of FIG. 8, the imaging device 220 of FIG. 8, the surgical device 402 of FIG. 15, the surgical device 502a of FIG. 17, the surgical device 502b of FIG. 17, the surgical device 712 of FIG. 18, the surgical device 812 of FIG. 19, the imaging device 824 of FIG. 19, or other intelligent surgical instrument. The surgical instrument 900 also includes a processor 906 configured to execute the algorithm 904 to control operation of at least one aspect of the surgical instrument 900. To execute the algorithm 904, the processor 906 is configured to run a program stored in the memory 902 to access a plurality of data points of the algorithm 904 in the memory 902.

The surgical instrument 900 also includes a communications interface 908, e.g., a wireless transceiver or other wired or wireless communications interface, configured to communicate with another device, such as a surgical hub 910. The communications interface 908 can be configured to allow one-way communication, such as providing data to a remote server (e.g., a cloud server or other server) and/or to a local, surgical hub server, and/or receiving instructions or commands from a remote server and/or a local, surgical hub server, or two-way communication, such as providing information, messages, data, etc. regarding the surgical instrument 900 and/or data stored thereon and receiving instructions, such as from a doctor; a remote server regarding updates to software; a local, surgical hub server regarding updates to software; etc.

The surgical instrument 900 is simplified in FIG. 20 and can include additional components, e.g., a bus system, a handle, a elongate shaft having an end effector at a distal end thereof, a power source, etc. The processor 906 can also be configured to execute instructions stored in the memory 902 to control the device 900 generally, including other electrical components thereof such as the communications interface 908, an audio speaker, a user interface, etc.

The processor 906 is configured to change at least one variable parameter of the algorithm 904 such that a subsequent execution of the algorithm 904 will be in accordance with the changed at least one variable parameter. To change the at least one variable parameter of the algorithm 904, the processor 906 is configured to modify or update the data point(s) of the at least one variable parameter in the memory 902. The processor 906 can be configured to change the at least one variable parameter of the algorithm 904 in real time with use of the surgical device 900 during performance of a surgical procedure, which may accommodate real time conditions.

Additionally or alternatively to the processor 906 changing the at least one variable parameter, the processor 906 can be configured to change the algorithm 904 and/or at least one variable parameter of the algorithm 904 in response to an instruction received from the surgical hub 910. In some embodiments, the processor 906 is configured to change the at least one variable parameter only after communicating with the surgical hub 910 and receiving an instruction therefrom, which may help ensure coordinated action of the surgical instrument 900 with other aspects of the surgical procedure in which the surgical instrument 900 is being used.

In an exemplary embodiment, the processor 906 executes the algorithm 904 to control operation of the surgical instrument 900, changes the at least one variable parameter of the algorithm 904 based on real time data, and executes the algorithm 904 after changing the at least one variable parameter to control operation of the surgical instrument 900.

Figure 21:
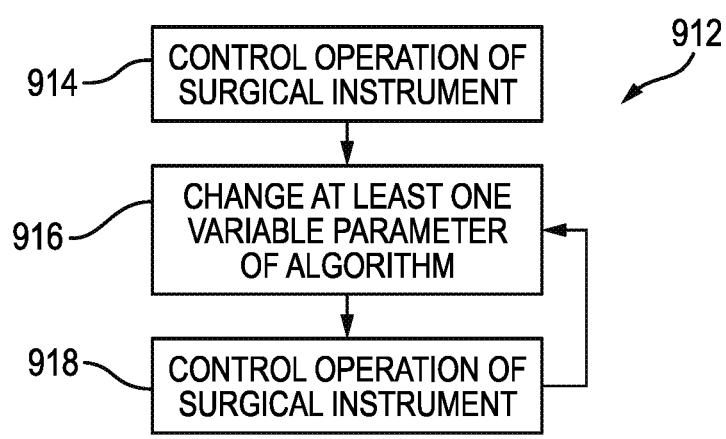
FIG. 21 is a flowchart showing a method of controlling the smart surgical instrument of FIG. 20.

FIG. 21 illustrates one embodiment of a method 912 of using of the surgical instrument 900 including a change of at least one variable parameter of the algorithm 904. The processor 906 controls 914 operation of the surgical instrument 900 by executing the algorithm 904 stored in the memory 902. Based on any of this subsequently known data and/or subsequently gathered data, the processor 904 changes 916 the at least one variable parameter of the algorithm 904 as discussed above. After changing the at least one variable parameter, the processor 906 controls 918 operation of the surgical instrument 900 by executing the algorithm 904, now with the changed at least one variable parameter. The processor 904 can change 916 the at least one variable parameter any number of times during performance of a surgical procedure, e.g., zero, one, two, three, etc. During any part of the method 912, the surgical instrument 900 can communicate with one or more computer systems, e.g., the surgical hub 910, a remote server such as a cloud server, etc., using the communications interface 908 to provide data thereto and/or receive instructions therefrom.

Situational Awareness

Operation of an intelligent surgical instrument can be altered based on situational awareness of the patient. The operation of the intelligent surgical instrument can be altered manually, such as by a user of the intelligent surgical instrument handling the instrument differently, providing a different input to the instrument, ceasing use of the instrument, etc. Additionally or alternatively, the operation of an intelligent surgical instrument can be changed automatically by an algorithm of the instrument being changed, e.g., by changing at least one variable parameter of the algorithm. As mentioned above, the algorithm can be adjusted automatically without user input requesting the change. Automating the adjustment during performance of a surgical procedure may help save time, may allow medical practitioners to focus on other aspects of the surgical procedure, and/or may ease the process of using the surgical instrument for a medical practitioner, which each may improve patient outcomes, such as by avoiding a critical structure, controlling the surgical instrument with consideration of a tissue type the instrument is being used on and/or near, etc.

The visualization systems described herein can be utilized as part of a situational awareness system that can be embodied or executed by a surgical hub, e.g., the surgical hub 706, the surgical hub 806, or other surgical hub described herein. In particular, characterizing, identifying, and/or visualizing surgical instruments (including their positions, orientations, and actions), tissues, structures, users, and/or other things located within the surgical field or the operating theater can provide contextual data that can be utilized by a situational awareness system to infer various information, such as a type of surgical procedure or a step thereof being performed, a type of tissue(s) and/or structure(s) being manipulated by a surgeon or other medical practitioner, and other information. The contextual data can then be utilized by the situational awareness system to provide alerts to a user, suggest subsequent steps or actions for the user to undertake, prepare surgical devices in anticipation for their use (e.g., activate an electrosurgical generator in anticipation of an electrosurgical instrument being utilized in a subsequent step of the surgical procedure, etc.), control operation of intelligent surgical instruments (e.g., customize surgical instrument operational parameters of an algorithm as discussed further below), and so on.

Although an intelligent surgical device including an algorithm that responds to sensed data, e.g., by having at least one variable parameter of the algorithm changed, can be an improvement over a "dumb" device that operates without accounting for sensed data, some sensed data can be incomplete or inconclusive when considered in isolation, e.g., without the context of the type of surgical procedure being performed or the type of tissue that is being operated on. Without knowing the procedural context (e.g., knowing the type of tissue being operated on or the type of procedure being performed), the algorithm may control the surgical device incorrectly or sub-optimally given the particular context-free sensed data. For example, the optimal manner for an algorithm to control a surgical instrument in response to a particular sensed parameter can vary according to the particular tissue type being operated on. This is due to the fact that different tissue types have different properties (e.g., resistance to tearing, ease of being cut, etc.) and thus respond differently to actions taken by surgical instruments. Therefore, it may be desirable for a surgical instrument to take different actions even when the same measurement for a particular parameter is sensed. As one example, the optimal manner in which to control a surgical stapler in response to the surgical stapler sensing an unexpectedly high force to close its end effector will vary depending upon whether the tissue type is susceptible or resistant to tearing. For tissues that are susceptible to tearing, such as lung tissue, the surgical instrument's control algorithm would optimally ramp down the motor in response to an unexpectedly high force to close to avoid tearing the tissue, e.g., change a variable parameter controlling motor speed or torque so the motor is slower. For tissues that are resistant to tearing, such as stomach tissue, the instrument's algorithm would optimally ramp up the motor in response to an unexpectedly high force to close to ensure that the end effector is clamped properly on the tissue, e.g., change a variable parameter controlling motor speed or torque so the motor is faster. Without knowing whether lung or stomach tissue has been clamped, the algorithm may be sub-optimally changed or not changed at all.

A surgical hub can be configured to derive information about a surgical procedure being performed based on data received from various data sources and then control modular devices accordingly. In other words, the surgical hub can be configured to infer information about the surgical procedure from received data and then control the modular devices operably coupled to the surgical hub based upon the inferred context of the surgical procedure. Modular devices can include any surgical device that is controllable by a situational awareness system, such as visualization system devices (e.g., a camera, a display screen, etc.), smart surgical instruments (e.g., an ultrasonic surgical instrument, an electrosurgical instrument, a surgical stapler, smoke evacuators, scopes, etc.). A modular device can include sensor(s)s configured to detect parameters associated with a patient with which the device is being used and/or associated with the modular device itself.

The contextual information derived or inferred from the received data can include, for example, a type of surgical procedure being performed, a particular step of the surgical procedure that the surgeon (or other medical practitioner) is performing, a type of tissue being operated on, or a body cavity that is the subject of the surgical procedure. The situational awareness system of the surgical hub can be configured to derive the contextual information from the data received from the data sources in a variety of different ways. In an exemplary embodiment, the contextual information received by the situational awareness system of the surgical hub is associated with a particular control adjustment or set of control adjustments for one or more modular devices. The control adjustments each correspond to a variable parameter. In one example, the situational awareness system includes a pattern recognition system, or machine learning system (e.g., an artificial neural network), that has been trained on training data to correlate various inputs (e.g., data from databases, patient monitoring devices, and/or modular devices) to corresponding contextual information regarding a surgical procedure. In other words, a machine learning system can be trained to accurately derive contextual information regarding a surgical procedure from the provided inputs. In another example, the situational awareness system can include a lookup table storing pre-characterized contextual information regarding a surgical procedure in association with one or more inputs (or ranges of inputs) corresponding to the contextual information. In response to a query with one or more inputs, the lookup table can return the corresponding contextual information for the situational awareness system for controlling at least one modular device. In another example, the situational awareness system includes a further machine learning system, lookup table, or other such system, which generates or retrieves one or more control adjustments for one or more modular devices when provided the contextual information as input.

A surgical hub including a situational awareness system may provide any number of benefits for a surgical system. One benefit includes improving the interpretation of sensed and collected data, which would in turn improve the processing accuracy and/or the usage of the data during the course of a surgical procedure. Another benefit is that the situational awareness system for the surgical hub may improve surgical procedure outcomes by allowing for adjustment of surgical instruments (and other modular devices) for the particular context of each surgical procedure (such as adjusting to different tissue types) and validating actions during a surgical procedure. Yet another benefit is that the situational awareness system may improve surgeon's and/or other medical practitioners' efficiency in performing surgical procedures by automatically suggesting next steps, providing data, and adjusting displays and other modular devices in the surgical theater according to the specific context of the procedure. Another benefit includes proactively and automatically controlling modular devices according to the particular step of the surgical procedure that is being performed to reduce the number of times that medical practitioners are required to interact with or control the surgical system during the course of a surgical procedure, such as by a situationally aware surgical hub proactively activating a generator to which an RF electrosurgical instrument is connected if it determines that a subsequent step of the procedure requires the use of the instrument. Proactively activating the energy source allows the instrument to be ready for use a soon as the preceding step of the procedure is completed.

For example, a situationally aware surgical hub can be configured to determine what type of tissue is being operated on. Therefore, when an unexpectedly high force to close a surgical instrument's end effector is detected, the situationally aware surgical hub can be configured to correctly ramp up or ramp down a motor of the surgical instrument for the type of tissue, e.g., by changing or causing change of at least one variable parameter of an algorithm for the surgical instrument regarding motor speed or torque.

For another example, a type of tissue being operated can affect adjustments that are made to compression rate and load thresholds of a surgical stapler for a particular tissue gap measurement. A situationally aware surgical hub can be configured to infer whether a surgical procedure being performed is a thoracic or an abdominal procedure, allowing the surgical hub to determine whether the tissue clamped by an end effector of the surgical stapler is lung tissue (for a thoracic procedure) or stomach tissue (for an abdominal procedure). The surgical hub can then be configured to cause adjustment of the compression rate and load thresholds of the surgical stapler appropriately for the type of tissue, e.g., by changing or causing change of at least one variable parameter of an algorithm for the surgical stapler regarding compression rate and load threshold.

As yet another example, a type of body cavity being operated in during an insufflation procedure can affect the function of a smoke evacuator. A situationally aware surgical hub can be configured to determine whether the surgical site is under pressure (by determining that the surgical procedure is utilizing insufflation) and determine the procedure type. As a procedure type is generally performed in a specific body cavity, the surgical hub can be configured to control a motor rate of the smoke evacuator appropriately for the body cavity being operated in, e.g., by changing or causing change of at least one variable parameter of an algorithm for the smoke evacuator regarding motor rate. Thus, a situationally aware surgical hub may provide a consistent amount of smoke evacuation for both thoracic and abdominal procedures.

As yet another example, a type of procedure being performed can affect the optimal energy level for an ultrasonic surgical instrument or radio frequency (RF) electrosurgical instrument to operate at. Arthroscopic procedures, for example, require higher energy levels because an end effector of the ultrasonic surgical instrument or RF electrosurgical instrument is immersed in fluid. A situationally aware surgical hub can be configured to determine whether the surgical procedure is an arthroscopic procedure. The surgical hub can be configured to adjust an RF power level or an ultrasonic amplitude of the generator (e.g., adjust energy level) to compensate for the fluid filled environment, e.g., by changing or causing change of at least one variable parameter of an algorithm for the instrument and/or a generator regarding energy level. Relatedly, a type of tissue being operated on can affect the optimal energy level for an ultrasonic surgical instrument or RF electrosurgical instrument to operate at. A situationally aware surgical hub can be configured to determine what type of surgical procedure is being performed and then customize the energy level for the ultrasonic surgical instrument or RF electrosurgical instrument, respectively, according to the expected tissue profile for the surgical procedure, e.g., by changing or causing change of at least one variable parameter of an algorithm for the instrument and/or a generator regarding energy level. Furthermore, a situationally aware surgical hub can be configured to adjust the energy level for the ultrasonic surgical instrument or RF electrosurgical instrument throughout the course of a surgical procedure, rather than just on a procedure-by-procedure basis. A situationally aware surgical hub can be configured to determine what step of the surgical procedure is being performed or will subsequently be performed and then update the control algorithm (s) for the generator and/or ultrasonic surgical instrument or RF electrosurgical instrument to set the energy level at a value appropriate for the expected tissue type according to the surgical procedure step.

As another example, a situationally aware surgical hub can be configured to determine whether the current or subsequent step of a surgical procedure requires a different view or degree of magnification on a display according to feature(s) at the surgical site that the surgeon and/or other medical practitioner is expected to need to view. The surgical hub can be configured to proactively change the displayed view (supplied by, e.g., an imaging device for a visualization system) accordingly so that the display automatically adjusts throughout the surgical procedure.

As yet another example, a situationally aware surgical hub can be configured to determine which step of a surgical procedure is being performed or will subsequently be performed and whether particular data or comparisons between data will be required for that step of the surgical procedure. The surgical hub can be configured to automatically call up data screens based upon the step of the surgical procedure being performed, without waiting for the surgeon or other medical practitioner to ask for the particular information.

As another example, a situationally aware surgical hub can be configured to determine whether a surgeon and/or other medical practitioner is making an error or otherwise deviating from an expected course of action during the course of a surgical procedure, e.g., as provided in a preoperative surgical plan. For example, the surgical hub can be configured to determine a type of surgical procedure being performed, retrieve a corresponding list of steps or order of equipment usage (e.g., from a memory), and then compare the steps being performed or the equipment being used during the course of the surgical procedure to the expected steps or equipment for the type of surgical procedure that the surgical hub determined is being performed. The surgical hub can be configured to provide an alert (visual, audible, and/or tactile) indicating that an unexpected action is being performed or an unexpected device is being utilized at the particular step in the surgical procedure.

In certain instances, operation of a robotic surgical system, such as any of the various robotic surgical systems described herein, can be controlled by the surgical hub based on its situational awareness and/or feedback from the components thereof and/or based on information from a cloud (e.g., the cloud 713 of FIG. 18).

Embodiments of situational awareness systems and using situational awareness systems during performance of a surgical procedure are described further in previously mentioned U.S. patent application Ser. No. 16/729,772 entitled "Analyzing Surgical Trends By A Surgical System" filed Dec. 30, 2019, U.S. patent application Ser. No. 16/729,747 entitled "Dynamic Surgical Visualization Systems" filed Dec. 30, 2019, U.S. patent application Ser. No. 16/729,744 entitled "Visualization Systems Using Structured Light" filed Dec. 30, 2019, U.S. patent application Ser. No. 16/729,778 entitled "System And Method For Determining, Adjusting, And Managing Resection Margin About A Subject Tissue" filed Dec. 30, 2019, U.S. patent application Ser. No. 16/729,729 entitled "Surgical Systems For Proposing And Corroborating Organ Portion Removals" filed Dec. 30, 2019, U.S. patent application Ser. No. 16/729,778 entitled "Surgical System For Overlaying Surgical Instrument Data Onto A Virtual Three Dimensional Construct Of An Organ" filed Dec. 30, 2019, U.S. patent application Ser. No. 16/729,751 entitled "Surgical Systems For Generating Three Dimensional Constructs Of Anatomical Organs And Coupling Identified Anatomical Structures Thereto" filed Dec. 30, 2019, U.S. patent application Ser. No. 16/729,740 entitled "Surgical Systems Correlating Visualization Data And Powered Surgical Instrument Data" filed Dec. 30, 2019, U.S. patent application Ser. No. 16/729,737 entitled "Adaptive Surgical System Control According To Surgical Smoke Cloud Characteristics" filed Dec. 30, 2019, U.S. patent application Ser. No. 16/729,796 entitled "Adaptive Surgical System Control According To Surgical Smoke Particulate Characteristics" filed Dec. 30, 2019, U.S. patent application Ser. No. 16/729,803 entitled "Adaptive Visualization By A Surgical System" filed Dec. 30, 2019, and U.S. patent application Ser. No. 16/729,807 entitled "Method Of Using Imaging Devices In Surgery" filed Dec. 30, 2019.

Surgical Systems with Hybrid Intraluminal and Extraluminal Devices

In certain embodiments, surgical systems are configured to allow one or more endoluminal instruments to be introduced into an organ using a laparoscopic approach. That is, unlike conventional systems (e.g., systems with endoluminal instruments that are introduced through a natural orifice), the present surgical systems include endoluminal instruments that, when in use, approach and enter an organ (e.g., colon, bladder, stomach, and the like) through the laparoscopic side of the organ. This can provide bi-manual capability with reduced technical complexity.

Further, in some embodiments, laparoscopic instruments (e.g., grasper) and/or features (e.g., seals or stent-like structures) can be introduced into the extraluminal anatomical space and configured to provide local support for a portion (e.g., distal portion) of the endoluminal instrument(s). This local support can improve the intraluminal reaction load capabilities of the endoluminal instrument. That is, the local support can allow movement under load of the endoluminal instrument to enable rotating, longitudinal advancement, and contact between the end effector of the endoluminal instrument (e.g., ablation element or jaws) and the different intraluminal walls of the surgical site.

In one exemplary embodiment, the surgical system can generally include a first scope device having a first portion configured to be inserted into and positioned within an extraluminal anatomical space and a second portion distal to the first portion and configured to be positioned within an intraluminal anatomical space, and a second instrument configured to be inserted into the extraluminal anatomical space and configured to couple to and move the first portion of the first scope device within the extraluminal anatomical space to facilitate movement of the second portion of the first scope device while the second portion is positioned within the intraluminal anatomical space. In some embodiments, the first scope device can a flexible body with a working channel extending therethrough and a first imaging system at a distal end thereof. The working channel being configured to enable a distal end of a first instrument to be inserted into and through the extraluminal anatomical space and into the intraluminal anatomical space such that the first instrument is present in both the extraluminal and intraluminal spaces.

During use, in general, the first portion of the first device scope is inserted into the extraluminal anatomical space, and the second portion of the first scope device is further inserted into an intraluminal anatomical space. A first instrument is then inserted through the working channel to position the first instrument within both the extraluminal and intraluminal spaces. Further, the second instrument is inserted into the extraluminal anatomical space. The second instrument can be inserted into the extraluminal anatomical space, prior to, concurrently with, or subsequent to the insertion of the first device scope or the insertion of the first instrument. After insertion, the second instrument is moved to cause the inserted second portion of the first scope device to move within the intraluminal anatomical space. Prior to insertion of any one of the first scope device, the first instrument, or the second instrument, the extraluminal space, the intraluminal space, or both, can be insufflated, e.g., via a fluid port operatively coupled to the first portion of the first scope device.

In another exemplary embodiment, the surgical system can generally include an anchor member configured to be positioned within an extraluminal anatomical space and in contact with a tissue wall that at least partially defines an intraluminal anatomical space, and a cannula having a first portion configured to be inserted into and positioned within the extraluminal anatomical space and a second portion distal to the first portion that is configured to be positioned within an intraluminal anatomical space, and a selectively deployable stabilizing member arranged on the first portion of the cannula in the extraluminal anatomical space that is configured to couple to the anchor member. In some embodiments, the cannula can be configured to allow a distal end of a first instrument to be inserted into and through the extraluminal anatomical space and into the intraluminal anatomical space such that the first instrument is present in both the extraluminal and intraluminal anatomical spaces. Further, the selectively deployable stabilizing member, when in a deployed state, can be configured to provide an anchor point for the first instrument to facilitate pivotal movement of the first instrument within the intraluminal anatomical space.

An exemplary surgical system can include a variety of features as described herein and illustrated in the drawings. However, a person skilled in the art will appreciate that the surgical systems can include only some of these features and/or it can include a variety of other features known in the art. The surgical systems described herein are merely intended to represent certain exemplary embodiments. Moreover, while the surgical systems are shown and described in connection with a colon, a person skilled in the art will appreciate that these surgical anchoring systems can be used in connection with any other suitable body cavities or organs.

Figure 22:
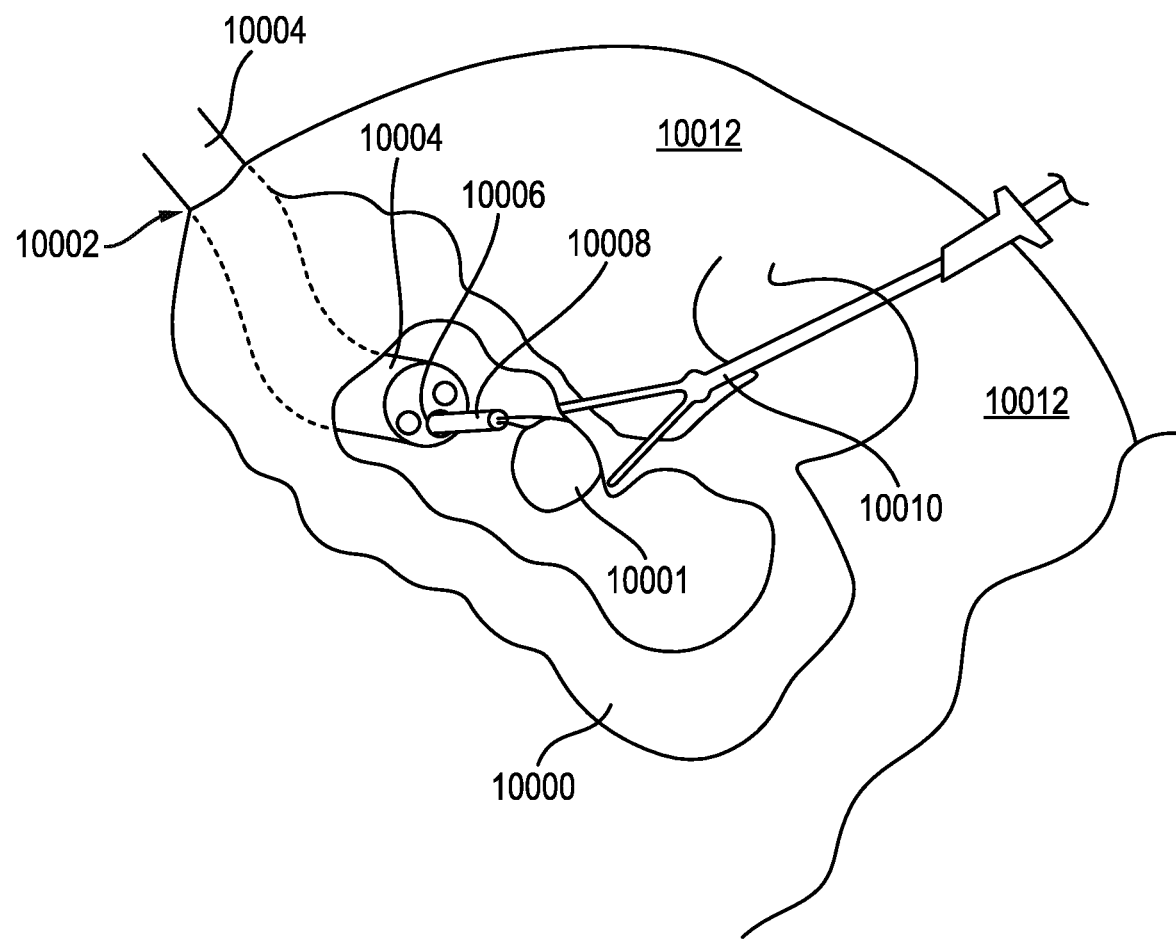
FIG. 22 is a schematic view of a conventional surgical system having endoscopic and laparoscopic instruments, showing a partial cut-away view of a colon with the endoscopic instrument inserted into the colon through a natural orifice and the laparoscopic instrument inserted through an abdominal cavity and interacting with the outer surface of the colon.

A surgical resection of a partial tissue wall thickness tumor is conventionally performed through a natural orifice. For example, as illustrated in FIG. 22, a colon 10000 includes a partial tissue wall tumor 10001. As shown, the conventional surgical system includes an endoscope 10004 that is inserted into the colon 10000 through the rectum 10002, and a first instrument 10008 that is passed through the working channel 10006 of the endoscope 10004. The first instrument 10008 engages the tumor 10001 for subsequent removal. A laparoscopic instrument 10010 (e.g., graspers) is inserted through an abdominal cavity 10012 and interacts with the colon 10000 to assist in stabilization of the tumor 10001 or to position the colon 10000 for tumor removal. As will discussed below in more detail, unlike these conventional surgical systems and procedures, the surgical systems disclosed herein are designed to remove diseased tissue (e.g., lesions or tumors) using endoluminal instruments that approach the natural lumen or organ from the laparoscopic side rather than through a natural orifice.

Figure 23:
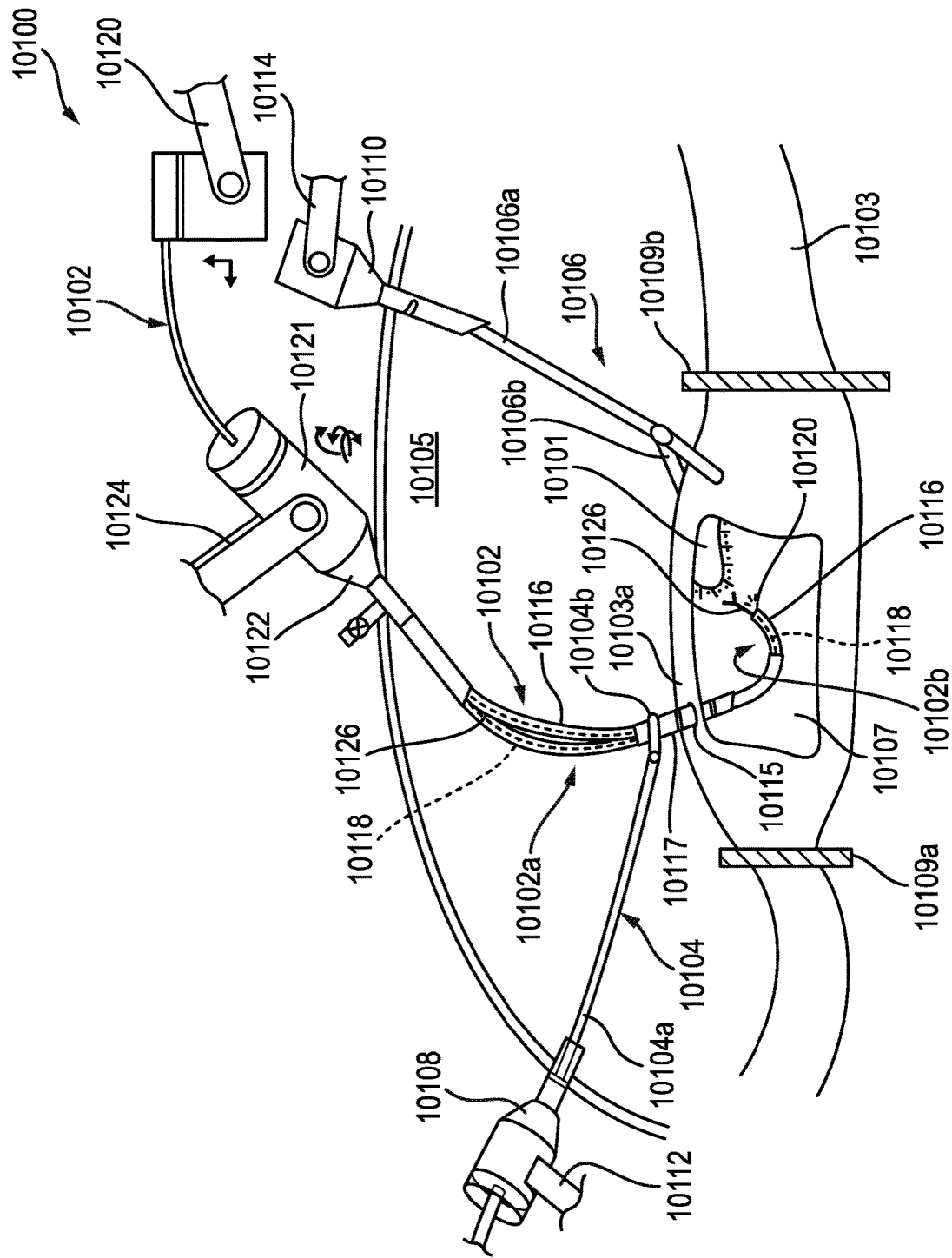
FIG. 23 is a schematic view of an exemplary embodiment of a surgical system having a laparoscopic instrument and an endoluminal instrument, showing the endoluminal instrument being inserted into a colon through a laparoscopic approach.

FIG. 23 illustrates an exemplary embodiment of a surgical system 10100 having a first scope device 10102 and first and second laparoscopic instruments 10104, 10106, which are being used in a surgical resection of a partial tissue wall thickness tumor 10101 located in a colon 10103. For purposes of simplicity, certain components of the surgical system 10010 are not illustrated.

The first and second laparoscopic instruments 10104, 10106 are each inserted into an abdominal cavity 10105 (e.g., an extraluminal anatomical space) through a respective first and second trocar 10108, 10110. The first and second trocar 10108, 10110 are each coupled to a respective robotic arm 10112, 10114. While the first and second laparoscopic instruments 10104, 10106 can have a variety of configuration, in this embodiment, each laparoscopic instrument 10104, 10106 has an elongate shaft 10104a, 10106a with an end effector 10104b, 10106b at a distal end thereof. While each end effector 10104b, 10106b can have a variety of configurations, in this illustrated embodiment, each end effector 10104b, 10106b is the form of a set of movable jaws. Further, while two laparoscopic instruments are shown, in other embodiments, any number of laparoscopic instruments can be used (e.g., one, three, four, etc.).

The first scope device 10102 includes a flexible body 10116 with a working channel extending 10118 therethrough and a first imaging system 10120 (e.g., a camera) at a distal end thereof. The flexible body can be formed of any suitable flexible material(s). As shown, during use, a proximal end of the first scope device 10102 is coupled to a first robotic arm 10120 and the first scope device 10102 extends into and through a trocar 10122 coupled to a second robotic arm 10124 and into the abdominal cavity 10105 (e.g., an extraluminal anatomical space). The trocar 10122 includes a fluid port 10123 that is configured to insufflate the abdominal cavity 10105 prior to or currently with the insertion of any devices or instruments into the abdominal cavity 10105. In other embodiments, the abdominal cavity 10105 can be insufflated using trocar 10112, 10114, or any other suitable insufflating mechanisms and devices.

The first scope device 10102 is further inserted through a wall 10103a of the colon 10103 and into a colon cavity 10107 (e.g., intraluminal anatomical space). While the first scope device 10102 can be inserted directly through an otomy 10115 made in the colon wall 10103a, in this illustrated embodiment, a lumen of a cannula 10117 that is inserted through the otomy 10115 and partially into the colon cavity 10107. As such, the first scope device 10102 is inserted into the colon cavity 10107 through the lumen of the cannula 10117.

As shown, the first scope device 10102 has a first portion 10102a that is present within the abdominal cavity 10105 and a second portion 10102b that is distal to the first portion 10102a and present within the colon cavity 10107. That is, the first scope device 10102 is designed to be introduced into the colon 10103 through a laparoscopic approach. Prior to insertion of the second portion of the first scope device, the colon can be insufflated, e.g., by introduction of fluid through a fluid port (not shown) or lumen (not shown) previously inserted into the colon. After insufflation, sealing clips 10109a and 10109b can be positioned on opposing ends of the insufflated region of the colon 10103.

In some embodiments, the trocar 10122 can provide structural support for the first portion 10102a of the first scope device 10102. Further, the first portion 10102a of the first scope device 10102 can be driven from the one or more tool drivers (now shown) positioned within the motor housing 10121 positioned between the robotic arm 10124 and the trocar 10122.

Since the first scope device 10102 has a flexible body 10116 that is present within both the abdominal cavity 10105 and the colon cavity 10107, a cooperative support element is needed such that the second portion 10102b of the first scope device 10102 can move within the colon cavity 10107. In this illustrated embodiment, the cooperative support element is the first laparoscopic instrument 10104. That is, as shown, the jaws of the end effector 10104b grasp to, and thus couple the first laparoscopic instrument 10104 to the first portion 10102a of the first scope device 10102.

While the jaws of the end effector can grasp the first portion 10102a of the first scope device 10104 at various locations, in this illustrated embodiment, the first laparoscopic instrument 10104 is coupled to the first portion 10102 at a predefined location that is within the abdominal cavity 10105 (e.g., an extraluminal anatomical space) and directly adjacent the colon wall 10103a. More specifically, the predefined location is proximate to the otomy 10115 made in the colon wall 10103a. In this embodiment, the elongate shaft 10104a of the first laparoscopic instrument 10104 is rigid and therefore can provide support to the first scope device and move the first portion of the first scope device within the abdominal cavity (e.g., an extraluminal space) to facilitate movement of the second portion of the first scope device 10102 within the colon cavity 10107 (e.g., an intraluminal anatomical space).

In some embodiments, the fixation provided by the first laparoscopic instrument 10104 can keep the otomy 10115 upright to prevent escape of the colon contents into the abdominal cavity 10105. Alternatively, or in addition, the jaws of the end effector 10104b can be configured to act as a wound protector that can prevent the first scope device 10102 from applying inappropriate loads to the otomy edges.

As further shown in FIG. 23, once the second portion 10102b of the first scope device 10102 is positioned within the colon cavity 10107, an instrument 10126 can be inserted through the working channel 10118 of the first scope device 10102 and into the colon cavity 10107. Once inserted, the instrument 10126 can interact with the tumor 10101 for subsequent removal. Further, the jaws of the end effector 10106b of the second laparoscopic device 10106 can interact with the colon 10103 to help stabilize the colon 10103 for removal of the tumor 10101.

Figure 24:
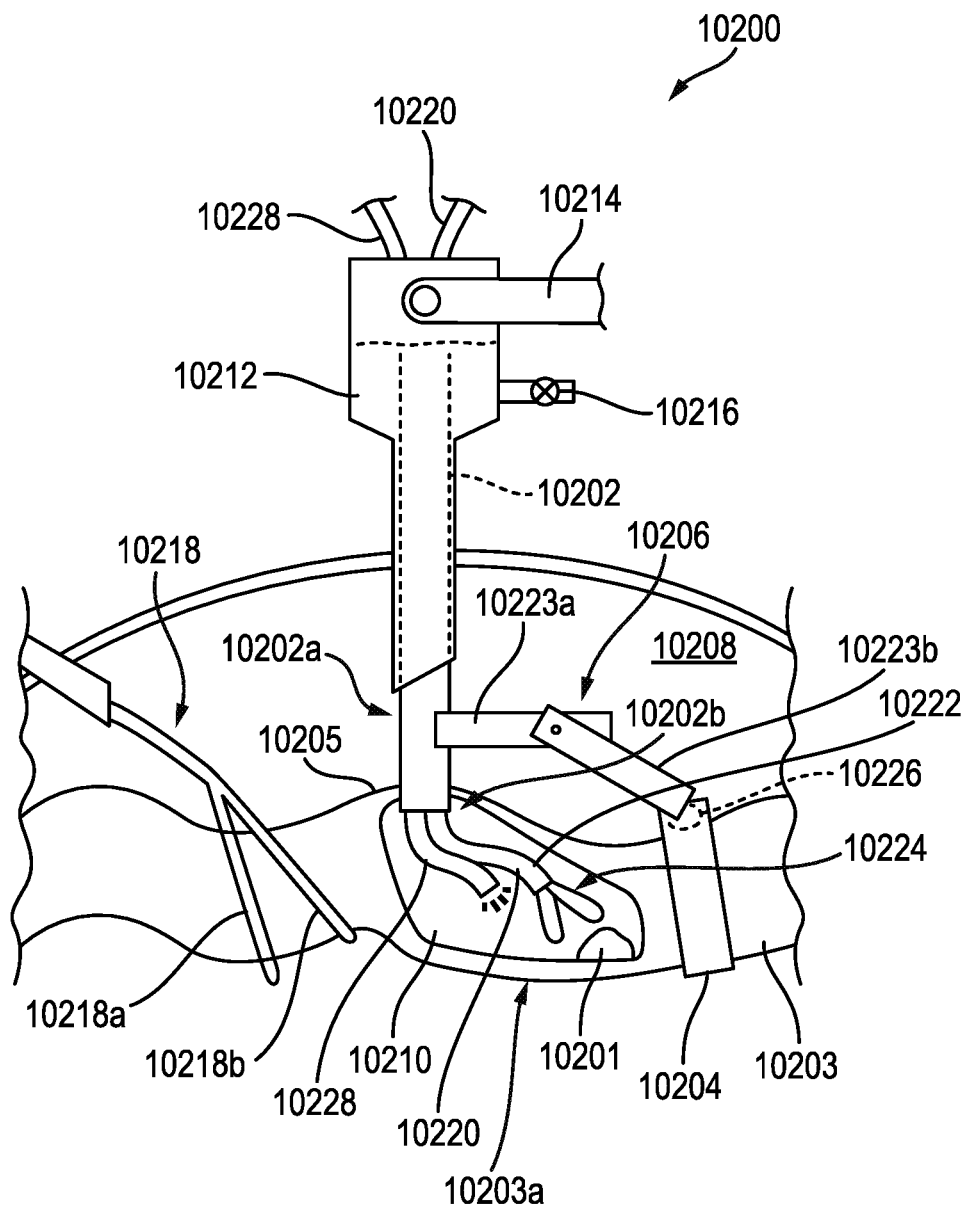
FIG. 24 is a schematic view of an exemplary embodiment of a surgical system having a laparoscopic instrument and two endoluminal instruments, showing the endoluminal instruments being inserted into a colon through a laparoscopic approach.

In some embodiments, localized mechanical docking can be used as a mechanism for stabilizing a flexible endoluminal device or instrument or device, for example, as illustrated in FIG. 24.

FIG. 24 illustrates an exemplary embodiment of a surgical system 10200 that is configured to allow laparoscopic access to an endoluminal surgical site. The surgical system 10200 includes a cannula 10202, an anchor member 10204, and a selectively deployable stabilizing member 10206, which are being used in a surgical resection of a partial tissue wall thickness tumor 10201 located in a colon 10203.

The cannula 10202 can have a variety of different configurations. In this illustrated embodiment, the cannula 10202 has a first portion 10202a configured to be inserted into and positioned within an abdominal cavity 10208 (e.g., an extraluminal anatomical space) and a second portion 10202b distal to the first portion 10202a that is configured to be positioned within a cavity 10210 of the colon 10203 (e.g., an intraluminal anatomical space). The cannula 10202 can be formed of any suitable material. As shown, during use, the cannula 10202 is inserted through a trocar 10212 that is coupled to a robotic arm 10214 and into the abdominal cavity 10208. The trocar 10212 includes a fluid port 10216 that is configured to insufflate the abdominal cavity 10208 prior to or currently with the insertion of any devices or instruments into the abdominal cavity 10208. In other embodiments, the abdominal cavity 10208 can be insufflated using another trocar or any other suitable insufflating mechanisms and devices.

The cannula 10202 is further inserted through a wall 10205 of the colon 10203 and into the colon cavity 10210 (e.g., an intraluminal anatomical space). Thus, the cannula 10202 is designed to be introduced into the colon 10203 through a laparoscopic approach. Further, once the first and second portions 10202a, 10202b are positioned within the abdominal cavity 10208 and the colon cavity 10201, respectively, a first instrument 10220 can be inserted therethrough such that a distal end of the first instrument 10220 can be positioned within the colon cavity 10210 and used to remove the tumor 10201.

As shown, the cannula 10202 allows a distal end of the first instrument 10220 to be introduced into the colon 10203 through the abdominal cavity 10208, and therefore the first instrument 10220 is present in both the abdominal cavity 10208 and the colon cavity 10210. While the first instrument 10220 can have a variety of configurations, in this illustrated embodiment, the first instrument 10220 includes a flexible shaft 10222 with a pair of jaws 10224 at a distal end thereof. The pair of jaws 10224 are configured to interact with the tumor 10201.

Prior to insertion of the second portion 10202b of the cannula 10202, the colon 10203 can be insufflated, e.g., by introduction of fluid through a fluid port (not shown) or lumen (not shown) previously inserted into the colon. After insufflation, the insufflated region 10203a can be sealed. For example, in this illustrated embodiment, the insufflated region 10203a is sealed by jaws 10218a, 10218b of a laparoscopic device 10218 that is inserted into the abdominal cavity 10208 with the jaws 10218a, 10218b grasping one end of the region and by the anchor member 10204 clipped about an opposing end of the region. As such, in this illustrated embodiment, the anchor member 10204 can function as both an anchor and a seal. In other embodiments, a separate sealing element can be used.

The anchor member 10204 can have a variety of configurations. In this illustrated embodiment, the anchor member 10202 is the form of a clip that is positioned within the abdominal cavity (e.g., an extraluminal anatomical space) and is in contact with the outer surface of the tissue wall 10203a of the colon 10203. Prior to, concurrently with, or subsequent to the insertion of the cannula 10202, the anchor member 10204 can be inserted into the abdominal cavity 10208 and placed in contact with the colon wall 10205 (e.g., arranged about a portion of the colon 10203).

As further shown in FIG. 24 the selectively deployable stabilizing member 10206 is arranged on the first portion 10202a of the cannula 10202, and thus within the abdominal cavity 10208 (e.g., an extraluminal anatomical space). The selectively deployable stabilizing member 10206 can have a variety of configurations. In this illustrated embodiment, the selectively deployable stabilizing member 10206 includes first and second links 10223a, 10223b pivotally connected to other, in which the first link 10223a is directly coupled to the cannula 10202. As such, the selectively deployable stabilizing member 10206 can move from an undeployed state to a deployed state (FIG. 24).

In use, when in a deployed state (FIG. 24), the selectively deployable stabilizing member 10206 is configured to couple to the anchor member 10204. This coupling provides an anchor point for the first instrument 10220 that is inserted through the cannula 10202. Since the first instrument 10220 includes a flexible shaft 10222, the anchor point allows the first instrument 10220 to pivotally move within the colon cavity 10210 with respect to the cannula 10202.

The selectively deployable stabilizing member 10206 can be coupled to the anchor member 10204 in a variety of ways. For example, in certain embodiments, the anchor member 10204 can include a magnet 10226 that is configured to couple the selectively deployable stabilizing member 10206 to the anchor member 10204 when the selectively deployable stabilizing member 10206 is in a deployed state. In other embodiments, any other suitable coupling mechanisms can be used.

Further, additional instruments or devices can be inserted through the cannula 10202 (e.g., through one or more lumens of the cannula). For example, as shown in FIG. 24, a first scope device 10228 can be inserted into and through the cannula 10202 such that a first portion of the first scope device 10228 is present in the abdominal cavity (e.g., an extraluminal anatomical space), and a second portion of the first scope device 10228 that is distal to the first portion is positioned in the colon cavity (e.g., an intraluminal anatomical space).

Figure 25:
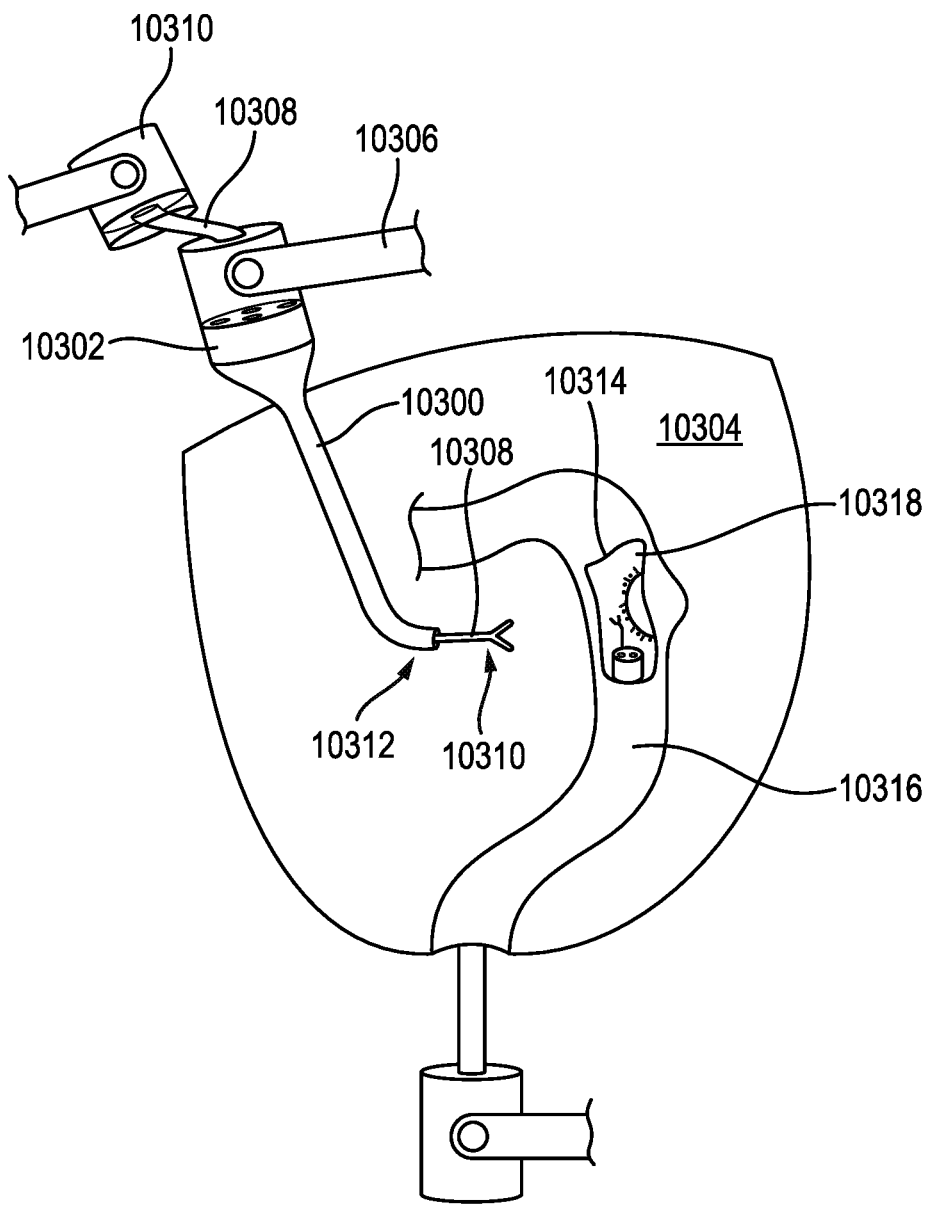
FIG. 25 is schematic view of an exemplary embodiment of a surgical system.

In other embodiments, a robotically steerable and lockable cannula can be used to introduce an endoluminal instrument into an intraluminal anatomical space using an laparoscopic approach. For example, as illustrated in FIG. 25, a robotically steerable and lockable cannula 10300 can be inserted through a first trocar 10302 and into an extraluminal anatomical space 10304 (e.g., an abdominal cavity). The first trocar 10302 is coupled to a first robotic arm 10306. As further shown, a first instrument 10308 can be coupled to a second robotic arm 10310 and inserted through the first trocar 10302. The first instrument 10308 can be inserted further through the robotically steerable and lockable cannula 10300 such that a distal end 10310 of the first instrument 10308 extends through a distal end 10312 of the cannula 10300. As a result, the first instrument 10308 is structurally guided and supported by the steerable and lockable distal end 10302 of the cannula 10300. The movement of the cannula 10300 (e.g., by the first robotic arm 10306) can therefore guide the distal end 10312 of the first instrument 10308 through an otomy 10314 made in an organ 10316 and into the organ cavity 10318, and the movement of the second robotic arm 10310 can cause the distal end 10312 of the first instrument 10308 to move within the organ cavity 10318 relative to the distal end 10312 of the cannula 10300.

Surgical Systems with Intraluminal and Extraluminal Cooperative Instruments

Devices, systems, and methods for multi-source imaging provided herein allow for cooperative surgical visualization. In general, in cooperative surgical visualization, first and second imaging systems (e.g., first and second scope devices) each gathering images of a surgical site are configured to cooperate to provide enhanced imaging of a surgical site. The cooperative surgical visualization may improve visualization of patient anatomy at the surgical site and/or improve control of surgical instrument(s) at the surgical site.

In certain embodiments, surgical systems are configured to be arranged within two separate anatomical areas for conducting one or more surgical tasks. A surgical visualization system can allow for intraoperative identification of critical structure(s) (e.g., diseased tissue, anatomical structures, surgical instrument(s), etc.). The surgical visualization system may thus enable enhanced intraoperative decision making and improved surgical outcomes. The surgical visualization system can provide advanced visualization capabilities beyond what a medical practitioner sees with the "naked eye" and/or beyond what an imaging system can recognize and/or convey to the medical practitioner. The surgical visualization system can augment and enhance what a medical practitioner is able to know prior to tissue treatment (e.g., dissection, etc.) and, thus, may improve outcomes in various instances. As a result, the medical practitioner can confidently maintain momentum throughout the surgical procedure knowing that the surgical visualization system is tracking a critical structure, which may be approached during dissection, for example. The surgical visualization system can provide an indication to the medical practitioner in sufficient time for the medical practitioner to pause and/or slow down the surgical procedure and evaluate the proximity to the critical structure to prevent inadvertent damage thereto. The surgical visualization system can provide an ideal, optimized, and/or customizable amount of information to the medical practitioner to allow the medical practitioner to move confidently and/or quickly through tissue while avoiding inadvertent damage to healthy tissue and/or critical structure(s) and, thus, to minimize the risk of harm resulting from the surgical procedure.

In general, the surgical systems provided herein generally include a first scope device configured to be positioned in both the intraluminal and extraluminal anatomical spaces and to transmit image data of a first scene within its field of view, a second scope device configured to be inserted into the extraluminal anatomical space and transmit image data of a second, different scene within its field of view, and a controller configured to receive the transmitted data and determine the relative distance between the first and second scope devices to provide a merged image. The merged image can be at least a portion of at least the first scope device and the second scope device in a single scene, and at least one of the first scope device and the second scope device in the merged image is a representative depiction thereof. Thus, the merged image may thus provide two separate points of view of the surgical site, which can conveniently allow a medical practitioner to view only one display instead of multiple displays. Further, within that one display, the merged image allows a medical practitioner to coordinate relative location and/or orientation of at least the first and scope devices arranged at or proximate to the surgical site. In certain embodiments, a surgical system can include a tracking device associated with one of the first scope device or the second scope device and configured to transmit a signal indicative of a location of the one of the first scope device or the second scope device relative to the other one of the first scope device or the second scope device.

The surgical systems provided herein can also be used in various robotic surgical systems, such as those discussed above, and can incorporate various tracking and/or imaging mechanisms, such as electromagnetic (EM) tracked tips, fiber bragg grating, virtual tags, fiducial markers, use of probes, identification of known anatomy, various 3D scanning techniques such as using structured light, various sensors and/or imaging systems discussed previously, etc., to assist in tracking movement of the instruments, endoscopes, and laparoscopes relative to each other and/or the overall system. The tracking mechanisms can be configured to transmit tracking data from both a laparoscope and an endoscope so that the location of either scope can be determined relative to the other scope. Additionally, critical structures within the field of view of either scope (e.g., diseased tissue, surgical instruments, anatomical structures) can be tracked by the scope which has such critical structures within their field of view. In total, the surgical systems herein can track the objects within a field of view of each scope, and the relative position of each scope. Therefore, the totality of the tracking data allows the system to calculate the distance of a critical structure from a scope which does not have a critical structure in its field of view based on the tracking data collected by the other scope.

In one exemplary embodiment, the surgical system also includes a first instrument and a second instrument. The first instrument is configured to be inserted into and through the extraluminal anatomical space and into the intraluminal anatomical space such that the first instrument is present in both the extraluminal and intraluminal anatomical spaces. The second instrument is configured to be inserted into the extraluminal anatomical space.

Further, in some embodiments, an imaging system (e.g., a camera) can be arranged on the second portion of the first scope device and configured to transmit image data of a scene within a field of view of the first scope device. Alternatively, or in addition, an imaging system (e.g., a camera) can be arranged on the second scope device and configured to transmit image data of a scene within a field of view of the second scope device. This can allow cooperative visualization between the instruments working in the extraluminal anatomical space and instruments working in the intraluminal anatomical space, and further enable the instruments to work cooperatively together on a single surgical site.

In various embodiments, the surgical systems provided herein includes a controller. The surgical system, the controller, a display, and/or the various instruments, endoscopes, and laparoscopes can also be incorporated into a number of different robotic surgical systems and/or can be part of a surgical hub, such as any of the systems and surgical hubs discussed above. The controller in general is configured to merge first and second scenes from an endoscope and a laparoscope, respectively, to visually create a merged image between the first and second scenes. The controller is configured to receive the tracking data detailed above, and in combination with the first and second scenes, generate the merged image containing a representative depiction of at least the endoscope or laparoscope, and any structures within field of view of the scope which is visually impaired by a tissue wall. For example, if the merged image was from a point-of-view of the endoscope, the merged image is the live image stream of what the endoscope is viewing, while including an overlay of the orientations and locations of laparoscopically arranged surgical instruments and a laparoscope, if present.

During use, in general, the first portion of the first scope device scope is inserted into an extraluminal anatomical space, and a second portion (e.g., a portion that is distal to the first portion) of the first scope device is inserted into an intraluminal anatomical space. Further, the second scope device is inserted into the extraluminal anatomical space. Further, the first instrument is inserted into and through the extraluminal anatomical space and into the intraluminal anatomical space such that the first instrument is present in both the extraluminal and intraluminal anatomical spaces. For example, the first instrument can be inserted through a working channel of the first scope device to position the first instrument within both spaces. Further, the second instrument is inserted into the extraluminal anatomical space. The second instrument can be inserted into the extraluminal anatomical space, prior to, concurrently with, or subsequent to the insertion of the first device scope or the insertion of the first instrument.

An exemplary surgical system can include a variety of features as described herein and illustrated in the drawings. However, a person skilled in the art will appreciate that the surgical systems can include only some of these features and/or it can include a variety of other features known in the art. The surgical systems described herein are merely intended to represent certain exemplary embodiments. Moreover, while the surgical systems are shown and described in connection with a colon, a person skilled in the art will appreciate that these surgical systems can be used in connection with any other suitable body cavities or organs.

Figure 26:
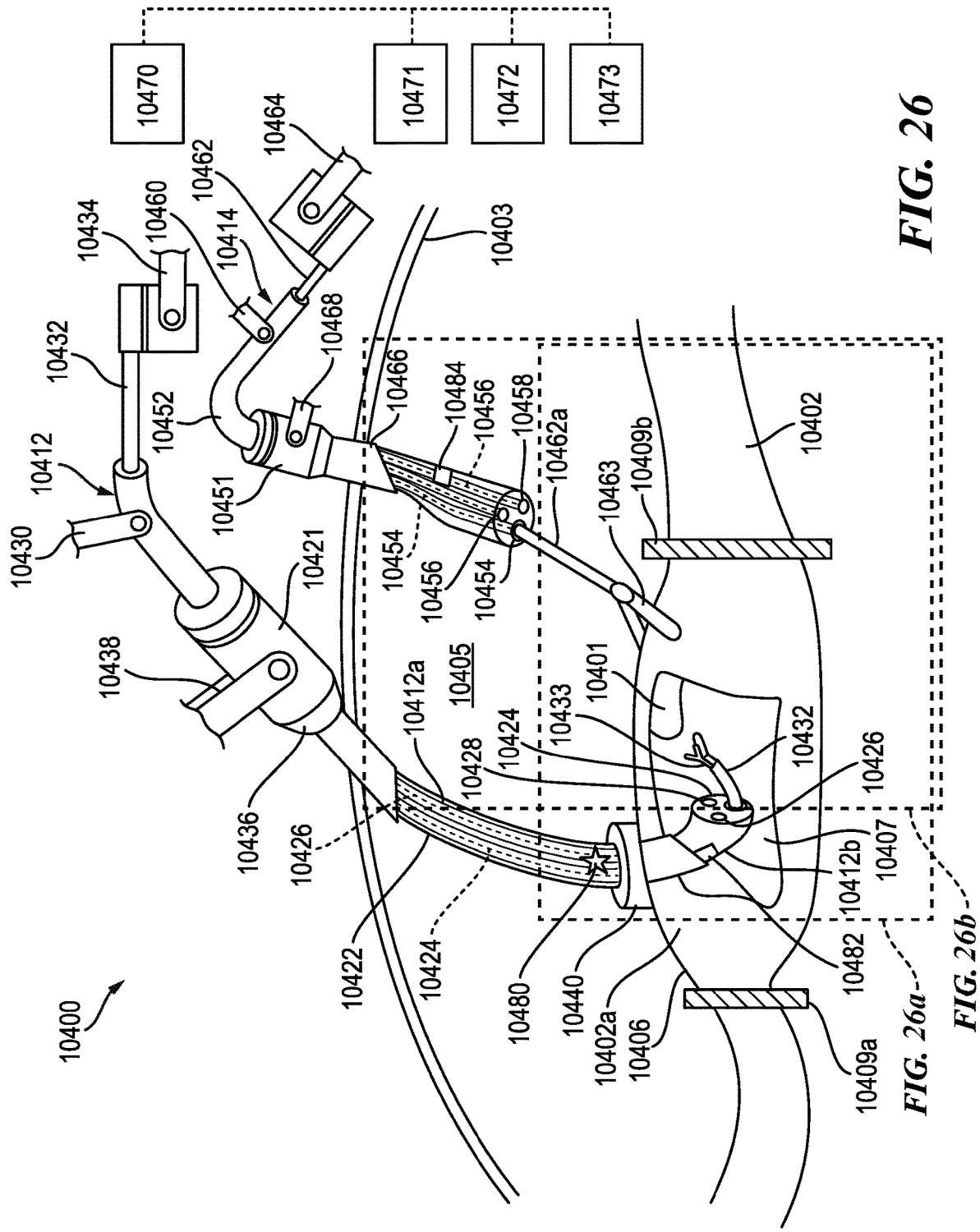
FIG. 26 is a schematic view of an exemplary embodiment of a surgical system having a laparoscopic instrument and an endoluminal instrument, showing the endoluminal instrument being inserted into a colon through a laparoscopic approach.

FIG. 26 illustrates an exemplary embodiment of a surgical system 10400 having a first scope device 10412 and a second scope device 10414, which are being used in a surgical resection of a partial tissue wall thickness tumor 10401 located in a colon 10402. For purposes of simplicity, certain components of the surgical system 10400 are not illustrated.

The first scope device 10412 includes a flexible body 10422 with first and second working channels 10424, 10426 extending therethrough and a first imaging system 10428 (e.g., a camera) at a distal end thereof. The flexible body 10422 can be formed of any suitable flexible material(s).

During use, a proximal end of the first scope device 10412 is coupled to a first robotic arm 10430 and the first instrument 10432 is coupled to a second robotic arm 10434. The first scope device 10412 is inserted into an abdominal cavity 10405 (e.g., an extraluminal anatomical space) through a first trocar 10436. The first trocar 10436 is coupled to a robotic arm 10438. The first scope device 10412 is further inserted through a lumen of a sealing port 10440, with the sealing port 10440 being arranged within a wall 10406 of the colon 10402, and into a colon cavity 10407 (e.g., intraluminal anatomical space). The first scope device 10412 can be inserted into and through the first trocar 10436 and sealing port 10440 such that a first portion 10412a of the first scope device 10412 is present in the abdominal cavity 10405 (e.g., an extraluminal anatomical space), and a second portion 10412b of the first scope device 10412 that is distal to the first portion 10412a is positioned in the colon cavity 10407 (e.g., an intraluminal anatomical space). In some embodiments, the sealing port 10440 can be omitted such that the first scope device 10412 is directly inserted through an otomy made in the colon wall 10402a.

As shown, the first scope device 10412 has a first portion 10412a that is present within the abdominal cavity 10405 and a second portion 10412b that is distal to the first portion 10412a and present within the colon cavity 10407. That is, the first scope device 10412 is designed to be introduced into the colon 10402 through a laparoscopic approach. Prior to or after insertion of the second portion 10412b of the first scope device 10412, sealing clips 10409a and 10409b can be positioned on opposing ends of the insufflated region of the colon 10402.

In some embodiments, the first portion 10412a of the first scope device 10412 can be driven from the one or more tool drivers (not shown) within the motor housing 10421, which is positioned between the robotic arm 10438 and the first trocar 10436.

As further shown in FIG. 26, once the second portion 10412b of the first scope device 10412 is positioned within the colon cavity 10407, a first instrument 10432 can be inserted through the first working channel 10424 of the first scope device 10412 such that the distal end of the first instrument is positioned the colon cavity 10407. As a result, the first instrument 10432 is present within both the abdominal cavity (e.g., an extraluminal anatomical space) and the colon cavity 10407 (e.g., intraluminal anatomical space). Once inserted, the end effector 10433 (of the first instrument 10432 can interact with the tumor 10401 for subsequent removal. While the end effector 10433 can have a variety of configurations, in this illustrated embodiment, the end effector 10433 is the form of a set of movable jaws. In some embodiments, at least one of the first and second working channels 10424, 10426 are configured to allow for the interchanging of instruments without compromising the positon of the first scope device 10412 within at least one of the abdominal cavity 10405 and the colon cavity 10407. This can also maintain the field of view of the first imaging system 10428.

The surgical system 10400 also includes a controller 10470 communicatively coupled to the endoscope 10412 and the laparoscope 10414, and is configured to receive the transmitted image data of the first and second scenes from the first and second optical sensors 10428, 10458, respectively. In some embodiments, the controller 10470 is also communicatively coupled to a first and second tracking devices 10482, 10484 arranged within the endoscope 10412 and the laparoscope 10414, respectively, and is configured to receive the transmitted signals from the first and second tracking devices. Once received, the controller 10470 is configured to determine at least the relative distance between the endoscope 10412 and the laparoscope 10414. In certain embodiments, the controller 10470 can also be configured to determine the relative orientation between endoscope 10412 and the laparoscope 10414.

As further shown in FIG. 26, the second scope device 10414 is laparoscopically arranged within the abdominal cavity 10405. The second scope device includes a flexible body 10452 with third and fourth working channels 10454, 10456, extending therethrough and a second imaging system

10458 (e.g., a camera) at a distal end thereof. The flexible body 10452 can be formed of any suitable flexible material (s).

The second scope device 10414 is inserted into an abdominal cavity 10405 (e.g., an extraluminal anatomical space) through a second trocar 10466 arranged within the abdominal wall 10403. The second trocar 10466 is coupled to a second robotic arm 10468. The second scope device 10414 is inserted into and positioned in the abdominal cavity 10405 (e.g., an extraluminal anatomical space). In some embodiments, the flexible body 10452 of the second scope device 10414 can be driven from the one or more tool drivers (not shown) within the motor housing 10451, which is positioned between the second robotic arm 10468 and the second trocar 10466.

As shown, during use, a proximal end of the second scope device 10414 is coupled to a first robotic arm 10460 and a second instrument 10462 is coupled to a second robotic arm 10464. The second instrument 10462 extends into and through the third working channel 10454 and into the abdominal cavity 10405 (e.g., an extraluminal anatomical space). While the second instrument 10462 can have a variety of configuration, in this illustrated embodiment, the second instrument 10462 has an elongate shaft 10462a with an end effector 10463 at a distal end thereof. In some embodiments, the second instrument 10462 is configured to aid in manipulating the colon 10402 from the abdominal cavity 10405 (e.g., an extraluminal anatomical space) in order to arrange the first instrument 10432 in the colon cavity 10407 (e.g., an intraluminal anatomical space). Further, the end effector 10463 of the second instrument 10462 can interact with the colon 10402 to help stabilize the colon 10402 for removal of the tumor 10401. While the end effector 10463 can have a variety of configurations, in this illustrated embodiment, the end effector 10463 is the form of a set of movable jaws. In some embodiments, the end effector 10463 can be used to create a seal within the colon cavity 10407 (e.g., by clamping the colon 10402).

As shown in FIG. 26, a fiducial marker 10480 can be arranged on the first portion 10412a of the endoscope 10412. The fiducial marker 10480 is within the field of view of the optical sensor 10458 of the laparoscope 10414. The fiducial marker 10480 is fixed on the outer surface of the first portion of the endoscope 10412 such that the position of the second portion 10412b of the endoscope 10412 can be determined through visualization of the fiducial marker 10480 by the optical sensor 10458. Based on both the transmitted image data from the optical sensor 10458 identifying the fiducial marker 10480, the controller 10470 is configured to provide a merged image to a display, for example, on a first display 10471, a second display 10472, or both of the surgical system 10400. In the merged image, at least one of the endoscope 10412 and the laparoscope 10414 is a representative depiction thereof. Various embodiments of magnetic fiducial markers and using magnetic fiducial markers in detecting location are discussed further, for example, in U.S. Prov. Pat. App. No. 63/249,658 entitled "Surgical Devices, Systems, and Methods for Control of One Visualization with Another" filed on Sep. 29, 2021.

In some embodiments, the fiducial marker is a physical symbol which can be visually identified. In other embodiments, the fiducial marker can be a light emitting device, or an electromagnet emitting device which can be identified by the laparoscope in order to track the endoscope. Additionally, there can be multiple fiducial markers arranged on the outer surface of the first portion of the endoscope, where the optical sensor of the laparoscope can identify which fiducial markers are within the extraluminal space.

The first and second displays 10471, 10472 can be configured in a variety of configurations. For example, in some embodiments, the first display can be configured to display the first scene and the second display can be configured to display the second scene, and the first display, the second display, or both, can be further configured to display the merged image. In another embodiment, the surgical system 10400 can include, a third display 10473 that can be used to display the merged image, and the first and second displays 10471, 10472 are used to only show the transmitted image data from the optical sensors 10428, 10458, respectively, without any modification. In this embodiment, a surgeon can access the real-time scenes from both the endoscope 10412 and the laparoscope 10414 on the first and second displays 10471, 10472, while also having access to the merged image on the third display 10473.

As stated above, the endoscope 10412 includes the first optical sensor 10428. The first optical sensor 10428 is configured to transmit image data of a first scene within a field of view of the endoscope 10412 to the controller 10470. In this illustrated embodiment, the tumor 10401 and surgical instrument 10432 are arranged within the field of view of the endoscope 10412. In some embodiments, the relative distance between the endoscope 10412 and the laparoscope 10414 can be determined by using structured light projected onto the first portion 10412a and the fiducial marker 10480 (e.g., via a lighting element) and tracked by the second optical sensor 10458. Further, in some embodiments, based on the determined relative distances between the endoscope 10412 and laparoscope 10414 and determined relative distance between the endoscope 10412 and the tumor 10401, the controller can calculate the relative distance between the laparoscope 10414 and the tumor 10401.

Additionally, the laparoscope 10414 includes the second optical sensor 10458. The second optical sensor 10458 is configured to transmit image data of a second scene within a field of view of the laparoscope 10414 to the controller 10470. The surgical instrument 10462 is arranged within the field of view of the laparoscope 10414. As a result, the controller 10470, based on the transmitted image data, can determine the relative distance between the surgical instrument 10462 and the surgical instrument 10432.

Figure 26A:
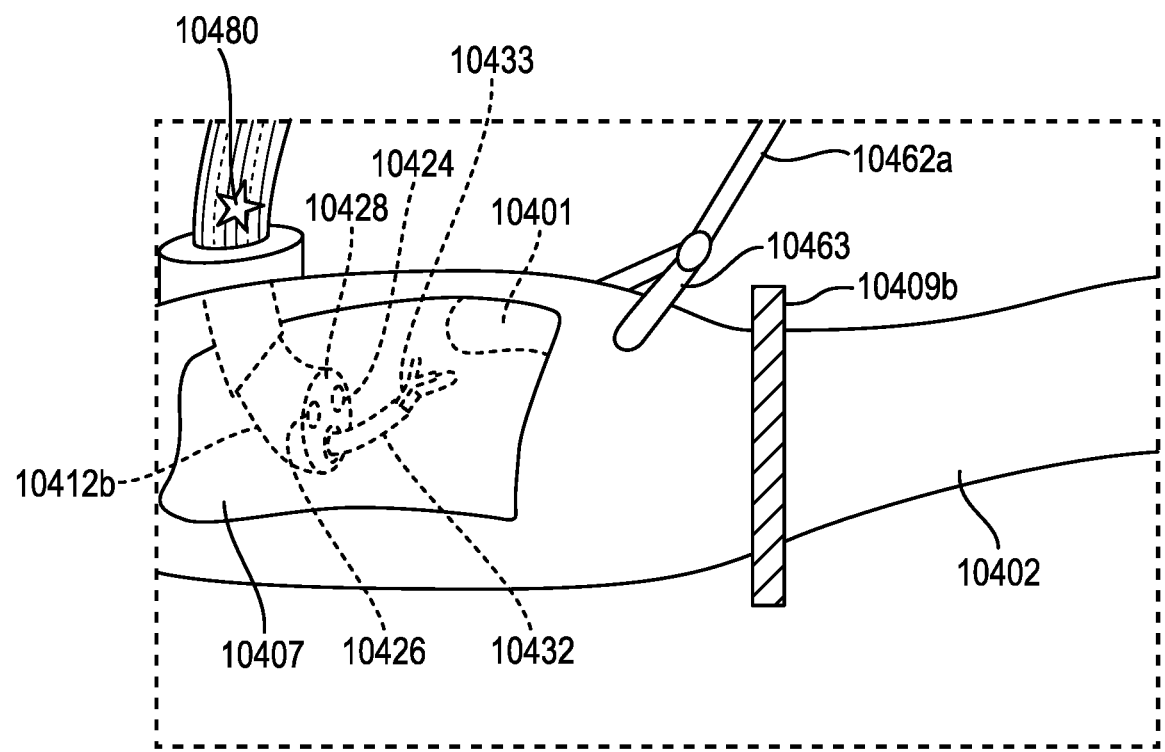
FIG. 26*a* is a schematic view of a merged image of the surgical system of FIG. 26 from the perspective of the laparoscope.

FIG. 26a illustrates an exemplary embodiment of a merged image. The merged image illustrates a real-time second scene within the field of view of the laparoscope 10414 and an overlaid representative depiction of a portion of the endoscopic side of the colon 10402 (e.g., the tumor 10401 and/or the endoscope 10412). Based on the transmitted image data of the second scene in combination with the fiducial marker 10480, the controller 10470 can provide the merged image from the point of view of the laparoscope 10414, where the endoscope 10412 and the tumor 10401 are shown as representative depictions which correspond to their location in the intraluminal space in real-time. In the illustrated embodiment, the representative depictions are shown in dashed outlines of the corresponding tumor 10401 and endoscope 10412. However, other forms of representative depictions can be used, such as simple geometric shapes to represent the non-visual instruments and anatomical structures within the intraluminal space.

Figure 26B:
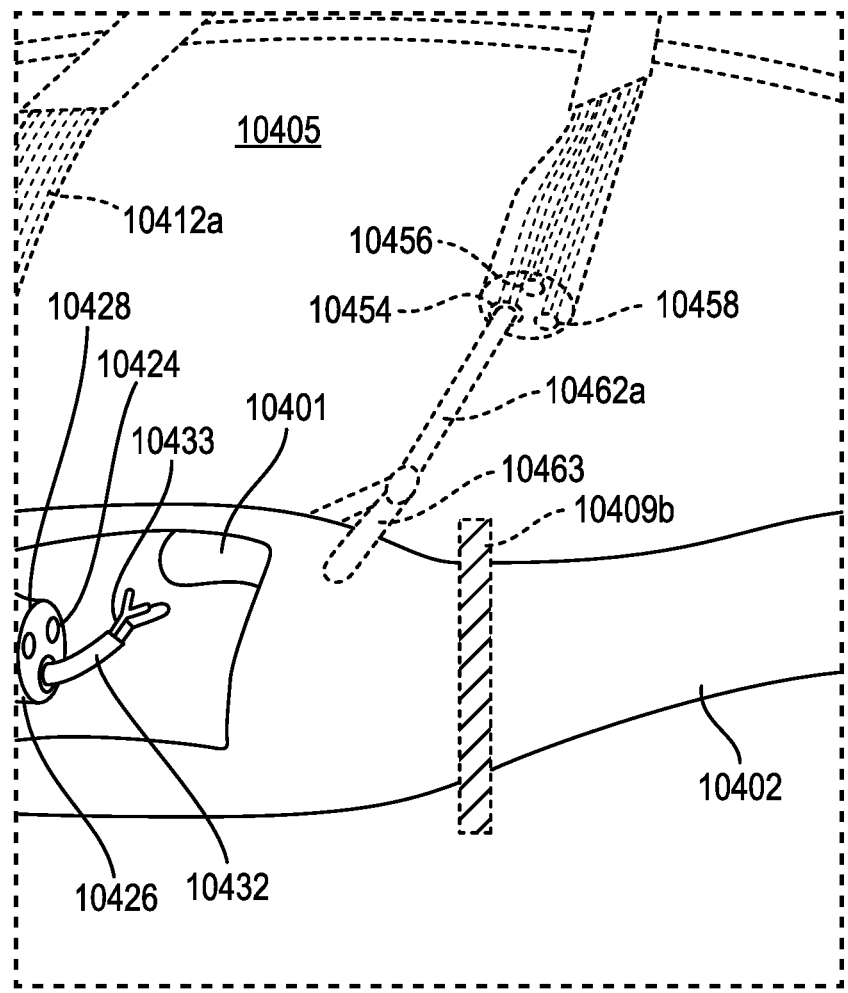
FIG. 26*b* is a schematic view of a merged image of the surgical system of FIG. 26 from the perspective of the endoscope.

Alternatively, or in addition, the controller 10470 can generate a merged image from the perspective of the endoscope 10412. For example, in FIG. 26b, the merged image illustrates a real-time first scene within the field of view of the endoscope 10412 with an overlaid representative depiction of a portion of the laparoscopic side of the colon 10402 (e.g., the laparoscope 10414, and/or the surgical instrument 10462). A person skilled in the art will understand that the phrase "representative depiction" as used herein refers to a virtual overlay on an actual depiction from a camera, where the virtual overlay corresponds to the location and orientation of objects which are arranged within the field of view of a camera, but not visible to the camera due to an obstacle being arranged between the camera and the objects, and that the phrase "actual depiction" as used herein refers to an unmodified, real-time image or video stream from a camera. Based on the transmitted image data of the optical sensor 10428 in combination with the fiduciary marker 10480, the controller 10470 can provide the merged image from the point of view of the endoscope 10412, where the laparoscope 10414 and the surgical instrument 10462 are shown as representative depictions which correspond to their location in the extraluminal space in real-time. In the illustrated embodiment, the representative depictions are shown in dashed outlines of the laparoscope 10414 and surgical instrument 10462. However, other forms of representative depictions can be used, such as simple geometric shapes to represent the non-visual instruments and anatomical structures within the intraluminal space.

In certain embodiments, the movements between the instruments in both intraluminal and extraluminal spaces can be coordinated since both sets of instrument can be visualized by the other. For example, a cooperative defect repair (e.g., suturing an incision) can be accomplished by inserting needle hook from the laparoscopic side with an instrument, and then passing the needle hook into the intraluminal space, where the endoscopically arranged instrument can grab the hook needle. The hook needle can then be passed back through the colon to the extraluminal space, with the process being repeated until the incision is sutured closed.

In other embodiments, the position of the endoscope and laparoscope can be tracked relative to each other through a time-based approach. Once the scope devices cannot visually identify each other, that point in time can become a reference point. The movements of each scope device by the robotic arms can be recorded, and the position of each scope device can be determined over time as the scope devices are moved within an anatomical space.

Surgical Systems for Independently Insufflating Two Separate Anatomic Spaces

In certain embodiments, surgical systems are configured to independently insufflate two separate anatomical areas for conducting one or more surgical tasks. In general, the present surgical systems include a first access port(s) that is/are configured to provide access to and enable insufflation of a first cavity (e.g., an extraluminal anatomical space) and a second access port(s) that is/are configured to provide access to and enable insufflation of a separate cavity (e.g., an intraluminal anatomical space) through the first cavity. This can provide separate anatomical working volumes for different instruments and further enable these different instruments to work together on a single surgical site.

In one exemplary embodiment, a surgical system can generally include a first scope device that is configured to be positioned in both the intraluminal and extraluminal anatomical spaces and a second scope device that is configured to be inserted into the extraluminal anatomical space. The first scope device has a first insufflation port (e.g., a fluid port) operatively coupled to the first scope device and configured to insufflate the intraluminal anatomical space into a first insufflated space, and the second scope device has a second insufflation port (e.g., a fluid port) operatively coupled to the second scope device and configured to insufflate the extraluminal anatomical space into a second insufflated space. As such, the first insufflated space and the second insufflated space are both independently pressurized, and thus, generated to provide separate working volumes for different instruments.

The surgical system also includes a first instrument and a second instrument. The first instrument is configured to be inserted into and through the extraluminal anatomical space and into the intraluminal anatomical space such that the first instrument is present in both the extraluminal and intraluminal anatomical spaces. The second instrument is configured to be inserted into the extraluminal anatomical space.

In some embodiments, the surgical system can include a sealing port arranged in a tissue wall separating the extraluminal anatomical space from the intraluminal anatomical space. In certain embodiments, the sealing port is configured to allow the second portion of the first scope device to pass into the intraluminal anatomical space.

Further, in some embodiments, an imaging system (e.g., a camera) can be arranged on the second portion of the first scope device and configured to transmit image data of a scene within a field of view of the first scope device. Alternatively, or in addition, an imaging system (e.g., a camera) can be arranged on the second scope device and configured to transmit image data of a scene within a field of view of the second scope device. This can allow cooperative visualization between the instruments working in the extraluminal anatomical space and instruments working in the intraluminal anatomical space, and further enable the instruments to work cooperatively together on a single surgical site. Moreover, cooperative visualization can be used to when adjustments may need to be made to the first insufflated area, the second insufflated space, or both during a specific surgical task or step or the entire surgical procedure. An imaging system can include multiple cameras which the surgeon can use to achieve a better perspective on a surgical treatment site within a patient's body.

During use, in general, the first portion of the first scope device scope is inserted into an extraluminal anatomical space, and a second portion (e.g., a portion that is distal to the first portion) of the first scope device is inserted into an intraluminal anatomical space. Further, the second scope device is inserted into the extraluminal anatomical space. Prior to, concurrently with, or subsequent to, the insertion of the first scope device, the first insufflation port can be used to insufflate the intraluminal anatomical space to a first pressure thereby creating the first insufflated space. Further, prior to, concurrently with, or subsequent to insertion of the first device scope, insufflation of the intraluminal anatomical space, and/or the insertion of the second device scope, the extraluminal anatomical space can be insufflated to a second pressure via the second insufflation port thereby creating the second insufflated space.

Further, the first instrument is inserted into and through the extraluminal anatomical space and into the intraluminal anatomical space such that the first instrument is present in both the extraluminal and intraluminal anatomical spaces. For example, the first instrument can be inserted through a working channel of the first scope device to position the first instrument within both spaces. The first instrument can be inserted prior to, concurrently with, or subsequent to the insufflation of the intraluminal anatomical space, the extraluminal space, or both. Further, the second instrument is inserted into the extraluminal anatomical space. The second instrument can be inserted into the extraluminal anatomical space, prior to, concurrently with, or subsequent to the insertion of the first device scope, the insertion of the first instrument, insufflation of the intraluminal anatomical space, or insufflation of the extraluminal space.

An exemplary surgical system can include a variety of features as described herein and illustrated in the drawings. However, a person skilled in the art will appreciate that the surgical systems can include only some of these features and/or it can include a variety of other features known in the art. The surgical systems described herein are merely intended to represent certain exemplary embodiments. Moreover, while the surgical systems are shown and described in connection with a colon, a person skilled in the art will appreciate that these surgical systems can be used in connection with any other suitable body cavities or organs.

Figure 27:
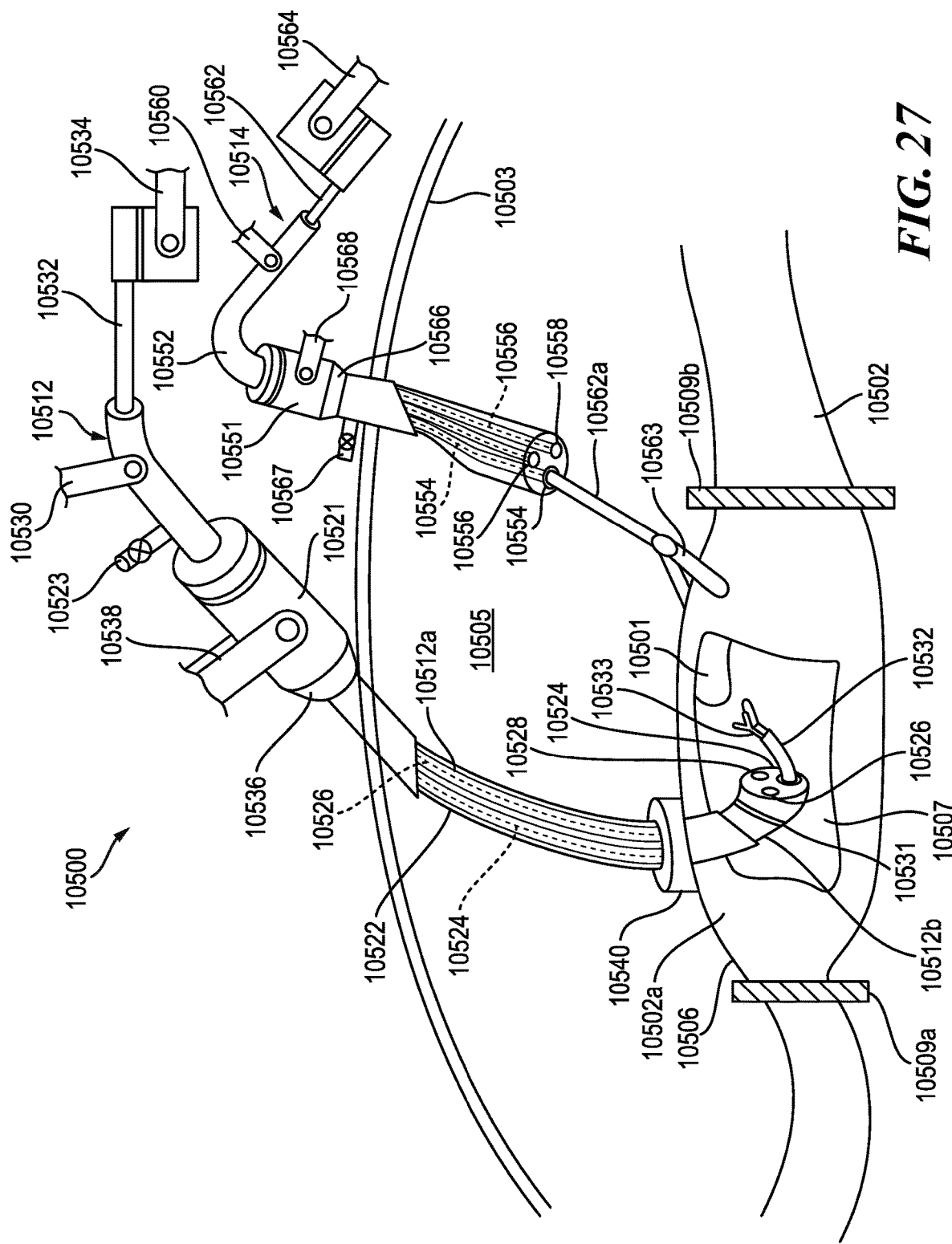
FIG. 27 is a schematic view of an exemplary embodiment of a surgical system having a laparoscopic instrument and an endoluminal instrument, showing the endoluminal instrument being inserted into a colon through a laparoscopic approach.

FIG. 27 illustrates an exemplary embodiment of a surgical system 10500 having a first scope device 10512 and a second scope device 10514, which are being used in a surgical resection of a partial tissue wall thickness tumor 10501 located in a colon 10502. For purposes of simplicity, certain components of the surgical system 10500 are not illustrated.

The first scope device 10512 includes a flexible body 10522 with first and second working channels 10524, 10526 extending therethrough and a first imaging system 10528 (e.g., a camera) at a distal end thereof. The flexible body 10522 can be formed of any suitable flexible material(s).

During use, a proximal end of the first scope device 10512 is coupled to a first robotic arm 10530 and the first instrument 10532 is coupled to a second robotic arm 10534. The first scope device 10512 is inserted into an abdominal cavity 10505 (e.g., an extraluminal anatomical space) through a first trocar 10536. The first trocar 10536 is coupled to a robotic arm 10538. The first scope device 10512 is further inserted through a lumen of a sealing port 10540, with the sealing port 10540 being arranged within a wall 10506 of the colon 10502, and into a colon cavity 10507 (e.g., intraluminal anatomical space). The first scope device 10512 can be inserted into and through the first trocar 10536 and sealing port 10540 such that a first portion 10512a of the first scope device 10512 is present in the abdominal cavity 10505 (e.g., an extraluminal anatomical space), and a second portion 10512b of the first scope device 10512 that is distal to the first portion 10512a is positioned in the colon cavity 10507 (e.g., an intraluminal anatomical space). In some embodiments, the sealing port 10540 is configured to prevent the contents of the colon cavity 10507 from escaping into the abdominal cavity 10505 during an insufflation procedure. In other embodiments, the sealing port 10540 can be omitted such that the first scope device 10512 is directly inserted through an otomy made in the colon wall 10502a.

As shown, the first scope device 10512 has a first portion 10512a that is present within the abdominal cavity 10505 and a second portion 10512b that is distal to the first portion 10512a and present within the colon cavity 10507. That is, the first scope device 10512 is designed to be introduced into the colon 10502 through a laparoscopic approach. Prior to or after insertion of the second portion 10512b of the first scope device 10512, sealing clips 10509a and 10509b can be positioned on opposing ends of the insufflated region of the colon 10502.

The first scope device 10512 includes a first insufflation port 10523 that is configured to insufflate the colon cavity 10507 prior to or concurrently with the insertion of any devices or instruments into the colon cavity 10507. In this illustrated embodiment, the first insufflation port 10523 is in fluid communication with the second working channel 10526 of the first scope device 10512. As a result, the first insufflation port 10523 can be used to control the ingress or egress of fluid to and from the colon cavity 10507 so as to insufflate or desufflate the colon cavity 10507. While not shown the first insufflation port 10523 is connected to a fluid system. The fluid system can include a pump and a fluid reservoir. The pump creates a pressure which pushes the fluid into and inflates (e.g., pressurizes) the colon cavity 10507, and creates a suction that draws the fluid from the colon cavity 10507 in order to deflate (e.g., depressurizes) the colon cavity 10507. The fluid passed into or out of the colon cavity 10507 can be any suitable fluid (e.g., saline, carbon dioxide gas, and the like). In other embodiments, the colon cavity 10507 can be insufflated and desufflated using any other suitable insufflating mechanisms and devices.

In some embodiments, the first portion 10512a of the first scope device 10512 can be driven from the one or more tool drivers (not shown) within the motor housing 10521, which is positioned between the robotic arm 10538 and the first trocar 10536.

As further shown in FIG. 27, once the second portion 10512b of the first scope device 10512 is positioned within the colon cavity 10507, a first instrument 10532 can be inserted through the first working channel 10524 of the first scope device 10512 such that the distal end of the first instrument is positioned the colon cavity 10507. As a result, the first instrument 10532 is present within both the abdominal cavity (e.g., an extraluminal anatomical space) and the colon cavity 10507 (e.g., intraluminal anatomical space). Once inserted, the end effector 10533 (of the first instrument 10532 can interact with the tumor 10501 for subsequent removal. While the end effector 10533 can have a variety of configurations, in this illustrated embodiment, the end effector 10533 is the form of a set of movable jaws. In some embodiments, at least one of the first and second working channels 10524, 10526 are configured to allow for the interchanging of instruments without compromising the positon of the first scope device 10512 within at least one of the abdominal cavity 10505 and the colon cavity 10507. This can also maintain the field of view of the first imaging system 10528.

In some embodiments, the first scope device 10512 can be configured to create a seal within the colon cavity 10507. For example, as shown in FIG. 27, the first scope device 10512 includes a sealing element 10531 that is positioned at or proximate to a distal end of the first scope device 10512. While the sealing element 10531 can have a variety of configurations, in this illustrated embodiment, the sealing element 10531 is in the form of an inflatable annular ring positioned about the first scope device 10512. While the first scope device 10512 is advanced through the abdominal cavity 10505 and into the colon cavity 10507, the sealing element 10531 is in a deflated state. Once in the colon cavity 10507, the sealing element 10531 can be inflated to thereby create a seal as it engages the inner tissue wall of the colon 10502. Further, in certain embodiments, the sealing element 10531, when in an inflated state, can also function as a fixation point for the first scope device 10512 within the colon cavity 10507.

As further shown in FIG. 27, the second scope device 10514 is laparoscopically arranged within the abdominal cavity 10505. The second scope device includes a flexible body 10552 with third and fourth working channels 10554, 10556, extending therethrough and a second imaging system

10558 (e.g., a camera) at a distal end thereof. The flexible body 10552 can be formed of any suitable flexible material (s).

The second scope device 10514 is inserted into an abdominal cavity 10505 (e.g., an extraluminal anatomical space) through a second trocar 10566 arranged within the abdominal wall 10503. The second trocar 10566 is coupled to a second robotic arm 10568. The second scope device 10514 is inserted into and positioned in the abdominal cavity 10505 (e.g., an extraluminal anatomical space). The second trocar 10566 includes a second insufflation port 10567 that is configured to insufflate the abdominal cavity 10105 prior to or concurrently with the insertion of any devices or instruments into the abdominal cavity 10105. In this illustrated embodiment, the second insufflation port 10567 is in fluid communication with the fourth working channel 10556. As a result, the second insufflation port 10567 can be used to control the ingress or egress of fluid into and out of the abdominal cavity 10505 so as to insufflate or desufflate the abdominal cavity 10505. While not shown the second insufflation port 10567 is connected to a fluid system. The fluid system can include a pump and a fluid reservoir. The pump creates a pressure which pushes the fluid into and inflates (e.g., pressurizes) the abdominal cavity 10105, and creates a suction that draws the fluid from the abdominal cavity 10105 in order to deflate (e.g., depressurizes) the abdominal cavity 10105. The fluid passed into or out of the abdominal cavity 10105 can be any suitable fluid (e.g., saline, carbon dioxide gas, and the like). In other embodiments, the abdominal cavity 10105 can be insufflated and desufflated using any other suitable insufflating mechanisms and devices.

In some embodiments, the flexible body 10552 of the second scope device 10514 can be driven from the one or more tool drivers (not shown) within the motor housing 10551, which is positioned between the second robotic arm 10568 and the second trocar 10566.

As shown, during use, a proximal end of the second scope device 10514 is coupled to a first robotic arm 10560 and a second instrument 10562 is coupled to a second robotic arm 10564. The second instrument 10562 extends into and through the third working channel 10554 and into the abdominal cavity 10505 (e.g., an extraluminal anatomical space). While the second instrument 10562 can have a variety of configuration, in this illustrated embodiment, the second instrument 10562 has an elongate shaft 10562a with an end effector 10563 at a distal end thereof. In some embodiments, the second instrument 10562 is configured to aid in manipulating the colon 10502 from the abdominal cavity 10505 (e.g., an extraluminal anatomical space) in order to arrange the first instrument 10532 in the colon cavity 10507 (e.g., an intraluminal anatomical space). Further, the end effector 10563 of the second instrument 10562 can interact with the colon 10502 to help stabilize the colon 10502 for removal of the tumor 10501. While the end effector 10563 can have a variety of configurations, in this illustrated embodiment, the end effector 10563 is the form of a set of movable jaws. In some embodiments, the end effector 10563 can be used to create a seal within the colon cavity 10507 (e.g., by clamping the colon 10502).

In use, the colon cavity 10507 is pressurized to a first pressure via fluid ingress through the first insufflation port 10523 and the second working channel 10526. Additionally, the abdominal cavity 10505 is pressurized to a second pressure via fluid ingress through second insufflation port 10567 and the fourth working channel 10556. In some embodiments, the first pressure is different than the second pressure. Alternatively, the first pressure and the second pressure can be identical.

The first pressure and second pressure can be adjusted independently to alter the working volume space within the abdominal cavity 10505, the colon cavity 10507, or both. For example, the working volume space within the abdominal cavity 10505 can be increased by increasing the pressure in the abdominal cavity 10505, decreasing the pressure in the colon cavity 10507, or both. Similarly, the working volume space within the abdominal cavity 10505 can be decreased by decreasing the pressure in the abdominal cavity 10505, increasing the pressure in the colon cavity 10507, or both. Further, the working volume space within the colon cavity 10507 can be increased by increasing the pressure in the colon cavity 10507 and can be decreased by decreasing the pressure in the colon cavity 10507.

While not illustrated, the first and second imaging systems 10528, 10558 are connected to one or more displays that provide a snapshot and/or a live video feed of the surgical site(s). The snapshot and/or live video feed on the displays can permit a medical practitioner to observe a surgical site from multiple angles and approaches, for example. As a result, the first and second imaging systems 10528, 10558 can provide information to the medical practitioner that can be used in determining effective working volume spaces for the first and second instruments for a particular surgical task or step or throughout the entire surgical procedure and what, if any, adjustments need to be made to the first insufflated space, the second insufflated space, or both.

The surgical systems disclosed herein can be designed to be disposed of after a single use, or they can be designed to be used multiple times. In either case, however, the surgical systems can be reconditioned for reuse after at least one use. Reconditioning can include any combination of the steps of disassembly of the surgical devices, followed by cleaning or replacement of particular pieces and subsequent reassembly. In particular, the surgical systems can be disassembled, and any number of the particular pieces or parts of the surgical systems can be selectively replaced or removed in any combination. Upon cleaning and/or replacement of particular parts, the surgical systems can be reassembled for subsequent use either at a reconditioning facility, or by a surgical team immediately prior to a surgical procedure. Those skilled in the art will appreciate that reconditioning of a surgical device can utilize a variety of techniques for disassembly, cleaning/replacement, and reassembly. Use of such techniques, and the resulting reconditioned instrument, are all within the scope of the present application.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Sizes and shapes of the systems and devices, and the components thereof, can depend at least on the anatomy of the subject in which the systems and devices will be used, the size and shape of components with which the systems and devices will be used, and the methods and procedures in which the systems and devices will be used.

It will be appreciated that the terms "proximal" and "distal" are used herein with reference to a user, such as a clinician, gripping a handle of an instrument. It will be appreciated that the terms "proximal" and "distal" are used herein, respectively, with reference to the top end (e.g., the end that is farthest away from the surgical site during use) and the bottom end (e.g., the end that is closest to the surgical site during use) of a surgical instrument, respectively, that is configured to be mounted to a robot. Other spatial terms such as "front" and "rear" similarly correspond respectively to distal and proximal. It will be further appreciated that for convenience and clarity, spatial terms such as "vertical" and "horizontal" are used herein with respect to the drawings. However, surgical instruments are used in many orientations and positions, and these spatial terms are not intended to be limiting and absolute.

Values or ranges may be expressed herein as "about" and/or from/of "about" one particular value to another particular value. When such values or ranges are expressed, other embodiments disclosed include the specific value recited and/or from/of the one particular value to another particular value. Similarly, when values are expressed as approximations, by the use of antecedent "about," it will be understood that here are a number of values disclosed therein, and that the particular value forms another embodiment. It will be further understood that there are a number of values disclosed therein, and that each value is also herein disclosed as "about" that particular value in addition to the value itself. In embodiments, "about" can be used to mean, for example, within 10% of the recited value, within 5% of the recited value or within 2% of the recited value.

For purposes of describing and defining the present teachings, it is noted that unless indicated otherwise, the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety. Any patent, publication, or information, in whole or in part, that is said to be incorporated by reference herein is only to the extent that the incorporated material does not conflict with existing definitions, statements, or other disclosure material set forth in this document. As such the disclosure as explicitly set forth herein supersedes any conflicting material incorporated herein by reference.

What is claimed is:

1. A surgical system, comprising:
    a first scope device having a first portion configured to be inserted into and positioned within an extraluminal anatomical space and a second portion distal to the first portion and configured to be positioned within an intraluminal anatomical space, the first scope device having:
        a first insufflation port operatively coupled to the second portion of the first scope device and configured to insufflate the intraluminal anatomical space into a first insufflated space, wherein the first insufflation port is connected to a first fluid system, wherein the first fluid system comprises a first pump and a first fluid reservoir, wherein the first fluid reservoir comprises saline, and wherein being configured to insufflate the intraluminal anatomical space comprises being configured to insufflate the intraluminal anatomical space by pumping the saline into the intraluminal anatomical space from the first fluid reservoir using the first pump and creating a first pressure, or desufflate the intraluminal anatomical space by pumping the saline out of the intraluminal anatomical space using the first pump and the first pressure; and
        a first instrument configured to be inserted into and through the extraluminal anatomical space and into the intraluminal anatomical space such that the first instrument is present in both the extraluminal and intraluminal anatomical spaces; and
    a second scope device configured to be inserted into the extraluminal anatomical space, the second scope device having:
        a second insufflation port operatively coupled to the second scope device and configured to insufflate the extraluminal anatomical space into a second insufflated space, wherein the second insufflation port is connected to a second fluid system, wherein the second fluid system comprises a second pump and a second fluid reservoir, wherein the second fluid reservoir comprises saline, wherein being configured to insufflate the extraluminal anatomical space comprises being configured to insufflate the extraluminal anatomical space by pumping the saline into the extraluminal anatomical space from the second fluid reservoir using the second pump and creating a second pressure, or desufflate the extraluminal anatomical space by pumping the saline out of the extraluminal anatomical space using the second pump and the second pressure, and wherein the first pressure differs from the second pressure; and
        a second instrument configured to be inserted into the extraluminal anatomical space.

2. The surgical system of claim 1, further comprising a sealing port arranged in a tissue wall separating the extraluminal anatomical space from the intraluminal anatomical space, the sealing port configured to allow the second portion of the first scope device to pass into the intraluminal anatomical space.

3. The surgical system of claim 1, wherein the first scope device is configured to create a seal in the intraluminal anatomical space.

4. The surgical system of claim 1, wherein the second instrument is configured to create a seal in the intraluminal anatomical space while within the extraluminal anatomical space.

5. The surgical system of claim 1, further comprising an imaging system arranged on the second portion of the first scope device and configured to transmit image data of at least one of a scene within a field of view of the first scope device or a scene within a field of view of the second scope device.

6. The surgical system of claim 1, wherein the first scope device further comprises a flexible body with a working channel extending therethrough and configured to allow a distal end of the first instrument to be inserted into and through the extraluminal anatomical space and into the intraluminal anatomical space such that the first instrument is present in both the extraluminal and intraluminal anatomical spaces.

7. The surgical system of claim 1, wherein the surgical system further comprises a first imaging system and a first tracking device that are associated with the first scope device and a second imaging system and a second tracking device that are associated with the second scope device, wherein the first scope device is configured to transmit first image data of a first scene within a first field of view of the first scope device using the first imaging system and transmit first signal indicative of a location of the first scope device, and wherein the second scope device is configured to transmit second image data of a second scene within a second field of view of the second scope device using the second imaging system and transmit second signal indicative of a location of the second scope device.

8. The surgical system of claim 1, wherein the surgical system further comprises a first tracking device associated with the first scope device and a second tracking device associated with the second scope device, wherein the first scope device is configured to transmit a first signal to the surgical system and the second scope device is configured to transmit a second signal to the surgical system, and wherein the surgical system is configured to determine a relative distance and a relative orientation between the first scope device and the second scope device based on the first signal and the second signal.

9. A method, comprising:
inserting a first portion of a first scope device into an extraluminal anatomical space;
inserting a second portion of the first scope device, distal to the first portion, into an intraluminal anatomical space, wherein the first scope device has a first insufflation port, wherein the second portion is distal to the first portion and is configured to be positioned within the intraluminal anatomical space, wherein the first insufflation port is connected to a first fluid system, wherein the first fluid system comprises a first pump and a first fluid reservoir, and wherein the first fluid reservoir comprises saline;
inserting a first instrument through the extraluminal anatomical space and into the intraluminal anatomical space such that the first instrument is present in both the extraluminal and intraluminal anatomical spaces;
inserting a second scope device into the extraluminal anatomical space, wherein the second scope device has a second insufflation port, wherein the second insufflation port is connected to a second fluid system, wherein the second fluid system comprises a second pump and a second fluid reservoir, and wherein the second fluid reservoir comprises saline;
inserting a second instrument into the extraluminal anatomical space;
insufflating the extraluminal anatomical space to a first pressure through the second insufflation port of the second scope device, wherein insufflating the extraluminal anatomical space comprises insufflating the extraluminal anatomical space by pumping the saline into the extraluminal anatomical space from the second fluid reservoir using the second pump and creating the first pressure, or desufflate the extraluminal anatomical space by pumping the saline out of the extraluminal anatomical space using the second pump and the first pressure; and
insufflating the intraluminal anatomical space to a second pressure through the first insufflation port of the first scope device, wherein insufflating the intraluminal anatomical space comprises insufflating the intraluminal anatomical space by pumping the saline into the intraluminal anatomical space from the first fluid reservoir using the first pump and creating the second pressure, or desufflate the intraluminal anatomical space by pumping the saline out of the intraluminal anatomical space using the first pump and the second pressure, and wherein the first pressure differs from the second pressure.

10. The method of claim 9, further comprising passing the second portion of the first scope device to into the intraluminal anatomical space through a sealing port placed within a tissue wall separating the extraluminal anatomical space from the intraluminal anatomical space.

11. The method of claim 10, further comprising inserting the second portion of the first scope device through the sealing port and into the intraluminal anatomical space.

12. The method of claim 9, further comprising transmitting at least one of image data of a scene within a field of view of the first scope device via an imaging system arranged on the second portion of the first scope device or image data of a scene within a field of view of the second scope device via an imaging system arranged on the second scope device.

13. The method of claim 9, further comprising inserting a distal end of the first instrument into and through a working channel of a flexible body of the first scope device such that the first instrument is present in both the extraluminal and intraluminal anatomical spaces.

14. The method of claim 13, further comprising removing the first instrument from the working channel while the second portion of the first scope device is positioned within the intraluminal anatomical space.

15. The method of claim 14, further comprising arranging a third instrument within the working channel while the second portion of the first scope device is positioned within the intraluminal anatomical space.

16. The method of claim 9, further comprising manipulating a tissue wall at least partially defining the intraluminal anatomical space via the second instrument.

17. The method of claim 9, further comprising enlarging a working volume within the extraluminal anatomical space by depressurizing the intraluminal anatomical space through the second insufflation port.

18. The method of claim 9, wherein the method further comprises:
transmit first image data of a first scene within a first field of view of the first scope device using a first imaging system, wherein the first imaging system is associated with the first scope device;
transmitting a first signal indicative of a location of the first scope device using a first tracking device, wherein the first tracking device is associated with the first scope device;
transmitting second image data of a second scene within a second field of view of the second scope device using a second imaging system, wherein the second imaging system is associated with the second scope device; and
transmitting a second signal indicative of a location of the second scope device using a second tracking device, wherein the second tracking device is associated with the second scope device.

19. The method of claim 9, wherein the method further comprises:
transmitting a first signal to a surgical system using a first tracking device, wherein the first tracking device is associated with the first scope device;

transmitting a second signal to the surgical system using a second tracking device, wherein the second tracking device is associated with the second scope device; and determining a relative distance and a relative orientation between the first scope device and the second scope device based on the first signal and the second signal.

* * * * *